March 2, 1965 W. E. BRAINARD ETAL Re.-Re. 25,737

MACHINE TOOL WITH MECHANICAL CUTTING TOOL CHANGER

Original Filed June 27, 1958 13 Sheets-Sheet 1

INVENTORS
Wallace E. Brainard, John A. Hansen,
Robert K. Sedgwick, Charles B. Sipek,
BY Hans J. Baechle
Earl J. Wittschel
Attorney

MACHINE TOOL WITH MECHANICAL CUTTING TOOL CHANGER

Original Filed June 27, 1958 13 Sheets-Sheet 2

INVENTORS
Wallace E. Brainard,
John A. Hansen,
Robert K. Sedgwick
Charles B. Sipek, Hans J. Boechle
BY Elroy J. Wutschel
Attorney March 2, 1965 W. E. BRAINARD ETAL Re.-Re. 25,737

MACHINE TOOL WITH MECHANICAL CUTTING TOOL CHANGER

Original Filed June 27, 1958 13 Sheets-Sheet 3

INVENTORS
Wallace E. Brainard,
John A. Hansen,
Robert K. Sedgwick,
Charles B. Sipek, Hans J. Baechle
BY Leroy J. Wuttke
Attorney MACHINE TOOL WITH MECHANICAL CUTTING TOOL CHANGER
Original Filed June 27, 1958 13 Sheets-Sheet 4
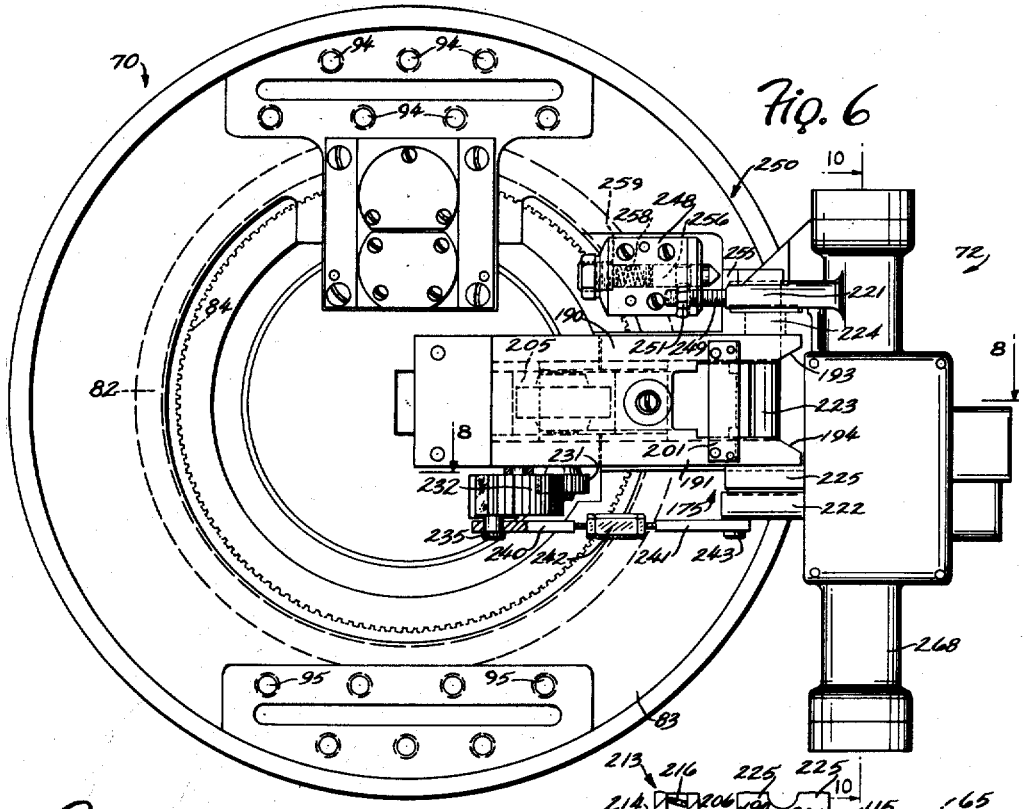
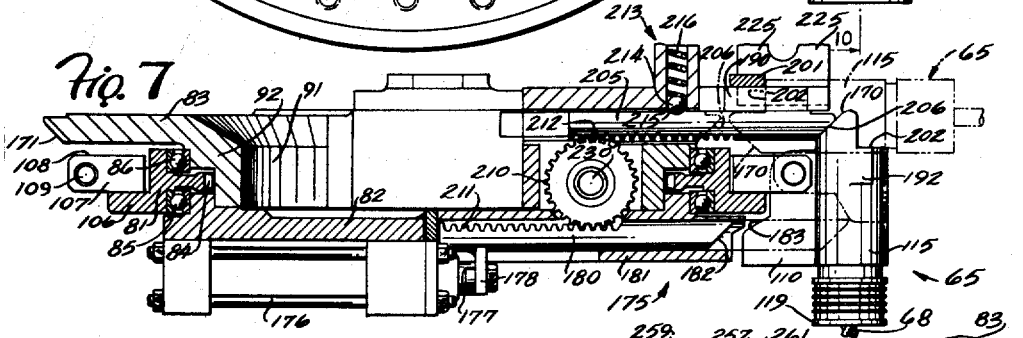
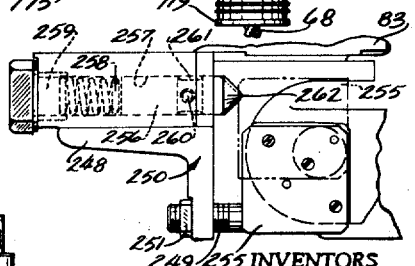
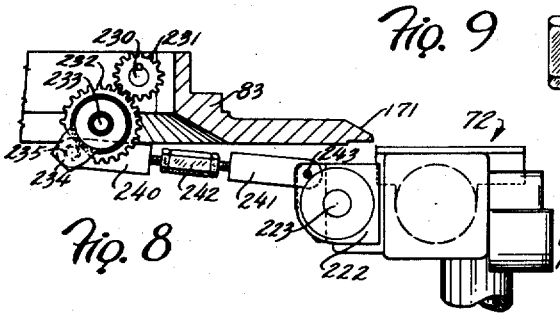
INVENTORS
Wallace E. Brainard, John A. Hansen,
Robert K. Sedgwick, Charles B. Sipek,
Hans J. Baechle
BY
Elroy J. Wurtschel
Attorney MACHINE TOOL WITH MECHANICAL CUTTING TOOL CHANGER
Original Filed June 27, 1958 13 Sheets-Sheet 5
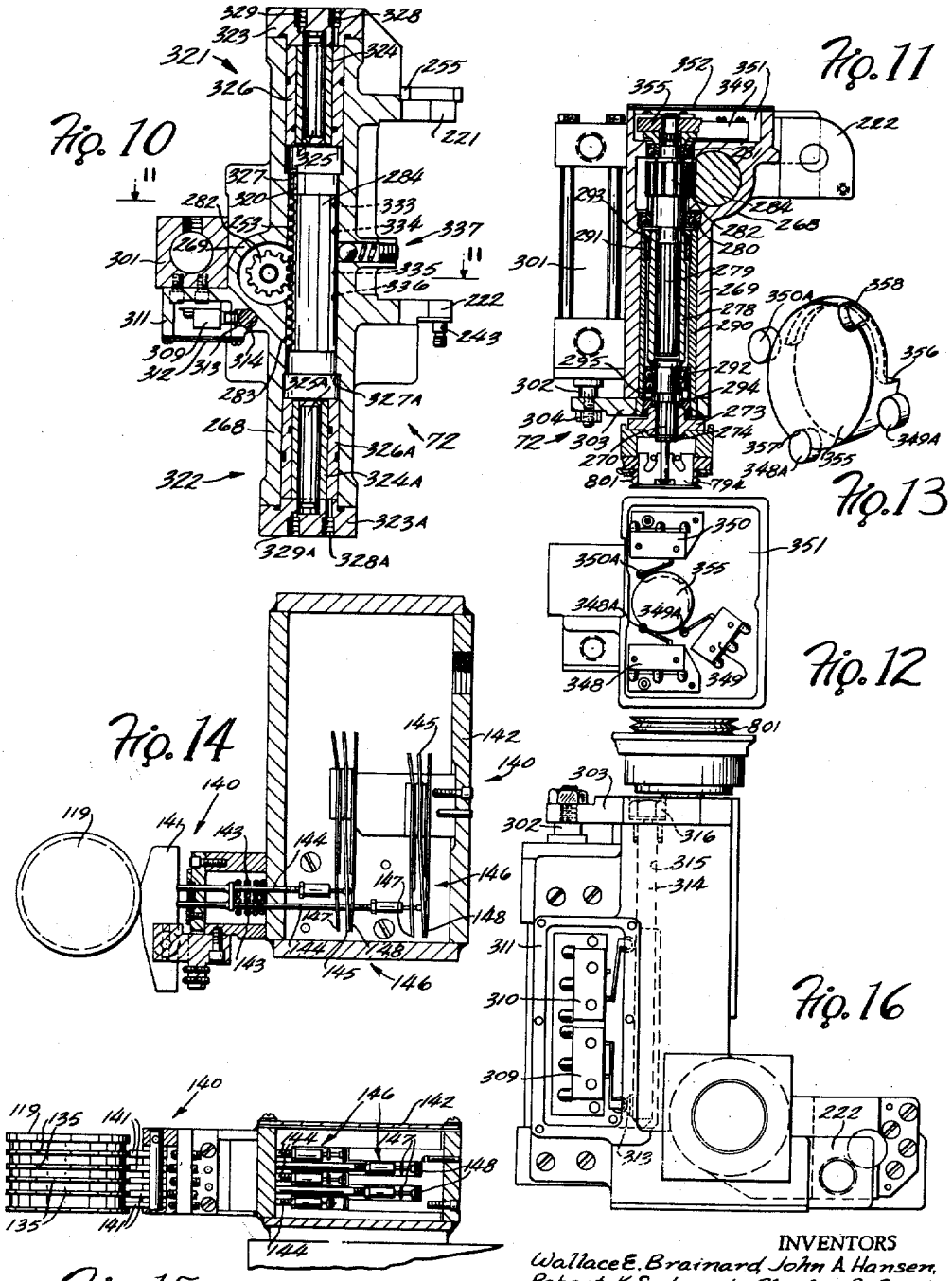
INVENTORS
Wallace E. Brainard, John A. Hansen,
Robert K. Sedgwick, Charles B. Sipek,
Hans J. Baechle
BY
Elroy J. Wurtschel
Attorney March 2, 1965 W. E. BRAINARD ETAL Re.-Re. 25,737

MACHINE TOOL WITH MECHANICAL CUTTING TOOL CHANGER

Original Filed June 27, 1958

13 Sheets-Sheet 6

INVENTORS
Wallace E. Brainard, John A. Hansen,
Robert K. Sedgwick, Charles B. Sipek,
Hans J. Baechle
BY
Elroy J. Wurtscheel
Attorney MACHINE TOOL WITH MECHANICAL CUTTING TOOL CHANGER
Original Filed June 27, 1958 13 Sheets-Sheet 7
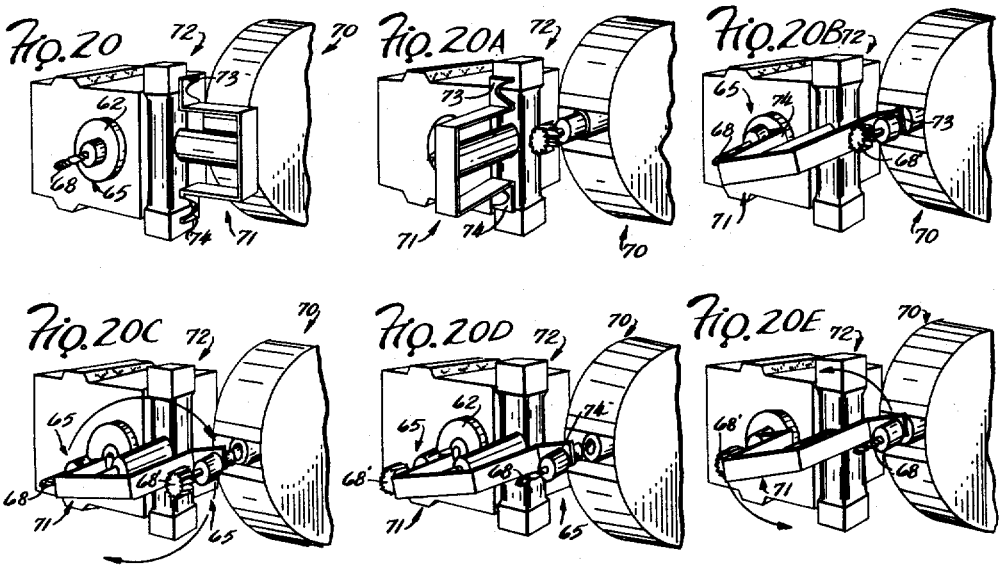
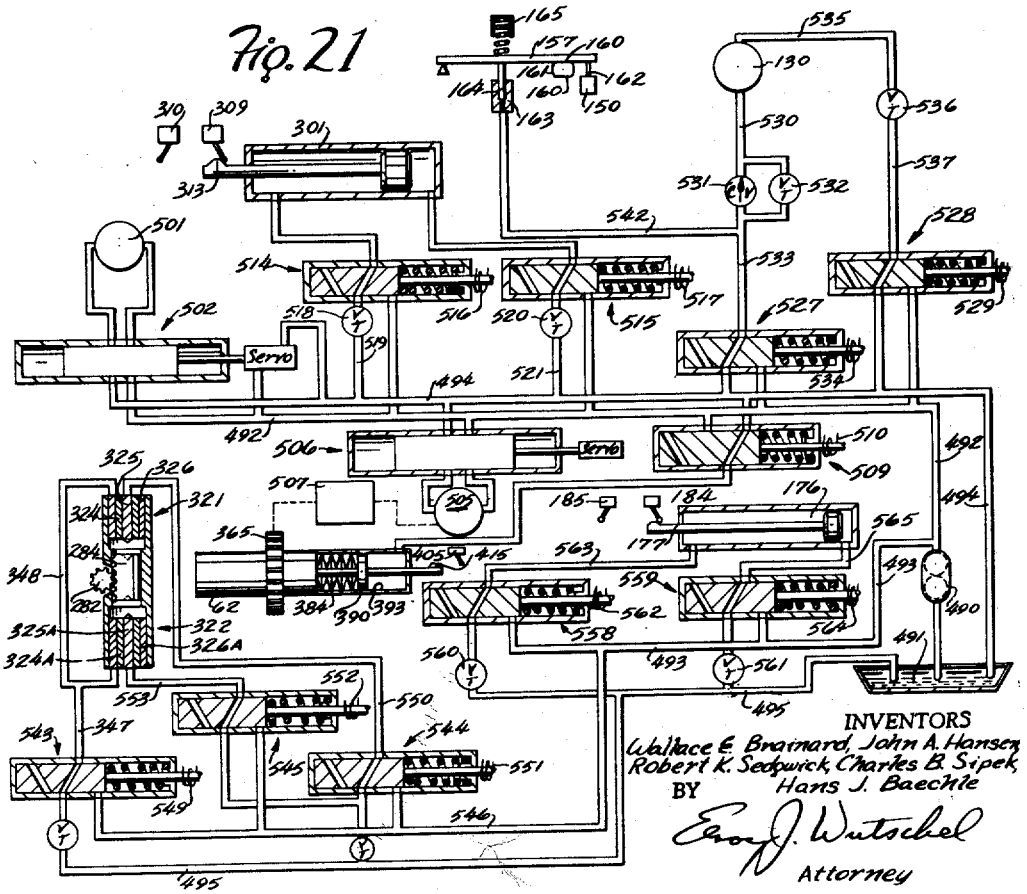
INVENTORS
Wallace E. Brainard, John A. Hansen,
Robert K. Sedgwick, Charles B. Sipek,
Hans J. Baechle
BY
Ernest J. Wutschel
Attorney MACHINE TOOL WITH MECHANICAL CUTTING TOOL CHANGER
Original Filed June 27, 1958 13 Sheets-Sheet 8
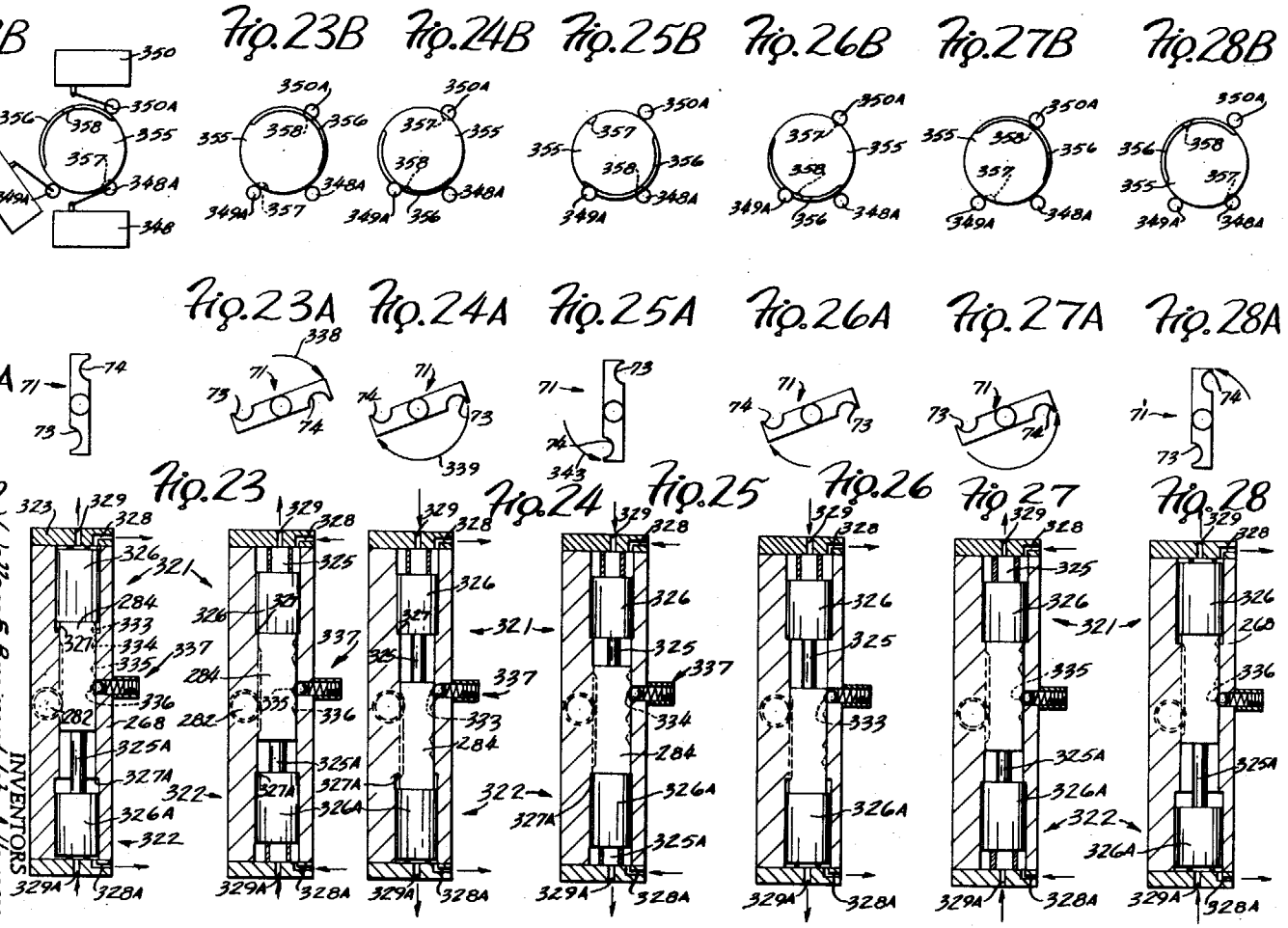
INVENTORS
Wallace E. Brainard, John A. Hansen,
Robert K. Sedgwick, Charles B. Sipek,
BY Hans J. Baechle
Elmer J. Wutscibel
Attorney

MACHINE TOOL WITH MECHANICAL CUTTING TOOL CHANGER

Original Filed June 27, 1958 13 Sheets-Sheet 9

INVENTORS
Wallace E. Brainard, John A. Hansen
Robert K. Sedgwick, Charles B. Sipek
BY Hans J. Baechle
Elroy J. Wittchel
Attorney

MACHINE TOOL WITH MECHANICAL CUTTING TOOL CHANGER

Original Filed June 27, 1958 13 Sheets-Sheet 10

INVENTORS
Wallace E. Brainard, John A. Hansen
Robert K. Sedgwick, Charles B. Sipek,
Hans J. Baechle
BY
Elroy J. Wuttobel
Attorney

MACHINE TOOL WITH MECHANICAL CUTTING TOOL CHANGER

Original Filed June 27, 1958 13 Sheets-Sheet 11

INVENTORS
Wallace E. Brainard, John A. Hansen
Robert K. Sedgwick, Charles B. Sipek
BY Hans J. Baechle
Elroy J. Wittchel
Attorney

MACHINE TOOL WITH MECHANICAL CUTTING TOOL CHANGER

Original Filed June 27, 1958 13 Sheets-Sheet 12

INVENTORS
Wallace E. Brainard, John A. Hansen,
Robert K. Sedgwick, Charles B. Sipek,
BY Hans J. Baechle
Elroy J. Wutschel
Attorney

MACHINE TOOL WITH MECHANICAL CUTTING TOOL CHANGER

Original Filed June 27, 1958 13 Sheets-Sheet 13

INVENTORS
Wallace E. Brainard, John A. Hansen,
Robert K. Sedgwick, Charles B. Sipek,
Hans J. Boechle
BY
Elmer J. Wuttichel
Attorney United States Patent Office Re. 25,737
Reissued Mar. 2, 1965

25,737

MACHINE TOOL WITH MECHANICAL CUTTING TOOL CHANGER

Wallace E. Brainard, Milwaukee, Wis., John A. Hansen, East Granby, Conn., Robert K. Sedgwick, Waukesha, and Charles B. Sipek, Hales Corners, Wis., and Hans J. Baechle, Rockford, Ill., assignors to Kearney & Trecker Corporation, West Allis, Wis., a corporation of Wisconsin Original No. 3,052,011, dated Sept. 4, 1962, Ser. No. 744,976, June 27, 1958. Reissue No. 25,583, dated May 26, 1964, Ser. No. 310,968, Sept. 23, 1963. This application for reissue Aug. 28, 1964, Ser. No. 392,679
60 Claims. (Cl. 29—568)

Matter enclosed in heavy brackets [ ] appears in the first but forms no part of this reissue specification; matter printed in italics indicates the additions made by the first reissue; matter printed in bold face (except reference figures) indicates the additions made by this reissue.

The present invention relates generally to machine tools and more particularly to an improved machine tool equipped with a plurality of rotary cutting tools of different types that may be made individually operative automatically for performing a variety of machining operations on a single workpiece or on a number of workpieces in rapid succession.

It is a general object of the present invention to provide a machine tool with improved versatility.

Another object of the present invention is to provide an improved machine tool equipped with a plurality of rotary cutting tools that may be made individually operative for performing a variety of machining operations.

Another object of the present invention is to provide an improved machine tool equipped with a plurality of rotary cutting tools in which the inoperative cutting tools may be stored in a minimum space and made operative individually by power operated mechanical means.

Another object is to provide an improved machine tool with a rotary spindle and having automatically operated mechanical means that are operative to replace the cutting tool in the spindle.

Another object is to provide an improved machine tool with storage facilities for a plurality of rotary cutting tools that may be made operative individually by power operated mechanical means with the desired tool being selected and located to render it accessible to the mechanical means while a preceding machining operation is being performed.

Another object is to provide a machine tool with a plurality of rotary cutting tools that may be made individually operative for performing a variety of machining operations and having an improved arrangement for controlling the machining operation when a threading tool is rendered operative.

Another object is to provide a machine tool with a group of rotary cutting tools that may be made individually operative for performing a variety of machining operations and having an improved arrangement for selecting the desired tool from the group and rendering it operative.

A further object is to provide a machine tool with a tool change arm that is automatically located in an inoperative position when not in use so that it will not interfere with the machining operations.

A further object is to provide a machine tool with a mechanical tool changer and having an improved electrical control system for automatically controlling the operation of the machine.

According to this invention the improved machine tool is equipped with a rotary spindle and a plurality of cutting tools adapted to be received by the spindle for rotation therewith to perform a machining operation. The cutting tools are stored in a magazine wherein they are carried by a rotatable ring so that they may be moved in a circular path within the magazine to locate the desired cutting tool at a tool change station where a mechanical tool changer may be operated to remove the cutting tool at the change station from the magazine and insert it into the spindle for performing the succeeding cutting operation. At the same time the tool changer removes the cutting tool that was utilized for the preceding machining operaion from the spindle and inserts it into the magazine for storage.

The magazine includes a plurality of tool storage sockets supported on the rotatable ring and each of the storage sockets carries one of the cutting tools. The ring is therefore rotated to move the desired tool to the change station where it is made available to the tool changer and such movement may take place while the preceding machining operation is being performed. The cutting tools are provided with their own identifying binary coding which is read by a reading head as each tool passes the tool change station. When the coding of the tool at the change station corresponds with the binary number impressed upon the electrical control system, the rotation of the ring is terminated, and the tool storage socket carrying the desired tool is accurately located at the tool change station. Since the coding that is read by the reading head is carried by the cutting tool itself, it is not necessary that the tools be carried by the rotatable ring in any particular sequence and they can be inserted into any of the tool storage sockets. As a result, the tool changer may insert the tool that it withdraws from the spindle into the tool storage socket which previously carried the cutting tool that is being placed into the spindle.

The foregoing and other objects of this invention, which will become more fully apparent from the following detailed description, may be achieved by means of the exemplifying apparatus depicted in and set forth in this specification in connection with the accompanying drawings, in which:

FIG. 6 is a left side elevational view of the magazine shown in FIG. 4;

FIG. 7 is a view partly in plan and partly in horizontal section taken through the center of the view of the magazine in FIG. 6;

FIG. 8 is a detail fragmentary view partly in plan and partly in horizontal section taken along the plane represented by the line 8—8 in FIG. 6;

FIG. 9 is a fragmentary detail plan view showing the detent mechanism that is depicted in FIG. 6;

FIG. 10 is a detail view of the hydraulic tool change arm actuating unit shown substantially in vertical section taken along the plane represented by the line 10—10 in FIG. 6;

FIG. 11 is a view partly in plan and partly in horizontal section taken along the plane represented by the line 11—11 in FIG. 10;

FIG. 12 is a fragmentary detail rear view illustrating the arrangement of the switches that are partially shown in FIG. 11;

FIG. 13 is a detail perspective view of the cam for actuating the switches shown in FIG. 12;

FIG. 14 is a view of the reading head, substantially in right side elevation with parts broken away to reveal the operating mechanism;

FIG. 15 is a bottom view of the reading head shown in FIG. 14, the reading head being illustrated engaging the coding on a tool;

FIG. 16 is a bottom view of the hydraulic unit depicted in FIG. 10;

Figure 1:
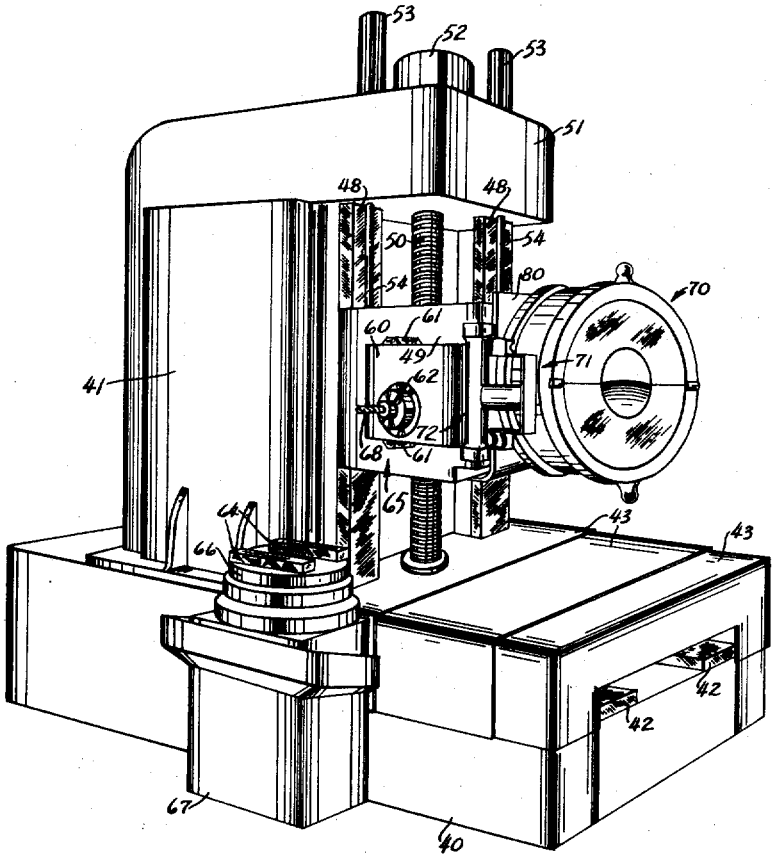
FIGURE 1 is a perspective view of a machine tool incorporating the features of the present invention.
Figure 29:
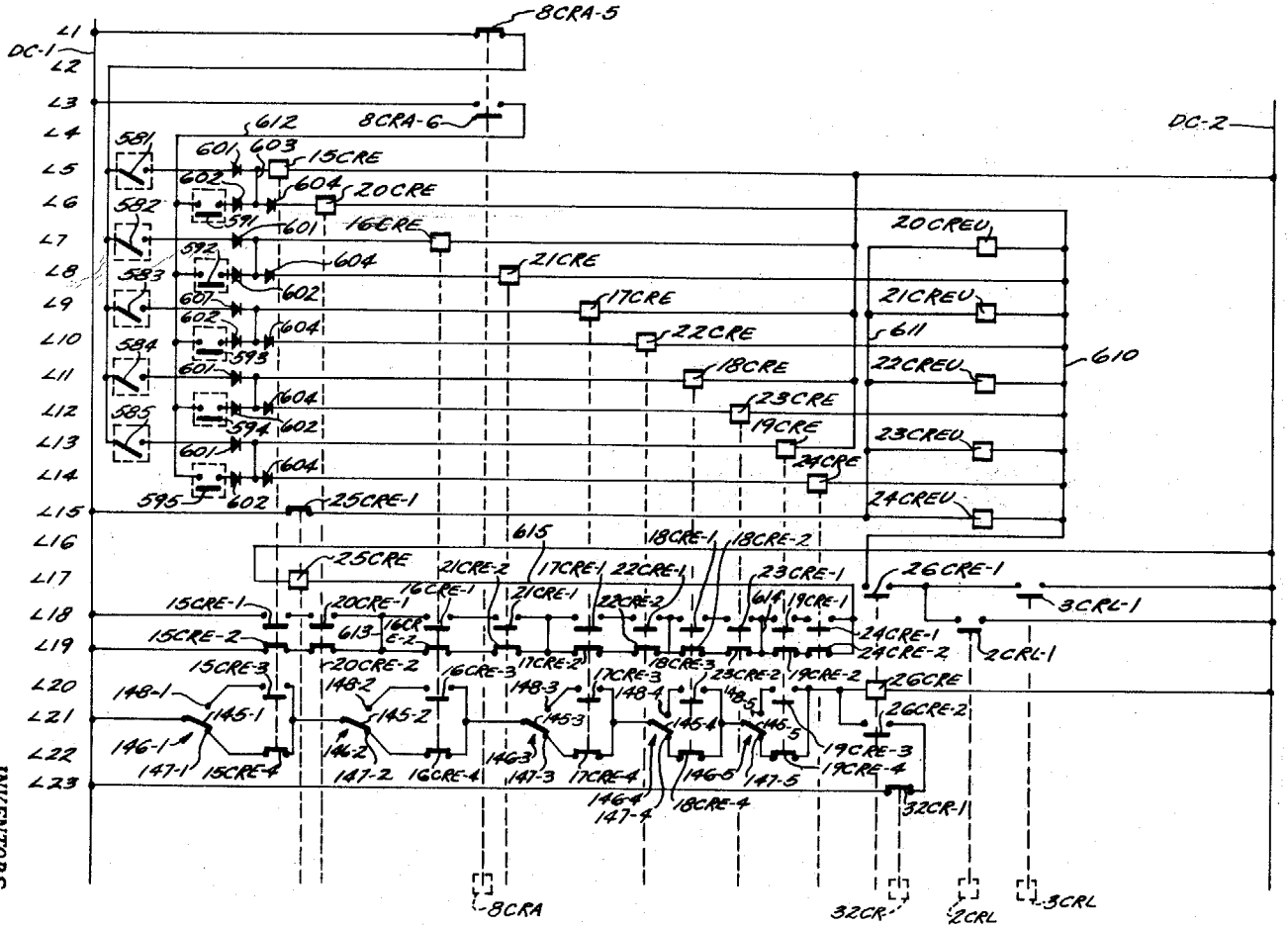
Figure 30:
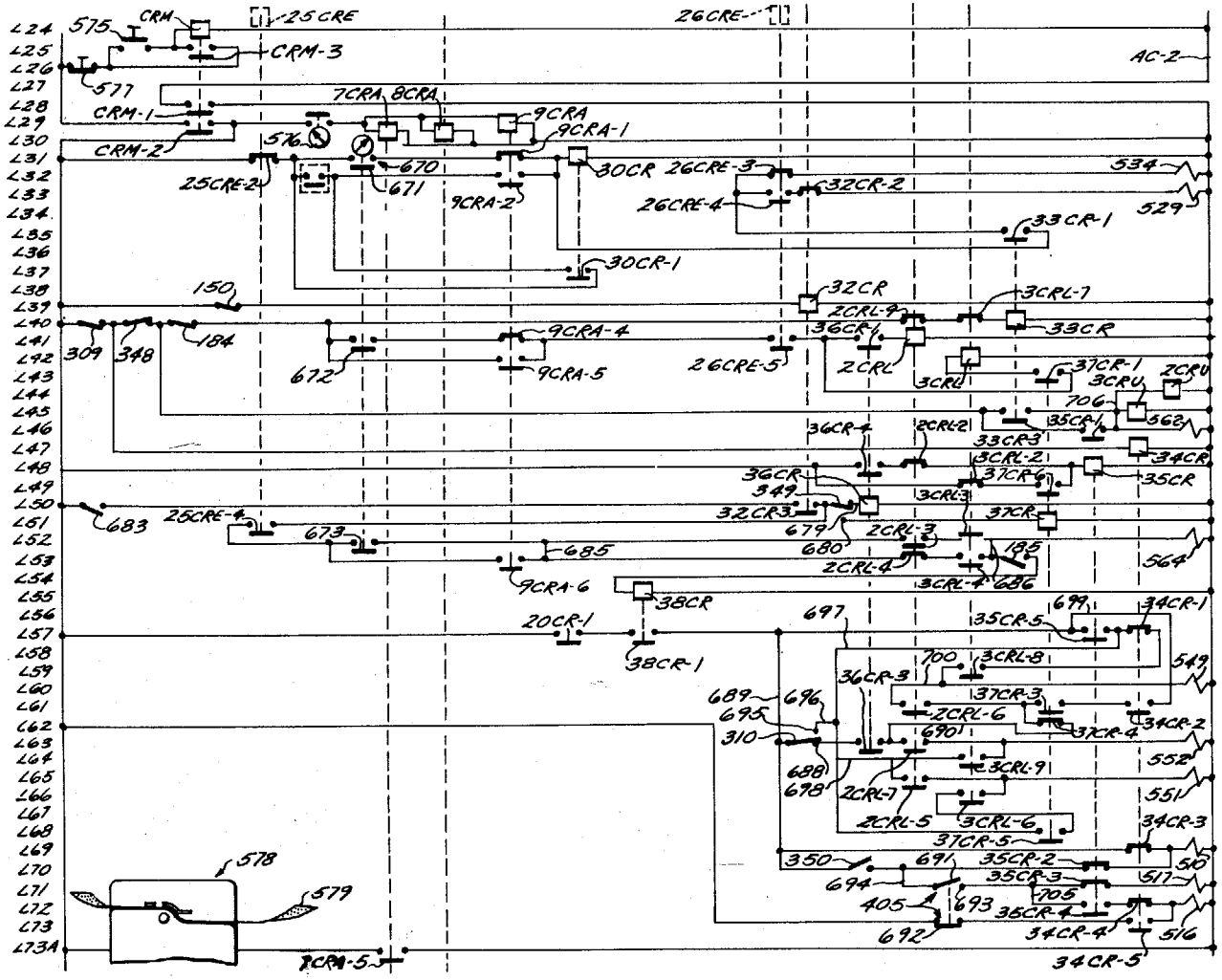
Figure 31:
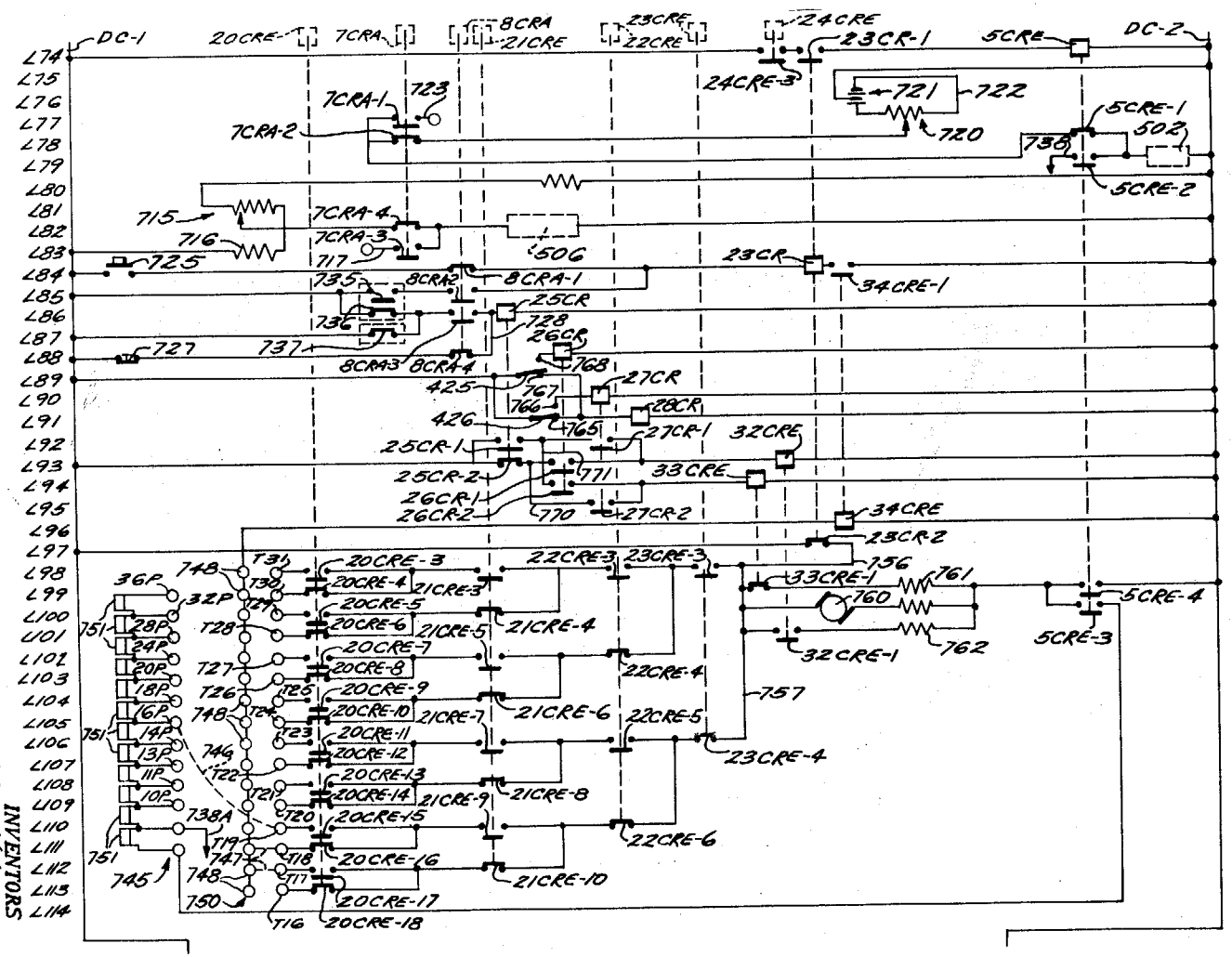
Figure 35:
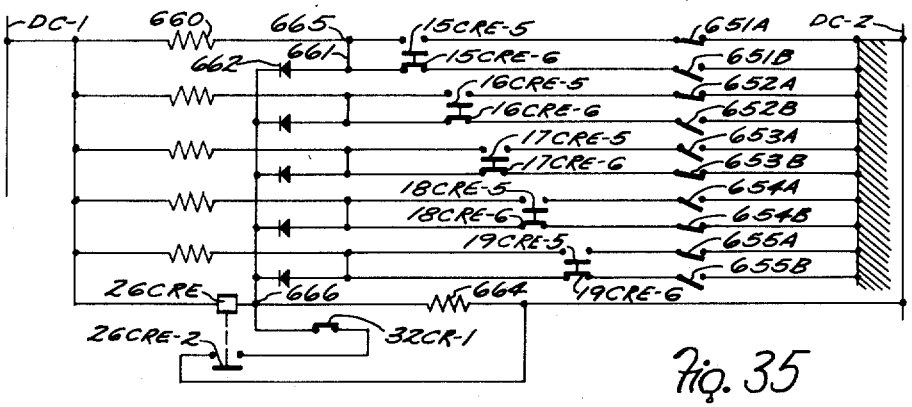
Figure 32:
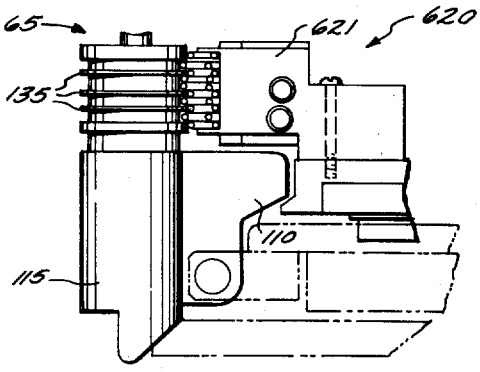
Figure 33:
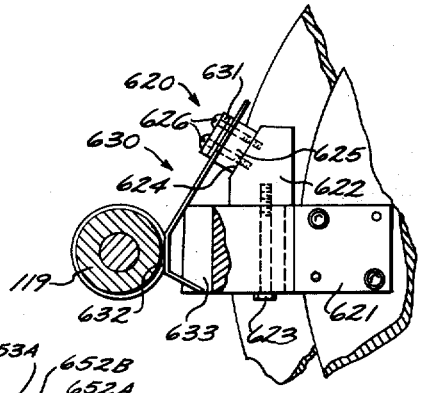
Figure 34:
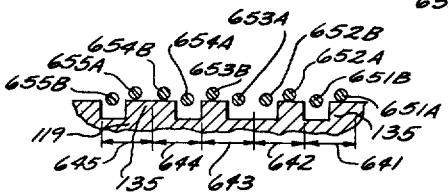
Figure 36:
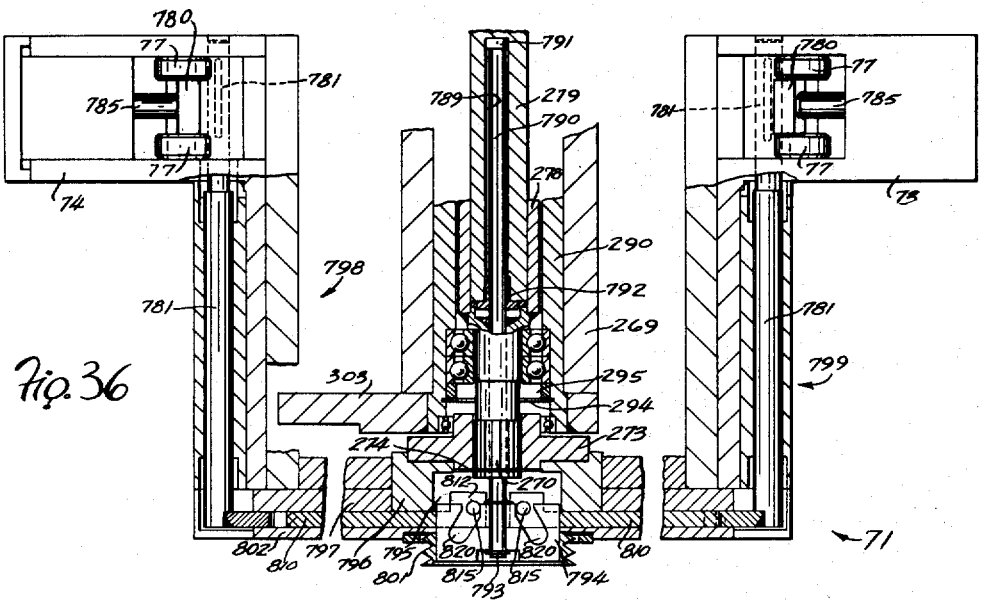
Figure 37:
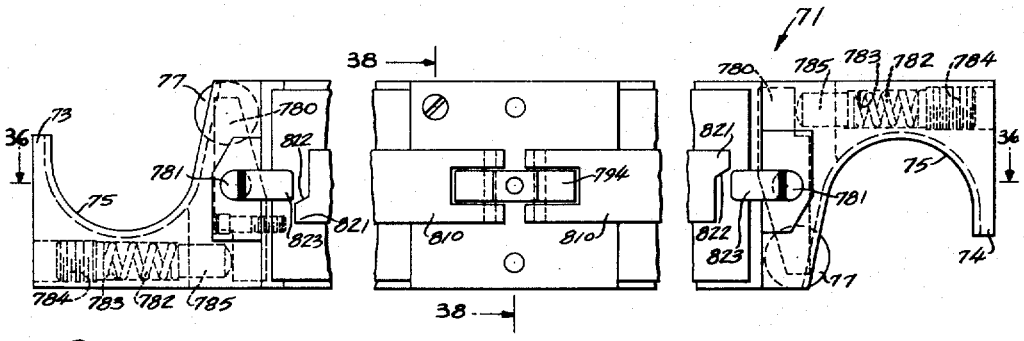
Figure 39:
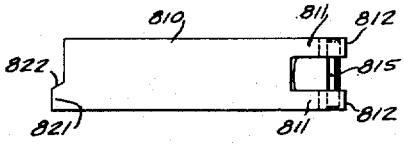
Figure 38:
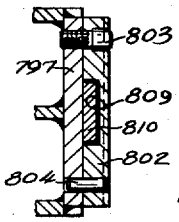

FIGS. 20 to 20E inclusive are a series of diagrammatic perspective views of the front of the spindle and magazine of the machine tool shown in FIG. 1, illustrating the various steps in the cycle of operation of the tool change arm in changing the cutting tool in the spindle;

FIG. 21 is a diagrammatic view of the hydraulic circuit;

FIGS. 22 to 28 inclusive are a series of diagrammatic views illustrating the operation of the hydraulic unit in producing the several rotary positions of the tool change arm;

FIGS. 22A to 28A inclusive are a series of diagrammatic views showing the several rotary positions of the tool change arms corresponding to the positions of the actuating plunger of the hydraulic unit as shown in FIGS. 22 to 28 respectively;

FIGS. 22B to 28B inclusive are a series of diagrammatic views of the switch actuating cam in relation to the switch rollers which are actuated by it as seen from the front and which rotates with the tool change arm, the cam being shown in its various rotary positions corresponding to the rotary positions of the tool change arm as depicted in FIGS. 22A to 28A respectively;

FIG. 29 is a diagrammatic view of the electrical circuit for selecting the desired tool for location at the tool change station;

FIG. 30 is an electrical wiring diagram illustrating the control circuit for controlling the operation of the various components in completing a tool change;

FIG. 31 is an electrical wiring diagram of the control circuit employed for controlling the performance of a threading operation;

FIG. 32 is a detail bottom view of an alternate form of reading head for reading the identifying coding on the tools in the storage magazine;

FIG. 33 is a view in side elevation illustrating the reading head shown in FIG. 32;

FIG. 34 is an enlarged fragmentary sectional view of the coding arrangement on a tool in relation to the electrical brushes employed with the reading head depicted in FIG. 32;

FIG. 35 is an electrical wiring diagram showing the tool selection circuit utilized with the reading head that is illustrated in FIG. 32;

FIG. 36 is a detail view of the tool change arm shown substantially in section taken along the plane represented by the line 36—36 in FIG. 37;

FIG. 37 is a front view of the tool change arm shown in FIG. 36 with the outer plate omitted to reveal the mechanism underneath it;

FIG. 38 is a fragmentary view in section taken along the plane represented by the line 38—38 in FIG. 37 to illustrate the mounting of the slide in the front plate of the tool change arm; and, FIG. 39 is a detail front view of the slide which is shown assembled to the tool change arm in FIGS. 36 and 37.

Reference is now made more particularly to the drawings and specifically to FIG. 1 thereof illustrating a machine tool incorporating the features of the present invention. The machine comprises generally a bed 40 which slidably supports an upstanding column 41. To this end, the bed 40 is provided with horizontal ways 42 which are engaged by complementary ways (not shown) formed at the bottom of the column 41 to support the column for sliding movement along the length of the bed 40. A plurality of slidable plates 43 are attached to the bed 40 and the column 41 in telescoping arrangement so as not to interfere with the longitudinal movement of the column 41 while providing a protective covering over the ways 42 to prevent the chips which are formed during a machining operation from falling onto the ways 42.

The column 41 is provided with vertical ways 48 for engagement by complementary ways (not shown) formed on a saddle 49 for slidably supporting the saddle in a vertical path of travel. Vertical movement of the saddle 49 in either direction is effected by rotating a screw 50 which is in threaded engagement with a recirculating ball bearing thread nut (not shown) that is fixed to the saddle 49. The screw 50 is rotatably supported by the column 41, being journalled at its upper end in a cap 51 that is secured to the top of the column 41 and which extends from the column beyond the ways 48 for receiving the screw 50. The lower end of the screw 50 is journalled in a suitable bearing (not shown) that is attached to the column 41 beneath the top of the bed 40. The screw 50 may be rotated in either direction by a motor 52 mounted on top of the cap 51 and connected to rotate the screw 50 for actuating the saddle 49 in its path of travel by power. A pair of hydraulic piston and cylinder mechanisms 53 are mounted on top of the cap 51 for connection to the saddle 49 by connecting rods 54 and are arranged in a well known manner to counterbalance the weight of the saddle 49 and its associated mechanism.

A spindle head or tool head 60 which constitutes the operating station of the machine tool, is carried by the saddle 49 and is provided with horizontal ways 61 which engage complementary ways formed within the saddle 49 for supporting the spindle head 60 for a sliding cross feed movement in a horizontal path transverse to the direction of travel of the column 41. It is therefore apparent that the column 41, the saddle 49 and the spindle head 60 are each supported for movement in three mutually transverse paths of travel. The spindle head 60 rotatably supports a spindle 62 that is adapted to carry a tool 65 to rotate with the spindle 62 for performing a machining operation. The spindle 62 is rotated by a suitable motor (not shown) in a well known manner.

The spindle 62 supports the tool 65 in position to operate upon a workpiece (not shown) located on a rotary index table 66 which is mounted on the top of a pedestal 67 that is secured to the front face of the bed 40. In the illustrated embodiment, the rotary table 66 is adapted to receive the workpieces attached to pallets (not shown) which are transported to the table 66 onto a pair of rails 64 by a suitable conveyor (not shown) and clamped to the rails for completely automatic operation. However, it is to be understood, that a conventional rotary index table may be provided with each individual workpiece being clamped thereto manually by the operator.

The machine tool illustrated in FIG. 1 is equipped with an automatically operable mechanical tool changer mounted on the saddle 49 and constructed in accordance with the teachings of the present invention. To this end, a plurality of tools 65, each having a different cutter 68, are stored in a magazine generally identified by the reference numeral 70. A tool change arm 71 is carried by a hydraulic unit 72 which serves to actuate the tool change arm 71 for performing its function of withdrawing a selected tool 65 from the magazine 70 and inserting it into the spindle 62 to render it operative for performing a machining operation. At the same time, the tool change arm 71 operates to withdraw the tool 65 already located in the spindle 62 and places it in the magazine 70 for storage.

Figure 2:
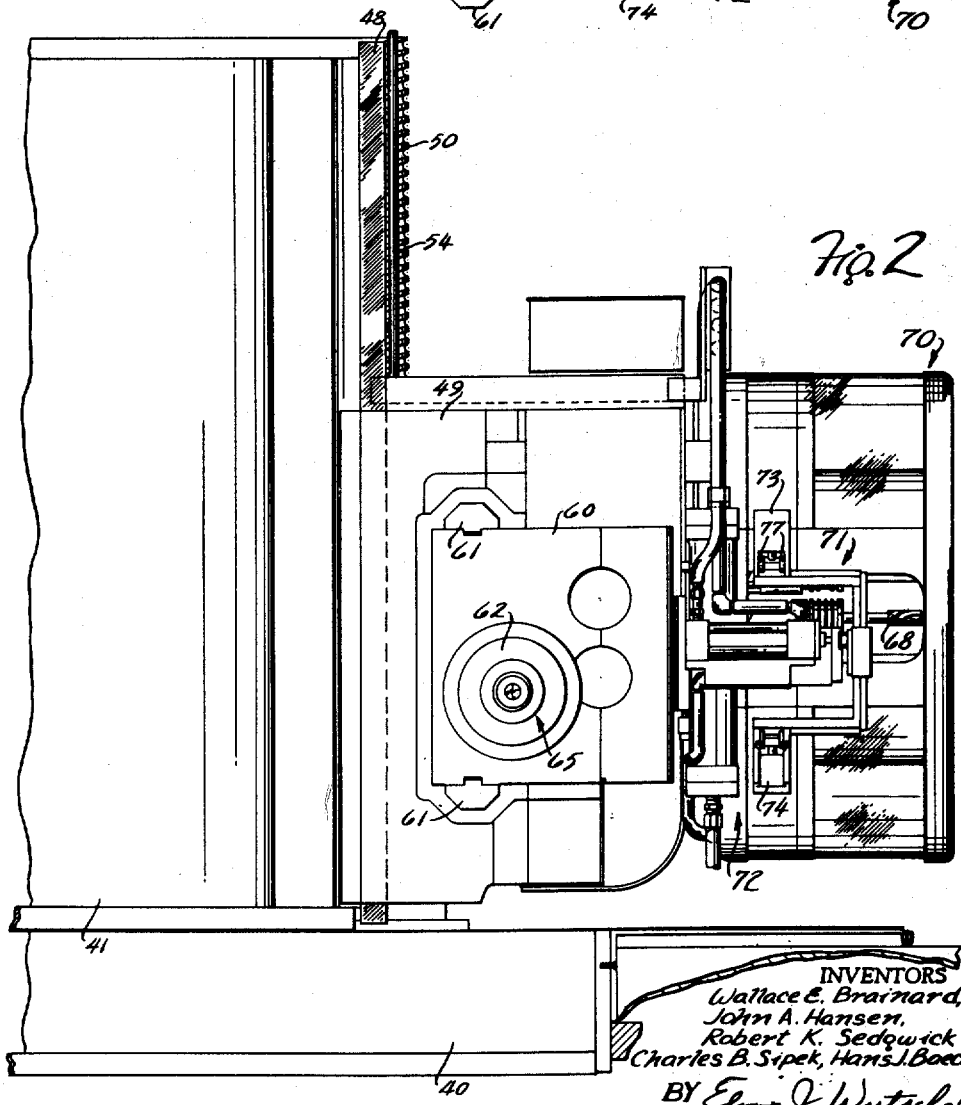
FIG. 2 is a fragmentary front view of the machine shown in FIG. 1, illustrating the saddle and magazine with the tool change arm being depicted in its inoperative position.

The hydraulic unit 72 is hingedly carried by the tool changer for pivotal movement about a vertical axis for the purpose of swinging the tool change arm 71 from an inoperative to an operative position, the inoperative position serving to locate the tool change arm 71 and its associated hydraulic unit 72 in a position where they will not interefere with the movement of the spindle head 60 for performing a machining operation. FIGS. 1 and 2 illustrate the hydraulic unit 72 swung to locate the tool change arm 71 in its inoperative position out of the path of travel of the spindle head 60, being located against the peripheral face of the magazine 70. When a tool change is to be effected, the hydraulic unit 72 is pivoted to the left as viewed in FIG. 2 to swing the tool change arm 71 outwardly 90° from the position shown in FIG. 2 to the position depicted in FIG. 3 where it is properly located for performing a tool changing operation.

The tool change arm 71 is a U-shaped member with one leg of the U being provided with a tool grip or carrier 73 and the other leg being provided with an identical tool grip or carrier 74, the two grips 73 and 74 extending outwardly and transversely of the legs of the U-shaped tool change arm 71. The tool grips 73 and 74 are each provided with a pair of substantially semicircular surfaces 75 for receiving a collar 119 secured to each tool 65. The tool grips 73 and 74 are provided with rollers 77 for yieldably retaining the tools 65 within the semicircular surfaces 75 in a manner to be substantially described.

FIGS. 20 to 20E inclusive diagrammatically illustrate a cycle of operation of the tool change arm 71 in replacing a tool 65 in the spindle 62. FIG. 20 shows the tool change arm 71 in its inoperative position located against the peripheral face of the drum 70. In response to a proper signal, the hydraulic unit 72 is pivoted about a vertical axis in a clockwise direction as viewed from the top to swing the tool change arm 71 90° from its inoperative position to its operative position as illustrated in FIG. 20A. While the tool change arm 71 is pivoting outwardly to the position shown in FIG. 20A, the selected tool 65 is also pivoted outwardly of the magazine 70 to render it accessible to the tool change arm 71 as depicted in FIG. 20A.

When the tool change arm is swung outwardly by the hydraulic unit 72 it is in a vertical position as shown in FIG. 20A and it is then rotated about a horizontal axis by the hydraulic unit 72 in a clockwise direction as viewed from the front of the machine. Such rotation moves the tool change arm 71 to the position shown in FIG. 20B wherein the grip 73 is in engagement with the tool 65 that is extending from the magazine 70 and the grip 74 is in engagement with the tool 65 that is carried by the spindle 62. It will be observed that the tool 65 that is extending from the magazine 70 is provided with a milling cutter 68' while the tool 65 located in the spindle 62 is provided with a drill 68, and the illustrated cycle shows the tool change arm 71 replacing the drill 68 in the spindle 62 by the tool 65 carrying the milling cutter 68'.

With the tool change arm 71 positioned as illustrated in FIG. 20B, the grips 73 and 74 have grasped the two tools 65 for the purpose of withdrawing them from the spindle 62 and the magazine 70. The tool change arm 71 is therefore moved forwardly by the hydraulic unit 72 and the two tools 65 move with it out of the spindle 62 and the magazine 70 as shown in FIG. 20C.

After the two tools have been extracted from the spindle 62 and magazine 70, the tool change arm 71 is rotated 180° in a clockwise direction as viewed from the front of the machine and as indicated by the arrows in FIG. 20C to the position depicted in FIG. 20D wherein the drill 68 has been moved from alignment with the spindle 62 into alignment with the magazine 70, and the milling cutter 68' has been moved from alignment with the magazine 70 into alignment with the spindle 62.

When the drill 68 and the milling cutter 68' have been thus realigned by one half of a revolution of the tool change arm 71 the latter will be retracted toward the machine to insert the two tools 65 into the spindle 62 and magazine 70 as illustrated in FIG. 20E so that the milling cutter 68' is inserted in the spindle 62 and the drill 68 is moved into the magazine 70 as shown in FIG. 20E.

From the position shown in FIG. 20E, the tool change arm 71 is moved in a counterclockwise direction as indicated by the arrows in FIG. 20E to return it to the vertical position depicted in FIG. 20A, the tool grips 73 and 74 being thus moved out of engagment with the respective tools 65 and the tool change has been completed, the drill 68 having been replaced in the spindle 62 by the selected milling cutter 68'.

Although the tool change arm 71 is in the vertical position illustrated in FIG. 20A it is extending from the machine and would interfere with the permanance of a machining operation. The hydraulic unit 72 is therefore pivoted in a counterclockwise direction as viewed from the top to swing the tool change arm 71 to its inoperative position against the peripheral face of the magazine 70 as illustrated in FIG. 20. As the tool change arm 71 is being swung to its inoperative position, the tool 65 that has been placed in the magazine 70 is likewise pivoted into the magazine 70 for storage and the latter may be operated in a manner to be subsequently described for selecting the succeeding tool which is to be placed in the spindle 62 by the tool change arm 71.

A plate 80 shown in FIG. 1 is secured to the right side of the saddle 49, and the magazine 70, in turn, is mounted on the plate 80 for movement with the saddle 49 in its vertical path of travel. The detailed construction of the magazine 70 is clearly shown in FIGS. 4 to 7 inclusive and comprises a tool carrying ring 81 rotatably supported between a front plate 82 and a back plate 83. The tool carrying ring 81 is provided with an integrally formed internal ring gear 84 and is rotatably supported by a pair of ball bearings 85 and 86 located on either side of the ring gear 84. The front plate 82 and the back plate 83 are provided with annular shoulders that bear on the inner races of the ball bearings 85 and 86 respectively while the tool carrying ring 81 is likewise provided with a pair of annular shoulders upon which the outer races of the bearings 85 and 86 bear. With this arrangement, the tool carrying ring 81 is firmly supported between the front plate 82 and the back plate 83 but is freely rotatable therebetween.

The back plate 83 is provided with a central opening 91 to form a recess for receiving a portion of the operating mechanism that will be subsequently described. The opening 91 is defined by a hub 92 that extends laterally of the back plate 83 toward the inner surface of the front plate 82. A plurality of cap screws 93 extend through suitable openings in the front plate 82 into threaded engagement with the hub 92 to operably secure the front plate 82, the tool carrying ring 81, the back plate 83, and the ball bearings 85 and 86 in the proper relationship. As shown in FIG. 6, the upper portion of the back plate 83 is provided with threaded openings 94 while similar threaded openings 95 are formed in the lower portion of the back plate 83 for receiving suitable screws which serve to attach the magazine 70 to the plate 80 for mounting the magazine 70.

The purpose of the tool carrying ring 81 is to carry the variety of tools 65 in storage and to transfer or move the selected tools individually to a tool change or ready station 105 where they may be made accessible to the tool change arm 71. To this end, the ring 81 is provided with an outwardly extending annular ledge 106 upon which are fixedly mounted a plurality of brackets 107 in equally spaced relationship and which extend radially outwardly of the ring 81. Each of the brackets 107 includes a pair of spaced outwardly extending legs 108 which rigidly carry a pin 109 that extends across the gap between each pair of legs 108.

A plate 110 is provided with a suitable opening for receiving the pin 109 and is straddled by the legs 108 so that it is pivotally supported by the bracket 107 with one plate 110 being carried by each of the plurality of brackets 107. A plurality of tool storage sockets 115 are provided, with a plate 110 being secured to the peripheral surface of each of the tool storage sockets 115, the latter being utilized for receiving the variety of tools 65 so that each of the tools 65 that are available for operation with the machine may be stored within the magazine 70 by insertion into one of the tool storage sockets 115. In the illustrated embodiment, thirty tool storage sockets 115 are shown to accommodate the storage of thirty tools 65 and since one of the tools 65 may be located in the spindle 62, thirty-one different tools 65 may be made available. It is to be understood that 30 tool storage sockets 115 are shown as an exemplary embodiment only but other quantities may be provided to suit the requirements of a particular application. Furthermore, only two tools 65 are illustrated as being contained within two storage sockets 115 for the purpose of convenience but such tools 65 may be contained in all or any portion of the storage sockets 115.

Figure 17:
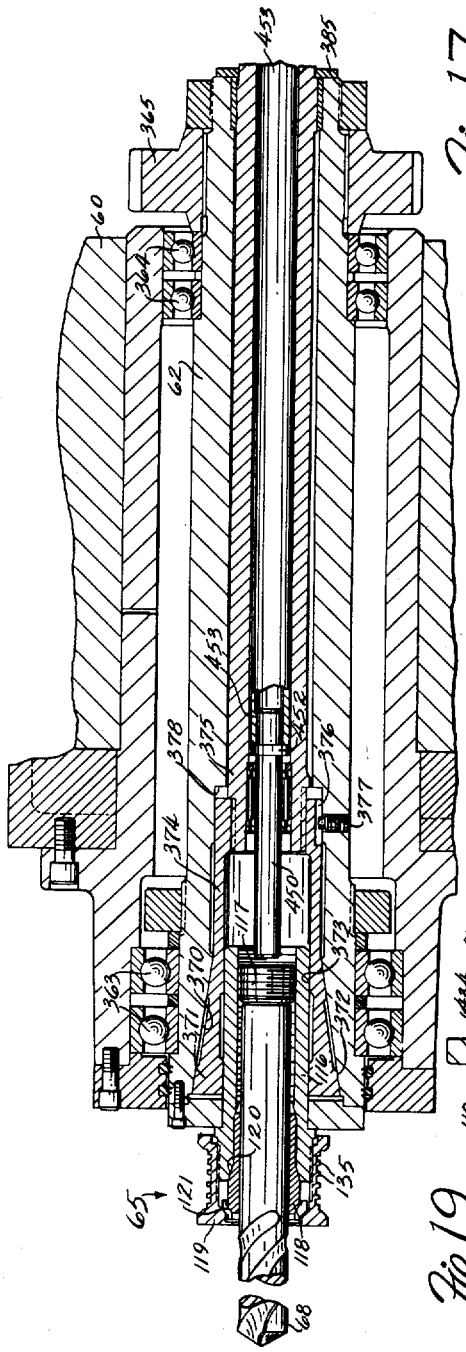
FIG. 17 is a detail view partly in side elevation and partly in vertical section illustrating the forward portion of the machine tool spindle.

The tool 65 has been referred to generally but, as shown in FIG. 17, it comprises the cutter 68 extending into a cylindrical shell 116 which is provided with an internal thread for receiving a plug 117 against which the rearmost end of the cutter 68 is abutted. The forward end of the bore of the shell 116 is enlarged for receiving a longitudinally split sleeve 118 that embraces the periphery of the cutter 68.

The periphery of the forward end of the shell 116 is provided with an external thread for threadedly receiving a collar 119 that serves to compress the split sleeve 118 for locking the cutter 68 to the shell 116. To this end, the sleeve 118 is provided with two tapered annular surfaces 120 and 121 which are engaged by cooperating tapered annular surfaces formed on the shell 116 and the collar 119 respectively. As the collar 119 is threaded onto the shell 116, the several cooperating tapered surfaces are engaged to compress the sleeve 118 about the cutter 68 to rigidly clamp the cutter 68 to the shell 116. The cutting portion of the cutter 68, of course, extends forwardly of the collar 119 so that it may engage a workpiece for performing a machining operation.

In order to store one of the tools 65 in a storage socket 115, the portion of the shell 116 that extends rearwardly of the collar 119 is inserted into the axial bore of the storage socket 115. The tool 65 is yieldably retained within the socket 115 by a plunger 125 that is located within a bore formed in the plate 110 with its axis extending transversely of the axis of the socket 115. A spring 126 has one end bearing against the plunger 125 and is compressed by a plug 127 that is threaded into the bore containing the spring 126. The plunger 125 also extends through a suitable transverse opening formed in the storage socket 115 so that it is forced into engagement with the periphery of the shell 116 within the tool storage socket 115 to yieldably retain the tool 65 therein.

The tool 65 which is selected for insertion into the spindle 62 by the tool change arm 71 must be moved to the tool ready station 105 of the magazine 70 and this is accomplished by power through the operation of a motor 130. A hydraulic motor is shown as an exemplary embodiment although it is to be understood that an electric motor could likewise be utilized for this purpose. An output shaft 131 of the motor 130 is connected to drive a gear train generally identified by the reference numeral 132 and which includes a gear 133 that meshes with the internal ring gear 84 of the tool carrying ring 81. As a result, actuation of the motor 130 will serve to rotate the ring 81 to move the tool storage sockets 115 and the tools 65 which they carry, in a circular path.

Each of the tools 65 is identified by a number from one to thirty-one inclusive and they are each coded in accordance with the binary system to indicate the number of the tool. Of course, as is well known in the art, only two numerals, 0 and 1, are used in the binary numbering system, and since thirty-one numbers are required in the illustrated embodiment, five digits of the binary system must be provided. Thus, the number 00001 will identify tool No. 1, while the binary number 11111 will identify tool No. 31. Five peripheral strips about the collar 119 are therefore designated to constitute the coding, with each of the strips representing one of the digits of the binary system in the present example. Each of these peripheral strips may be provided with a peripheral land or ring 135 to indicate the numeral 1 for the particular digit of the binary number, and the absence of a peripheral land 135 along any of the peripheral strips indicates the numeral 0 for that particular digit of the binary system.

Such coding of the tools 65 is read by a tool selector or reading head generally identified by the reference numeral 140. Prior to actuating the motor 130 for rotating the ring 81, the identification number of the desired tool is impressed upon the electrical control system either manually or automatically in a manner to be later described. Then, as the ring 81 is rotated, the tool reading head 140 will read the code on the collars 119 and when the number read on the collars 119 by the heading head 140 coincides with the number impressed upon the electrical control system, the electrical control system will operate to deactuate the motor 130 and thereby stop the rotation of the ring 81. As best shown in FIGS. 14 and 15, the tool reading head 140 includes five movable fingers 141 that extend from a housing 142 into engagement with five peripheral strips on the collars 119 of the tools 65 that have been designated to contain the coding for identifying each tool. Each of the fingers 141 is yieldably urged forwardly into engagement with the collars 119 by a spring 143 that urges its associated finger 141 into the path of travel of the collars 119 as they move in their circular path of travel with the rotation of the ring 81.

Each of the fingers 141 includes a rod 144 that extends rearwardly into the housing 142. The end of each of the rods 144 is connected to a movable contact bar 145 of a switch that is generally identified by the reference numeral 146. The switches 146 are double throw switches and each is provided with two stationary contacts 147 and 148. The springs 143, as previously mentioned, urged their associated fingers 141 forwardly and the movable contact bar 145 moves with its associated finger 141 into contact with the stationary contact 147. A closed contact is therefore normally maintained between the movable contact bar 145 and the stationary contact 147. As the collars 119 move in their circular path, the five fingers 141 are in alignment with the five peripheral strips on the collars 119 which contain the coding of the tool.

As each of the collars 119 passes by the fingers 141 the peripheral strips that carry the coding on the collar contact one of the fingers 141. If a land 135 appears on any of the peripheral strips, the fingers 141 cooperating with these particular peripheral strips will be engaged by the lands 135 and moved rearwardly toward the housing 142 against the force of the spring 143 to move their associated contact bars 145 out of engagement with the contacts 147 and into engagement with the contacts 148. In the absence of a land 135 on the particular strip associated with a finger 141, the latter will fail to be actuated and its movable contact bar 145 will remain in engagement with the contact 147. Therefore, the presence of a land 135 on a particular peripheral strip of the collar 119 will actuate the finger 141 to move its contact bar 145 out of engagement with the contact 147 and into engagement with the contact 148 to indicate the numeral 1 for the particular digit of the binary system which that peripheral strip on the collar 119 represents. On the other hand, in the absence of a land 135 on the same peripheral strip of the collar 119, the finger 141 will not be actuated so that the contact bar 145 will remain in engagement with the contact 147 to indicate the numeral 0 for this same digit of the binary number.

For example, it will be observed in FIG. 15 that the collar 119 there shown has a land 135 on each of the first four peripheral strips which contain the coding while the fifth peripheral strip has no such land 135. The first four fingers 141 have therefore been actuated rearwardly to indicate the numeral 1 for the first four digits of the binary number. The fifth finger 141 has not been so actuated by reason of the fact that the peripheral strip on the collar 119 with which it cooperates does not include a land 135 and this fifth digit of the binary number will therefore be a 0. The coding on the collar 119 has therefore indicated the binary number 01111 to signal the presence at the operating station of the tool that is identified as No. 15.

When the number impressed upon the tool reading head 140 by the coding on the particular collar 119 coincides with the number impressed upon the electrical control system for selecting the desired tool, the motor 130 will be deactuated to terminate the forward rotation of the ring 81. When this occurs the ring 81 will have overrun the desired position so that the selected tool 65 will be slightly beyond the tool change station 105. The electrical control system therefore operates to immediately effect a reversal of the rotation of the motor 130 at a creep rate until the desired tool 65 is accurately located at the tool change station 105, the reverse rotation of the motor 130 being terminated by actuation of a limit switch 150 which is shown in FIG. 4.

Figure 4:
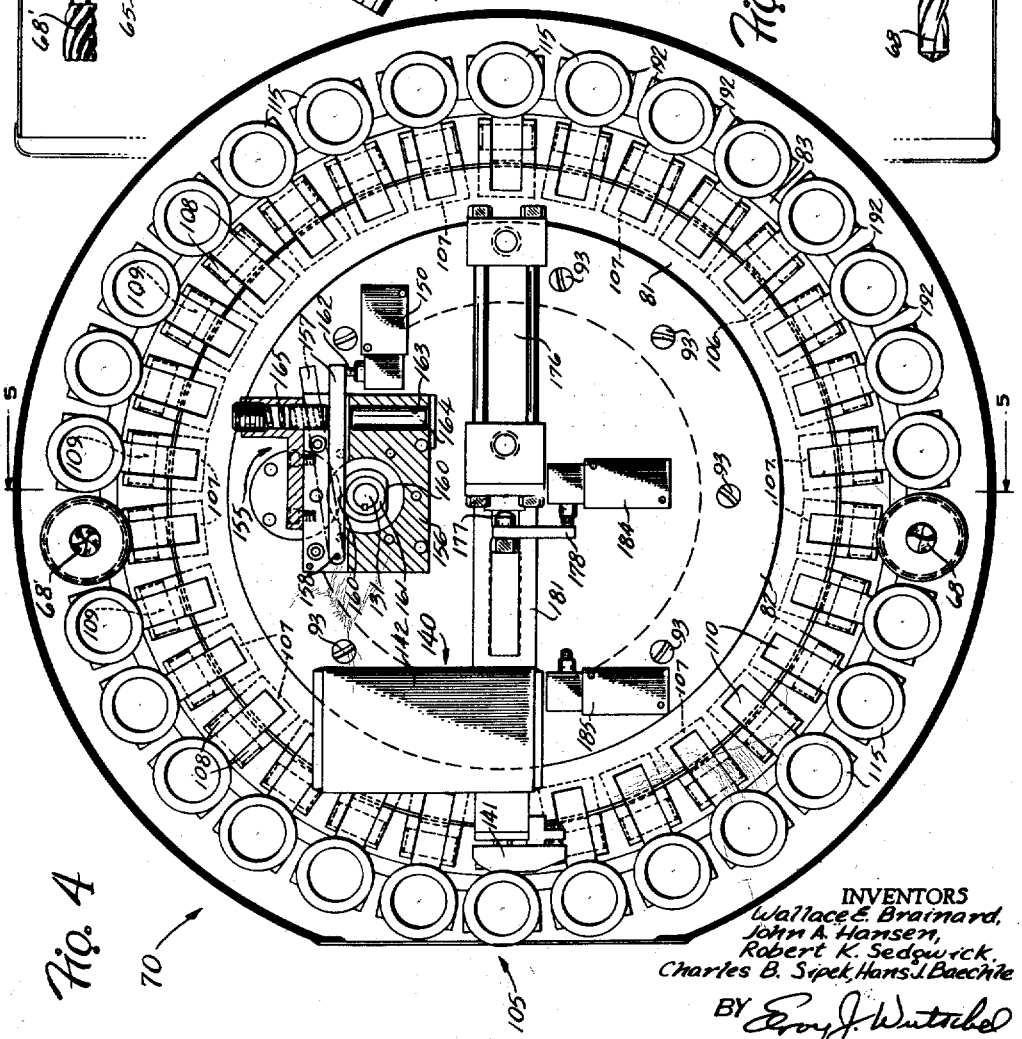
FIG. 4 is a detail view mostly in right side elevation illustrating the tool storage magazine which is shown assembled to the machine in FIG. 1.

The precise control of the motor 130 for accurately locating the selected tool 65 at the tool change station 105 is achieved by means of the unique positioning mechanism illustrated in FIG. 4 and generally identified by the reference numeral 155. The positioning mechanism 155 comprises a housing 156 that pivotally supports a rocker arm 157 by means of a pin 158 which is carried by the housing 156 and is in pivotal engagement with one end of the rocker arm 157. The rocker arm 157 overlies a pair of flats 160 that are formed on a coupling sleeve 161 which is keyed to rotate with the output shaft 131 of the motor 130. The rocker arm 157 extends from the pin 158 across the housing 156 and beyond its edge where it is disposed to engage a plunger 162 of the limit switch 150 for the purpose of actuating the switch.

During forward operation of the motor 130 hydraulic pressure is admitted to the lower end of a cylinder 163 which is formed in the housing 156, the hydraulic pressure serving to force a plunger or actuator 164 that is located in the cylinder 163 upwardly. The plunger 164 is disposed to engage the rocker arm 157 and as the plunger 164 is moved upwardly by the hydraulic pressure, it functions to pivot the rocker 157 upwardly to the position shown by broken lines in FIG. 4 out of engagement with the coupling sleeve 161 so that it will not interfere with the rotation of the sleeve. The force transmitted through the plunger 164 operates against a spring 165 that yieldably applies pressure on the opposite side of the rocker arm 157 to urge it toward its downward pivotal position. When the forward rotation of the motor 130 is terminated, and during the reverse rotation of the motor 130 at a creep rate, the hydraulic pressure is withdrawn from the cylinder 163 and the spring 165 takes over to pivotally move the rocker arm 157 against the coupling sleeve 161.

Each half revolution of the output shaft 131 of the motor 130 operates to rotate the ring 81 through an angle of 12° so that one of the tool storage sockets 115 is moved out of the tool change station 105 and the succeeding storage socket 115 is brought into alignment with the tool change station 105. The coupling sleeve 161 is so arranged that when either one of the flats 160 is in alignment with the bottom surface of the rocker arm 157, so that the two surfaces are in full bearing engagement, a tool storage socket 115 is accurately located at the tool change station 105. When one of the flat surfaces 160 of the coupling sleeve 161 is not thus aligned with the bottom surface of the rocker arm 157, the diameter of the sleeve 161 will engage the bottom surface of the rocker arm 157 and prevent the spring 165 from forcing the rocker arm 157 to its lowermost position and the end of the rocker arm 157 will therefore not engage the plunger 162 of the limit switch 150. However, when one of the flat surfaces 160 of the coupling sleeve 161 comes into alignment with the bottom surface of the rocker arm 157 as the motor 130 is rotating in a reverse direction at a creep rate, the spring 165 forces the rocker arm 157 to its lowermost position as permitted by the associated flat 160, and the rocker arm 157 engages the plunger 162 to actuate the limit switch 150.

Actuation of the limit switch 150 serves to de-energize a solenoid valve for terminating operation of the motor 130, and one of the tool storage sockets 115 containing the selected tool 65 will then be accurately positioned at the tool change station 105. The tool change mechanism may then be operated to replace the tool 65 in the spindle 62 with another tool 65 withdrawn from the tool storage socket 115 at the tool change station 105. It is to be understood that the rotation of the ring 81 to position the selected tool at the tool change station 105 may occur while a machining operation is being performed with the tool 65 that is in the spindle 62 and that when such machining operation is completed the succeeding desired tool 65 will be located at the tool change station 105 and the tool change mechanism may be operated immediately to effect the tool change in the spindle 62.

It will be observed that the diameter of the magazine 70 is kept to a minimum by carrying the tool storage sockets 115 within the magazine for storing the cutters 68 with their axes substantially parallel to the axis of the magazine. As previously described, however, each of the tool storage sockets 115 is pivotally supported by one of the brackets 107. In order to lock the tool storage sockets 115 in their storage position with their axes substantially parallel to the axis of the magazine, the back end of each of the storage sockets 115 is provided with a beveled surface 170 which engages a complementary annular beveled surface 171 formed on the periphery of the back plate 83. As the ring 81 is rotated, the beveled surfaces 170 of the several tool storage sockets 115 slide along the stationary beveled surface 171 of the back plate 83 and such engagement with the beveled surface 171 prevents the sockets 115 from pivoting in an outward direction. The beveled surface 171 extends about the entire periphery of the back plate 83 with the exception of the portion at the tool change station 105 where it is broken to permit the outward pivotal movement of the socket 115 at that station.

In order to effect a tool change the storage socket 115 at the tool change station 105 and containing the selected tool 65 must be pivoted outwardly so that the axes of the socket 115 and its associated tool 65 extend substantially perpendicular to the axis of the magazine. The tool storage socket 115 must therefore be pivoted approximately 90° to move its associated tool 65 outwardly of the periphery of the magazine. Such movement of the selected storage socket 115 is produced by a pivot mechanism generally identified by the reference numeral 175 and located at the tool change station 105.

The pivot mechanism 175 is clearly shown in FIGS. 6 and 7, and is actuated by a piston and cylinder mechanism 176 which is mounted on the front plate 82. The piston and cylinder mechanism 176 includes a piston rod 177 having a plate 178 fixed to its extending end. The plate 178 is attached to a plunger 180 which is slidably supported for axial movement by a guide 181 that is carried by the front plate 82. The plunger 180 is provided with a beveled end 182 for engagement with a complementary inclined surface 183 formed on the plate 110, one plate 110 being attached to each of the tool storage sockets 115 as previously described.

The plunger 180 is shown in its retracted position in FIG. 7, the connecting rod 177 being withdrawn into the piston and cylinder mechanism 176. When the selected tool 65 is located at the tool change station 105, the piston and cylinder mechanism 176 is actuated to move the connecting rod 177 to the right, as viewed in FIG. 7 to move the plunger 180 with it. The beveled end 182 of the plunger 180 then engages the inclined surface 183 of the plate 110, and as the movement of the plunger 180 continues to the right, it pivots the tool storage socket 115 in a counterclockwise direction, as viewed in FIG. 7, to the position illustrated by broken lines. With the tool storage socket 115 in this position, with its axis substantially normal to the axis of the magazine 70, the tool 65 extends outwardly of the magazine 70 in position to be engaged by one of the tool grips 73 or 74 of the tool charge arm 71.

In order to condition the electrical control system for the succeeding sequences of the cycle, the plate 178 extends laterally of the connecting rod 177, as shown in FIG. 4, in position to engage the plungers of a pair of limit switches 184 and 185. When the plunger 180 is retracted, as illustrated in FIGS. 4 and 7, the plate 178 engages the plunger of the limit switch 184 to actuate the switch. As the connecting rod 177 moves forwardly, the plate 178 releases the plunger of the limit switch 184 and when the plunger 180 reaches its forward limit of movement, the plate 178 engages the plunger of the limit switch 185 to actuate the switch for the purpose of indicating that a tool 65 is extending outwardly of the magazine 70 and the tool is in position to be engaged by the tool grips of the tool change arm 71.

As previously described, the positioning mechanism 155 operates to accurately locate the selected tool 65 at the tool change station 105. However, if a slight displacement of the tool 65 should occur, it will be accurately aligned at the tool change station 105 by a pair of guides 190 and 191 during the pivotal movement of its associated storage socket 115.

Figure 5:
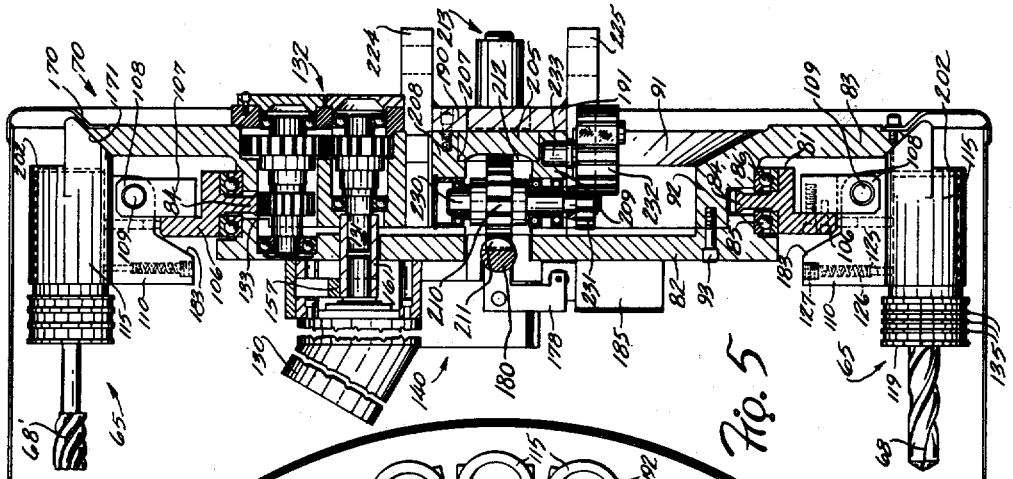
FIG. 5 is a view partly in elevation and partly in vertical section taken along the plane represented by the line 5—5 in FIG. 4.

The guides 190 and 191 are secured to the edge of a pair of plates 208 and 209, as best shown in FIG. 5, and are accurately located to form a space between them conforming to the spacing of a pair of flat surfaces 192 formed on the periphery of the tool storage sockets 115. The location of the flat surfaces 192 on the tool storage sockets 115 may be best seen in FIG. 4, and the dimension between these two flat surfaces is accurately maintained to closely fit into the space between the guides 190 and 191. As the tool storage socket 115 is pivoted outwardly of its normal position in the magazine 70, the flat surfaces 192 move into the space between the guides 190 and 191 to accurately locate the tool storage socket 115 at the tool change station 105.

It will be observed in FIG. 6 that the forward end of the guide 190 is provided with a tapered surface 193 while the guide 191 is provided with a similar tapered surface 194 at its forward end. These tapered surfaces 193 and 194 serve to enlarge the gap between the guides 190 and 191 at their forward ends to facilitate the entrance of the flat surfaces 192 of the tool storage socket 115. If the storage socket 115 is slightly displaced from the proper location, one of the flat surfaces 192 will engage either the tapered surface 193 or the tapered surface 194 of the guides 190 and 191 respectively, depending upon the direction of the displacement, and as the pivotal movement of the tool storage socket 115 continues, it will cause a slight shifting of the tool carrying ring 81 to accommodate the movement of the flat surfaces 192 into the space between the guides 190 and 191 to thereby accurately locate the tool storage socket 115 at the tool change station 105.

Thes outward pivotal position of the tool storage socket 115 at the tool change station 105 is accurately located by a stop bar 201 that extends across the gap between the guides 190 and 191 with one end of the stop bar 201 being secured to the guide 190 and its other end being attached to the guide 191. The stop bar 201 cooperates with an abutment surface 202 formed at the rear end of each of the tool storage sockets 115 for accurately locating the tool storage socket 115 in its outwardly extending position for effecting a tool change. As the tool storage socket 115 is pivoted outwardly by the action of the plunger 180, the pivotal movement continues until the abutment surface 202 engages the edge of the stop bar 201. This position of the tool storage socket 115 is shown in broken lines in FIG. 7 indicating the tool 65 extending outwardly of the magazine 70 and the abutment surface 202 of the socket 115 in tight engagement with the edge of the stop bar 201. Therefore, when the pivotal movement of the storage socket 115 is completed for outwardly locating a tool 65, the hydraulic pressure in the cylinder 175 is continued to force the abutment surface 202 in tight engagement with the stop bar 201 to firmly maintain the tool storage socket 115 in position while a tool change is being effected.

As previously mentioned, the tool storage sockets 115 are prevented from pivoting outwardly of their normal position in the magazine 70 at any location other than at the tool change station 105 by engagement of their beveled surfaces 170 with the annular beveled surface 171 formed on the periphery of the back plate 83. However, the back plate 83 is broken at the tool change station 105 to permit the pivotal movement of the storage sockets 115 at this location, but since the tool storage sockets 115 pass the tool change station 105 when the tool carrying ring 81 is being rotated, means are provided at the tool change station 105 to prevent the outward pivotal movement of the tool storage sockets 115 except by operation of the piston and cylinder mechanism 176. To this end, a slide 205 is slidably supported between the guides 190 and 191 and a pair of shoulders 207 formed on the plates 208 and 209, as best shown in FIG. 5. The slide 205 is provided with a beveled surface 206 at its forward end which conforms with the beveled surface 171 formed on the back plate 83. When the plunger 180 is retracted, the slide 205 is in its forward position with its beveled surface 206 in alignment with the beveled surface 171. The beveled surface 206 therefore fills the gap at the tool change station 105 and constitutes a continuation of the beveled surface 171 in order to avoid pivotal displacement of the storage sockets 115 as the tool change station 105 until rotation of the ring 81 is terminated and the piston and cylinder mechanism 176 is actuated.

While the plunger 180 is moving forwardly to pivot a tool 65 outwardly of the magazine 70, the slide 205 is retracted to withdraw its beveled surface 206 and permit the outward pivotal movement of the storage socket 115. Such retraction of the slide 205 is produced by a gear 210 that is in meshing engagement with a gear rack 211 formed on the plunger 180 and a gear rack 212 formed on the interior surface of the slide 205. Therefore, as the plunger 180 is moved forwardly to pivot a tool 65 outwardly, it causes rotation of the gear 210 which, in turn, effects a retraction of the slide 205 by reason of its engagement with the gear rack 212 formed on the slide 205. The beveled surface 206 of the slide 205 will then be out of engagement with the beveled surface 170 on the storage socket 115, as indicated by the broken lines in FIG. 7.

The slide 205 serves the further purpose of returning the storage socket 115 to its normal position within the magazine 70 when the plunger 180 is retracted. Retraction of the plunger 180 causes the gear 210 to rotate and thereby move the slide 205 forwardly. As the slide 205 moves forwardly it engages the beveled surface 170 of the storage socket 115 and forces it to pivot inwardly into the magazine 70 after the tool change has been completed. The slide 205 then assumes its normal position with its beveled surface 206 in alignment with the bevel surface 171 of the back plate 83 to prevent inadvertent pivotal movement of the storage sockets 115 as they pass the tool change station 105.

In order to yieldaby retain the slide 205 in its retracted as well as in its forward position, a detent generally identified by the reference numeral 213 is mounted adjacent to the slide 205. A detent ball 214 is urged into a suitable recess 215 formed in the outer surface of the slide 205, the ball being urged toward the slide 205 by a spring 216. The recess 215 is provided to establish the retracted position of the slide 205. When the hydraulic piston and cylinder mechanism 176 is actuated, the force developed by the mechanism overcomes the force of the spring 216 and the ball 214 is forced out of the recess 215 to permit the forward movement of the slide 205.

Figure 3:
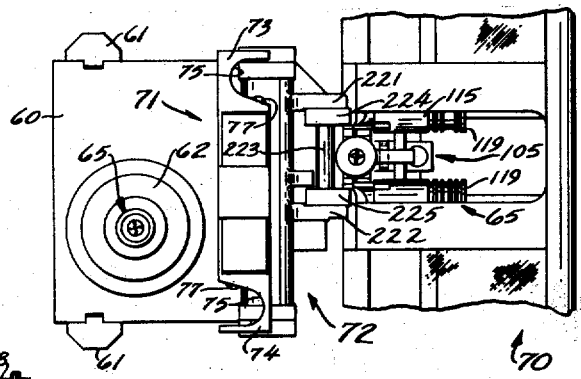
FIG. 3 is a fragmentary front view of the machine shown in FIG. 1, similar to the view in FIG. 2, but showing only the spindle head and magazine with the tool change arm being depicted in its operative position.

In addition to producing the outward pivotal movement of the selected tool 65, the pivot mechanism 175 serves the further purpose of pivoting the hydraulic unit 72 for swinging the tool change arm 71 from its retracted or inoperative position, as illustrated in FIG. 2, to its operative position as depicted in FIG. 3. In order to provide for the hinged mounting of the hydraulic unit 72, the latter is provided with a pair of laterally extending lugs 221 and 222 which are provided with central openings for receiving a hinge pin 223. The back plate 83 is provided with similar lugs 224 and 225 that are located directly adjacent to the lugs 221 and 222 respectively but within the space between them, the lugs 224 and 225 being likewise provided with central openings for receiving the hinge pin 23. The pin 223 therefore extends through the openings formed in the four lugs 221, 222, 224 and 225 so that the hydraulic unit 72 is pivotally carried by the back plate 83.

The pivotal outward movement of the tool change arm 71 occurs at the same time that a tool 65 is being outwardly of the magazine 70. The drive for pivoting the hydraulic unit 72 is therefore taken from the gear 210 which is keyed to a shaft 230 that is journalled in the plates 208 and 209 as clearly shown in FIG. 5. The shaft 230 extends beyond the plate 209 to receive a gear 231 which is keyed thereto. A cooperating wide tooth gear 232 is rotatably supported by a stub shaft 233 that is carried by the plate 209 and is in meshing engagement with the gear 231, being provided with a laterally extending lug 234 as best shown in FIG. 8.

A pin 235 is attached to the lug 234 for receiving one end of a link 240 and pivotally supporting the latter. The link 240 is connected to a similar link 241 by a turnbuckle 242 and the end of the link 241 is pivotally carried by a pin 243. The turnbuckle 242 serves to adjust the distance between the ends of the links 240 and 241 to accommodate the spacing of the pins 235 and 243 respectively. The pin 243 is secured to the hinge lug 222 of the hydraulic unit 72 at one corner thereof as shown in FIG. 8.

With this arrangement, when the plunger 180 is actuated forwardly to pivot a tool 65 out of the magazine 70, it will rotate the gear 210 to likewise revolve the shaft 230. The gear 231 will rotate with the shaft 230 to produce a rotation of the gear 232 and thereby move its associated lug 234 in a circular path. Since the links 240 and 241 are connected to the lug 234 by the pin 235 they will be moved in a rightward direction, as viewed in FIG. 8, and the hydraulic unit 72 will be pivoted in a clockwise direction, as viewed from the top, by reason of its connection with the link 241 through the pin 243, the latter being offset from the pivotal axis of the hydraulic unit 72 about the hinge pin 223. The tool change arm 71 will therefore move with the pivotal movement of the hydraulic unit 72 from its inoperative position, as illustrated in FIG. 2, to its operative position, as shown in FIG. 3. Upon completion of the tool change, the reverse movement, of course, will occur to again retract the tool change arm 71.

In order to establish the pivotal positions of the hydraulic unit 72 a bracket 248 is provided for carrying an adjustable stud 249 and a detent mechanism 250, as shown in FIGS. 6 and 9. The stud 249 is threadedly carried by the bracket 248 and is locked in the desired position by a lock nut 251. It is disposed in alignment with the hinge lug 221 of the hydraulic unit 72, and as the latter, is pivoted to swing the tool change arm 71 to its inoperative position, the edge of lug 221 abuts the end of the stud 249 to prevent further pivotal movement of the hydraulic unit 72 in this direction.

A cam plate 255 is secured to the top surface of the hinge lug 221 to pivot with it and cooperate with the detent mechanism 250 which is disposed directly above the stud 249. The detent mechanism 250 comprises a detent plunger 256 slidably supported within a cylindrical opening 257 formed in the bracket 248. The plunger 256 is urged to the right, as viewed in FIG. 9, by a spring 258 which is likewise contained within the cylindrical opening 257 with one end bearing against the plunger 256 and the opposite end bearing against a plug 259 which is theaded in the open end of the cylindrical opening 257. A set screw 260 is threaded into the bracket 248 into a recess 261 formed in the detent plunger 256 for the purpose of permitting sliding movement of the plunger 256 within the cylindrical opening 257 while preventing the plunger from being ejected from the opening.

The extending end of the plunger 256 is tapered to form a point 262 which bears against the edge of the cam 255 when the latter is positioned by the hydraulic unit 72 in its operating position with the tool change arm 71 swung to its operating position. Thus, the cam 255 is shown in FIG. 9 in solid lines, entirely free of the detent mechanism 250 when the hydraulic unit 72 is pivoted to the retracted position wherein the tool change arm 71 is in its inoperative position. However, when the hydraulic unit 72 is pivoted in the opposite direction to swing the tool change arm 71 to its operating position, the cam 255 occupies the position indicated by the broken lines with the point 262 of the plunger 256 bearing against the edge of the cam 255 for yieldably retaining the hydraulic unit 72 in this position.

After the hydraulic unit 72 has been pivoted to swing the tool change arm 71 to its operative position, it functions to rotate the tool change arm 71 as well as to extend and retract it for completing the tool change as previously described. To this end, the hydraulic unit 72 includes a vertical cylinder 268 and a horizontal cylinder 269 that extends laterally from the vertical cylinder 268, as shown in FIGS. 10 and 11. The tool change arm 71 is secured to the end of a stub shaft 270, and a disk 273 is in serrated engagement with the stub shaft 270, as clearly illustrated in FIG. 11, so that the disk 273 will rotate with the shaft 270. The disk 273 is retained on the shaft 270 by a snap ring 274 to hold the assembly together.

The stub shaft 270 is attached to the end of an internally splined sleeve 278 which is in splined engagement with a shaft 279 so that the sleeve 278 may be moved axially relative to the shaft 279 while maintaining a rotary driving connection herewith. The shaft 279 extends rearwardly of the sleeve 278 where it is journalled by a pair of ball bearings 280 and 281 which are carried by the cylindrical housing 268. A gear 282 is keyed to the shaft 279 between the ball bearings 280 and 281 and is in meshing engagement with a gear rack 283 formed on a vertical plunger 284 for imparting rotational movement to the shaft 279 in a manner to be later described.

The extension and retraction of the tool change arm 71 is effected by the axial movement of the sleeve 278 which is rotatably supported within a quill 290 that is slidably carried for axial movement within the horizontal cylinder 269, as clearly shown in FIG. 11. The sleeve 278 and its associated stub shaft 270 are rotatably supported within the quill 290 by a needle bearing 291 and a pair of ball bearings 292. A snap ring 293 engages the quill 290 and the inner edge of the needle bearings 291 while a similar snap ring 294 engages the opposite end of the quill 290 and the edge of a collar 295 which bears against the outer ball bearing 292 to couple the quill 290 to the sleeve 278 and its associated stub shaft 270 for simultaneous axial movement. By reason of this arrangement, a rotational movement of the splined shaft 279 will cause a like rotational movement of its associated sleeve 278 and the stub shaft 270 to produce a rotational movement of the tool change arm 71. On the other hand, the sleeve 278 will move axially with the quill 290 in view of the fact that it is coupled thereto by the snap rings 293 and 294. As a result, axial movement of the quill 290 will cause an extension or retraction of the tool change arm 71 relative to the hydraulic unit 72, and the driving rotary connection between the shaft 279 and the sleeve 278 will be maintained by reason of their splined engagement so that the rotary motion may be imparted to the tool change arm 71 while it is extended.

The tool change arm 71 is shown in its retracted position in FIG. 11, the quill 290 being fully contained within the horizontal cylinder 269. The tool change arm 71 is moved outwardly of this position relative to the horizontal cylinder 269 for extracting a tool 65 from the spindle 62 and from a tool storage socket 115 as previously described. Conversely, after properly relocating the tools by a rotary movement, the tool change arm 71 is retracted to the position shown in FIG. 11 for inserting the new tools 65 into the spindle 62 and a tool storage socket 115.

The extension and retraction of the tool change arm 71 is effected by a piston and cylinder mechanism 301 which is carried on the periphery of the horizontal cylinder 269 and is provided with a connecting rod 302 extending outwardly of the cylinder to be coupled to the quill 290. To this end, a plate 303 is attached to the end of the connecting rod 302 by a nut 304 and extends laterally therefrom with the extending end being fixed to the quill 290. Therefore, when the piston and cylinder mechanism 301 is actuated to axially move the connecting rod 302, the quill 290 will move with it and the sleeve 278 and tool change arm 71 will move with the quill 290 to cause either an extension or retraction of the tool change arm 71.

In order to condition the electrical circuit for succeeding steps in the cycle, a pair of limit switches 309 and 310 are mounted beneath the piston and cylinder mechanism 301 as shown in FIGS. 10 and 16. As clearly shown in FIG. 16, the limit switches 309 and 310 are located in a housing 311 which is secured to the underside of the piston and cylinder mechanism 301. The housing 311 is provided with a removable cover 312 for gaining [access] to the limit switches contained therein.

The limit switches 309 and 310 are actuated by a dog 313 secured to the inner end of a rod 314 as best shown in FIG. 16. The rod 314 is slidably supported within a bore 315 formed in an enlarged portion of the wall of the horizontal cylinder 269 and is attached to the plate 303 at its end opposite the location of the dog 313 by a nut 316 that is in threaded engagement with the end of the rod 314 and is disposed within a counterbore formed in the plate 303. The nut 316 serves to couple the rod 314 to the plate 303 so that when the piston and cylinder mechanism 301 is actuated to retract or extend the tool change arm 71, the rod 314 will move with it. When the tool change arm 71 is fully retracted the dog 313 will engage a plunger of the limit switch 309 to actuate the switch and thereby indicate that the tool change arm 71 is fully retracted. On the other hand, when the tool change arm 71 is fully extended from the cylinder 269, the dog 313 will engage the plunger of the limit switch 310 to actuate the latter and indicate in the electrical control system that the tool change arm 71 is fully extended.

The rotational movement of the tool change arm 71 is produced by rotating the splined shaft 279. Since the sleeve 278 is in splined engagement with the shaft 279, it and the tool change arm carried by it will rotate with the shaft 279. As previously described, the rearward portion of the shaft 279 carries the gear 282 which is in meshing engagement with the gear rack 283 formed on the plunger 284, as shown in FIG. 10. Axial movement of the plunger 284 will therefore cause a rotational movement of the gear 282 and its cooperating shaft 279.

The plunger 284 is slidably carried within a bore 320 formed in the vertical cylinder 268 and is actuated in a downward direction by a hydraulic actuating mechanism, generally identified by the reference numeral 321, and which is contained in the vertical cylinder 268 above the plunger 284. An identical hydraulic actuating mechanism 322 is contained in the opposite end of the vertical cylinder 268 beneath the plunger 284 for the purpose of actuating the plunger 284 in an upward direction.

The hydraulic actuating mechanism 321 comprises a cap 323 for closing the upper end of the vertical cylinder 268. A cylinder 324 is attached to the cap 323 and extends concentrically therefrom into the upper portion of the bore of the vertical cylinder 268. A plunger 325 is slidably carried within the bore of the cylinder 324 and is adapted to be shifted therein by hydraulic pressure. The outer wall of the cylinder 324 and the inner wall of the upper portion of the vertical cylinder 268 form an annular passage for slidably receiving a sleeve 326 which is likewise adapted to be shifted by hydraulic pressure within the annular passage that contains it. The upper limit of movement of the sleeve 326 is established by the interior surface of the cap 323 while its lower limit of movement is determined by a shoulder 327 which is created by an upper enlargement of the bore 320.

A port 328 is in communication with the annular passage that contains the sleeve 326 and is suitably connected to a hydraulic circuit for admitting pressure to and exhausting pressure from the annular passage. In like manner, port 329 is in communication with the bore of the cylinder 324 for permitting the flow of hydraulic pressure to and from the cylinder for actuation of the plunger 325.

The hydraulic actuating mechanism 322 is located in the opposite end of the vertical cylinder 268 and is identical in construction to the hydraulic actuating mechanism 321. Thus, it includes a cap 323A for closing the lower end of the cylinder 268. A cylinder 324A is attached to the cap 323A and extends axially therefrom into the lower portion of the bore of the cylinder 268 for slidably receiving a plunger 325A. A sleeve 326A is slidably contained within an annular passage formed between the outer wall of the cylinder 324A and the inner wall of the lower portion of the vertical cylinder 268. The lower limit of movement of the sleeve 326A is determined by the inner surface of the cap 323A while its upper limit of movement is established by a shoulder 327A formed by a lower enlargement of the bore 320.

A pair of ports 328A and 329A are formed in the cap 323A with the port 328A carrying the flow of hydraulic pressure to and from the annular passage which contains the sleeve 326A. The port 329A carries the flow of hydraulic pressure to and from the bore of the cylinder 324A for actuating the plunger 325A in its axial movement.

The tool change arm 71 is required to be located in four rotary positions, and the plunger 284 must therefore likewise be located in four specific positions within the bore 320. Each of its four positions is established by actuating the sleeves 326 and 326A, and the plungers 325 and 325A in various combinations. Four notches 323, 334, 335 and 336 are formed in the periphery of the plunger 284 diametrically opposite the gear rack 283. The four notches 333, 334, 335 and 336 cooperate with a detent mechanism that is generally identified by the reference numeral 337 to yieldably retain the plunger 284 in either one of its four positions.

The operation of the hydrulic actuating mechanisms 321 and 322 to establish the four positions of the plunger 284 is best shown diagrammatically in FIGS. 22 to 28 inclusive with the corresponding rotary position of the tool change arm 71, being shown in FIGS. 22A to 28A inclusive, directly above the corresponding diagrammatic views of the hydraulic actuating mechanisms 321 and 322. In FIGS. 22 to 28 inclusive, the direction of the arrows at the ports 328, 328A, 329 and 329A indicate the direction of flow of hydraulic pressure into the mechanism. Thus, as illustrated in FIG. 22, the arrow directed away from the port 329 indicates that the bore in the cylinder 324 is connected to the reservoir and the pressure is being exhausted from the cylinder. On the other hand, the arrow directed into the port 329A indicates that the port is connected to a source of hydraulic pressure which is being directed into the cylinder 324A for actuating the plunger 325A.

FIG. 22 illustrates the condition of the hydraulic actuating mechanisms 321 and 322 for locating the tool change arm 71 in one of its vertical positions. This position of the tool change arm 71 is depicted in FIG. 22A, the arm having been swung out to its operating position by the pivotal movement of the hydraulic unit 72. To achieve this vertical rotary location of the tool change arm 71 hydraulic pressure is directed into the port 329A for actuating the plunger 325A and the other three ports are connected to exhaust. As a result, the force applied to the plunger 325A serves to move the plunger 284 to its uppermost limit of movement so that the detent mechanism 337 engages the notch 336. As the plunger 284 is moved upwardly, it moves the sleeve 326 with it to its upper limit of movement within its cooperating annular passage.

After the tool change arm 71 has been swung to its operative position with the arm vertically located, as illustrated in FIG. 22A, it is necessary to rotate the arm 71 in a clockwise direction, as viewed in FIG. 22A, and indicated by an arrow 338 in FIG. 23A to move the tool grip 74 into engagement with the tool 65 in a tool storage socket 115 and the tool grip 73 into engagement with the tool 65 in the spindle 62. To obtain this angular rotation of the tool change arm 71 from the vertical position shown in FIG. 22A to the position shown in FIG. 23A it is necessary to move the plunger 284 downwardly so that the detent mechanism 337 will move out of engagement with the notch 336 and into engagement with the notch 335. Such downward movement of the plunger 284 is effected by merely connecting the two ports 328 and 328A to the source of hydraulic pressure and maintaining the hydraulic pressure to the port 329A, as indicated in FIG. 23. The port 329 will continue to be connected to exhaust. Under these conditions, the sleeve 326A will be moved upwardly into engagement with the shoulder 327A but the sleeve will merely move relative to the plunger 325A without having any effect on the plunger 284 since it was not in engagement with the end of the plunger. On the other hand, the hydraulic pressure into the port 328 will cause a downward movement of the sleeve 326 until it engages the shoulder 327, and since the plunger 284 is being forced against the sleeve 326 by the action of the plunger 325A, the plunger 284 will move downwardly with the sleeve 326 and the notch 335 will move into engagement with the detent mechanism 337.

It will be noted that in forcing the plunger 284 downwardly, the sleeve 326 will be operating against the pressure exerted against the plunger 284 in the opposite direction by the plunger 325A. However, the annular area of the edge of the sleeve 326 upon which the hydraulic pressure is acting, is greater than the area of the end of the plunger 325A upon which the pressure from the port 329A is acting, so that the force exerted by the sleeve 326 will overcome the force exerted by the plunger 325A to effect the downward movement of the plunger 284. With the plunger 284 thus positioned, the arm 71 will be located as depicted in FIG. 23A with the grips 73 and 74 in engagement with the tools 65 in the spindle 62 and a tool storage socket 115.

After the tool grips 73 and 74 have engaged the two tools 65, the tool change arm 71 is extended by operation of the piston and cylinder mechanism 301, in the manner previously described, to withdraw the tools 65 from the spindle 62 and tool storage socket 115 respectively. When the tools 65 have thus been withdrawn it is necessary to rotate the tool change arm 71 through an angle of 180° in a clockwise direction as indicated by an arrow 339, from the position shown in FIG. 23A to the position depicted in FIG. 24A to exchange the positions of the two tools in the grips 73 and 74. To produce this 180° of rotary movement of the arm 71, the plunger 284 must be shifted to its downward limit of movement so that the detent mechanism 337 engages the notch 333. This position is shown in FIG. 24, the plunger 284, having been shifted to this position from the position illustrated in FIG. 23. It is apparent that downward movement of the plunger 284 is achieved by directing pressure to either the sleeve 326 or the plunger 325. However, the sleeve 326 was shifted to its lower limit of movement against the shoulder 327 to achieve the position of the plunger 284, as illustrated in FIG. 23. Therefore, further downward movement of the plunger 284 is produced by directing pressure into the port 329 for actuating the plunger 325 in its downward direction. The other three ports 328, 328A and 329A are connected to exhaust as indicated by the arrows. In view of this hydraulic connection to exhaust, the plunger 325A and sleeve 326A are free to move downwardly in response to the force applied by the plunger 325. The plunger 284 then assumes the position shown in FIG. 24 with its lower end bearing against the sleeve 326A and moves its notch 333 into engagement with the detent 337. Such movement of the plunger 284 from the position shown in FIG. 23 to the position illustrated in FIG. 24 causes 180° of rotation of the arm 71 to exchange the position of the tool grips 73 and 74, as indicated in FIG. 24A. After such rotational movement has taken place in the arm 71 may be retracted toward the cylinder 269 for the purpose of inserting the tools 65 into the spindle 62 and tool storage socket 115 with a new tool being placed in the spindle and the tool that previously operated with the spindle being inserted in a storage socket 115.

Now that a tool change has taken place, it is necessary to rotate the arm 71 in the opposite or counterclockwise direction as indicated by an arrow 343 to shift the tool grips 73 and 74 out of engagement with the tools 65 and relocate the arm 71 in a vertical position as illustrated in FIG. 25A. To obtain this rotation of the arm 71 in a counterclockwise direction, the plunger 284 must be moved upwardly so that its notch 334 moves into engagement with the detent 337. To achieve this movement it is only necessary to disconnect the ports 328 and 328A from exhaust as indicated in FIG. 24 and connect them to the source of pressure as indicated in FIG. 25. The hydraulic pressure continues to be directed into the port 329 and the port 329A continues to be connected to the exhaust as indicated by the arrows. The hydraulic pressure in the port 328 has no effect on the sleeve 326 since it is already in its lower position of movement against the shoulder 327 as indicated in FIG. 24. However, FIG. 24 shows the sleeve 326A at its lower limit of movement and the hydraulic pressure directed into the port 328A as shown in FIG. 25 serves to move the sleeve 326A upwardly to its upper limit of movement against the shoulder 327A. Since the plunger 284 was bearing against the upper edge of the sleeve 326A it moves upwardly with the sleeve 326A to move its notch 334 into engagement with detent 337 and thereby cause a rotation of the arm 71 in a counterclockwise direction to move it to its vertical position, as illustrated in FIG. 25A.

A tool change has now been completed and the tool change arm 71 will be swung to its inoperative position to permit a machining operation to be performed. However, it will be noted after one complete tool change, the arm 71 is displaced 180° from the position which it was in when the tool change was initiated. Thus, the tool change arm 71 is shown in FIG. 25A displaced 180° from the position shown in FIG. 22A when a tool change was being initiated, and the tool grip 73 is in the upper position in lieu of the lower position shown in FIG. 22A. As a result, a complete cycle of the hydraulic actuating mechanisms 321 and 322 is not completed until two tool changes have been completed. The second tool change will therefore be initiated with the tool change arm 71 swung out to its operative position and located vertically, as shown in FIG. 25A. The hydraulic actuating mechanisms 321 and 322 will then be operated in the manner previously described to obtain the conditions shown in FIGS. 26 to 28 inclusive, for completing the second tool change. Upon completion of the second tool change, the hydraulic actuating mechanisms 321 and 322 will be in the condition shown in FIG. 28 which is identical to the condition depicted in FIG. 22. In like manner, the tool change arm 71 will be in the vertical position shown in FIG. 28A with the tool grip 74 in the upper location in the identical manner as shown in FIG. 22A. Thus, the rotary movement of the tool change arm 71 by operation of the plunger 284 in combination with the axial movement of the arm 71 by operation of the piston and cylinder mechanism 301 will serve to remove a tool 65 from the spindle 62 and replace the tool with another tool 65 that was withdrawn from a tool storage socket 115 in the magazine 70 and the tool 65 that was removed from the spindle will be inserted into the storage socket 115 that previously carried the tool 65 which was inserted into the spindle 62.

The completion of each movement of the tool change arm 71 must be indicated in the electrical control system to condition it for the succeeding step in the cycle. As previously mentioned, the limit switches 309 and 310 are actuated upon the retraction and extension of the tool change arm 71 to condition the electrical control system after these positions of the change arm 71 have been established. The completion of each rotary movement of the tool change arm 71 is indicated in the electrical control system by three limit switches 348, 349 and 350, best shown in FIG. 12, and which are mounted within a recess 351 formed in the back of the vertical cylinder 268 of the hydraulic unit 72, the recess 351 being enclosed by a removable cover 352.

The three limit switches 348, 349 and 350 are controlled by a cam 355 that is keyed to the rearmost end of the shaft 279 to rotate with it since the shaft 279 also serves to rotate the change arm 71. The arrangement of the cam 355 is best shown in the perspective view of FIG. 13. It is of circular configuration having a groove 356 formed along its periphery in one plane and two notches 357 and 358 also formed in the periphery of the cam but in a different plane than the plane of the groove 356. The notches 357 and 358 cooperate with a roller 348A that is connected to actuate the limit switch 348 and a roller 350A that is connected to control the limit switch 350. The notches 357 and 358 are located diametrically opposite on the cam 355 and are of a semicircular shape having diameters only slightly larger than the diameter of the rollers 348A and 350A so that the rollers will occupy the notches only during a small portion of the revolution of the cam 355. The switches are arranged so that they assume their normal condition when their cooperating rollers are located in the notches 357 and 358. When the rollers 348A and 350A are out of the notches and riding along the periphery of the cam 355 their associated switches are actuated.

The groove 356 is also disposed along the periphery of the cam 355 but extends through an angle of approximately 180° and is disposed in a plane that is displaced from the plane of the notches 357 and 358 but directly adjacent thereto. The groove 356 cooperates with a roller 349A that is connected to control the switch 349 and it is displaced from the plane of the rollers 348A and 350A so that it occupies the plane in which the groove 356 is located to enable it to enter the groove. When the roller 349A is in the groove 356 its associated switch 349 is in its normal position while the switch is actuated when the roller 349A is in engagement with the periphery of the cam 355 out of the groove 356. Therefore, the three switches 348, 349 and 350 will be actuated by the cam 355 as it rotates with the shaft 279 to indicate in the electrical control system the position of the tool change arm 71.

FIGS. 22B to 28D illustrate diagrammatically the rotary position of the cam 355 for the corresponding rotary positions of the tool change arm 71 as depicted in FIGS. 22A to 28A respectively. It should be noted that FIGS. 22B to 28B are front views of the cam 355 and the switches with which it cooperates, while FIG. 12 depicts a rear view of these elements and therefore FIGS. 22B to 28B depict a mirror image of the cam and switches, as shown in FIG. 12. Each of the FIGS. 22B to 28B depicts the rotary position of the cam 355 which corresponds with the rotary position of the change arm 71 as shown in the view directly beneath it in FIGS. 22A to 28A. The diagrammatic views in FIGS. 22B to 28B also indicate the condition of the switches 348, 349 and 350 for each rotary position of the tool change arm 71 by indicating the location of the roller 349A in or out of the groove 356 to indicate whether its associated switch 349 is actuated or not and the rollers 348A and 350A are likewise shown either in or out of their cooperating notches 357 and 358 to indicate whether the switches 348 and 350 are in their normal position or actuated.

The construction of the tool change arm 71 is best illustrated in FIGS. 36 and 37. As there shown, each pair of rollers 77 is rotatably supported by a pivotable bracket 780, each bracket 780 being keyed to one of two rods 781 that are rotatably supported by the tool change arm. Both brackets 780 are urged in a counterclockwise direction, as viewed in FIG. 37, by one of two springs 782 that are carried in a pair of bores 783 formed in the tool grips 73 and 74. One end of each spring bears against a plug 784 that is threaded into the ends of each of the bores 783 and the opposite ends of each spring bears against one of two plungers 785 that are slidably supported within the two bores 783 and engage the ends of the brackets 780.

The force exerted by the springs 782 is transmitted through the plungers 785 to urge the brackets 780 in a counterclockwise direction to their limit of movement in this direction to move the rollers 77 in the same direction so that they extend into the path of movement of the collars 119 of the tools 65 as they pass into the tool grips 73 and 74. As the collars of the tools 65 pass into the semicircular surfaces 75, the rollers 77 are forced inwardly in a clockwise direction against the pressure of the springs 782. When the collar 110 is in engagement with the semicircular surfaces 75, the diameter of the collars 119 is past the rollers 77 to allow them to move outwardly beyond the semicircular surface 75 for the purpose of retaining the tools 65 within the grips 73 and 74 of the tool change arm 71.

It will be recalled from the previous description that when the tool change arm 71 is in its extended position, it is rotated through an angle of 180° to interchange the position of the two tools 65 in its grips 73 and 74. This rotational movement of the tool change arm 71 while carrying two tools 65 in its grips 73 and 74 occurs only when the tool change arm 71 is in its extended position. The rate of rotation of the tool change arm 71 when performing this function of interchanging the positions of the two tools 65 in its grips occurs at a relatively rapid rate and it is possible that when the tool arm stops after this rotation, the inertia of the tools 65 in the grips may overcome the pressure of the springs 782 so that the rollers 77 will fail to hold the tools 65 within the grips. A locking mechanism is therefore provided to lock the brackets 780 in a position wherein the rollers 77 are in their retaining position, extending beyond the semicircular surface 75, and the locking mechanism operates only when the tool change arm 71 is extended.

To this end, the splined shaft 279 which serves to rotate the tool change arm 71 as previously described, is provided with a bore 789 for slidably receiving a rod 790. The inner end of the rod 790 is provided with a flange 791 which will abut the end of a sleeve 792 to limit the outward movement of the rod 790, the sleeve 792 being threaded into the bore 789 so that it is fixed to the splined shaft 279. The rod 790 extends outwardly of the bore 789 through a similar bore formed in the stub shaft 270 and extends beyond the stub shaft 270 with its outer end receiving a snap ring 793 for retaining a cam 794.

The cam 794 is of rectangular configuration, as shown in FIG. 37, and is contained within a recess 795 formed in a hub 796 which carries an inner plate 797 that supports two legs 798 and 799 of the U-shaped tool change arms 71. The cam 794 is slidable a limited amount within the recess 795 and is protected by a bellows 801 which serves to prevent dirt from entering the operating mechanism. The bellows 801 is attached to an outer plate 802 that overlies the inner plate 797 and is fixed thereto by suitable screws 803, one of which is shown in FIG. 38. The proper alignment of the outer plate 802 is maintained by dowels 804 that extend through suitable holes formed in the outer plate 802 and inner plate 797.

The outer plate 802 is provided with an interior longitudinal recess 809, as clearly shown in FIG. 38, for receiving a pair of oppositely disposed slides 810. One end of each of the slides 810 is bifurcated, as clearly illustrated in FIG. 39, to form two legs 811. The outer end of each leg 811 is provided with a laterally extending lip 812 for receiving a pin 815, the pin 815 being carried by the two lips 812 and extends across the space between them.

When the slides 810 are in position within the recess 809, the pins 815 are each in alignment with one of a pair of slots 820 that are formed in the cam 794. The slots 820 are inclined away from each other so that when the cam 794 is moved upwardly, as viewed in FIG. 36, the pins 815 within the slots 820 will be forced away from each other to move the two slides 810 accordingly. The outer end of the slides 810, opposite the end supporting the pin 815, is provided with a longitudinal extension 821 to form an abutment surface 822. Each of the abutment surfaces 822 is disposed to be engaged by a dog 823 when the tool change arm 71 is extended, each of the two dogs 823 being secured to the end of one of the two rods 781. One of the rods 781 is rotatably supported within the leg 798 while the other rod 781 is rotatably supported within the leg 799. Since the two brackets 780 are keyed to the rods 781 the latter will rotate with the pivoting movement of the brackets 780 and the dogs 823 will rotate with them.

When the tool change arm 71 is in its retracted position, the flange 791 of the rod 790 bottoms on the end of the bore 789 to force the cam 794 outwardly and the pins 815 are then located in the slots 820 in the position shown in FIG. 36 at that portion of the slots 820 where their spacing is the narrowest. Therefore, the pins 815 and their associated slides 810 will be drawn toward each other to move the abutment surfaces 822 out of the circular path of travel of the dogs 823 to the position shown in FIG. 37 so that the movement of the dogs 823 will not be interfered with. Therefore, the pivotal movement of the brackets 780 may occur to allow the rollers 77 to be forced out of the path of travel of a tool 65 into and out of the grips 73 and 74.

When the tool change arm 71 is extended, the slides 810 are moved simultaneously in opposite directions away from each other to move their abutment surfaces 822 into the circular path of travel of the dogs 823 to prevent the pivotal movement of the brackets 780 and thereby lock the rollers 77 for retaining the tools 65 in the grips 73 and 74 so that they cannot be inadvertently discharged therefrom when the tool change arm 71 completes its angular movement of 180° to interchange the location of the two tools 65.

This separating movement of the two slides 810 occurs by operation of the rod 790 drawing the cam 794 to its innermost position. As the tool change arm 71 is extended outwardly, the rod 790 will move with it until its flange 791 engages the end of the sleeve 792. This limits the outward movement of the rod 790 but the tool change arm 71 continues to move outwardly a slight amount. Since the rod 790 is coupled to the cam 794 by the snap ring 793 it will likewise prevent further outward movement of the cam 794, but the plates 797 and 802 as well as their associated slides 810 will continue to move outwardly a slight amount. The cam 794 will therefore move into the recess 795 relative to the two slides 810 so that the two pins 815 will move in the slots 820 to the portions of the slots that have a maximum spacing. This movement of the slots 820 relative to the pins 815 causes the pins to move away from each other and the slides 810 will move with them to move their abutment surfaces 822 into the circular path of travel of the dogs 823. As previously described, this prevents the rollers 77 from moving inwardly out of the path of travel of a collar 119 of a tool 65 entering or leaving the tool grips 73 and 74, and as a result, the tool 65 carried in the grips 73 and 74 are securely locked therein when the tool change arm 71 is in its extended position. When the tool change arm 71 is in its retracted position, this locking mechanism is released in the manner described so that the grips 73 and 74 may release the tools 65 which they are carrying.

Figure 18:
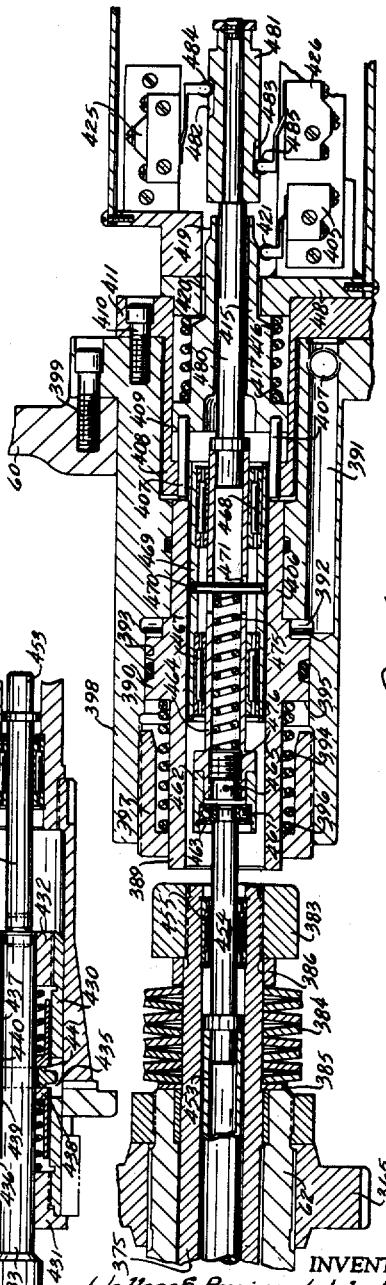
FIG. 18 is a detail view partly in side elevation and partly in vertical section illustrating the rearward portion of the machine tool spindle shown in FIG. 17.

The tool carrying spindle 62 is especially adapted to accommodate the tool changing mechanism so that a tool 65 inserted into the spindle 62 by the change arm 71 may be automatically locked in the spindle for performing a machining operation and may also be operated automatically to release a tool 65 after the completion of a machining operation in order that it may be extracted by the change arm 71. The spindle is illustrated in FIGS. 17 and 18 with FIG. 17 showing the forward portion of the spindle 62 and its associated mechanism, while FIG. 18 depicts the rear end of the spindle 62 and the mechanism extending rearwardly therefrom and cooperating with it. The spindle 62 is journalled in the spindle head 60, being rotatably supported at its forward end by a pair of ball bearings 363 and at its rearward end by a pair of ball bearings 364. A gear 365 is keyed to the spindle 62 at its rearward end adjacent to the ball bearings 364, the gear 365 being connected to a source of power (not shown) through a transmission (not shown) in a manner well known in the art to rotate the spindle at a variety of speeds selectively in a well known manner.

The forward end of the spindle 62 is provided with a tapered portion 370 for receiving a collet 371 that includes a complementary tapered portion 372 for engagement with the tapered portion 370 of the spindle 62. The collet 371 is provided with a concentric bore 373 for receiving the shell 116 of the tools 65 and is arranged so that it may be compressed about the shell 116 in a well known manner for locking the tool 65 to the spindle 62. Such compression of the collet 371 for locking a tool 65 therein is achieved by drawing the collet rearwardly to move it into the tapered portion 370 of the spindle 62 so that the complementary tapered portions operate to compress the collet 371 as it is drawn rearwardly. To release the tool, of course, the collet 371 is permitted to move forwardly a slight amount within the tapered portion 370 to relieve the pressure upon the shell 116 for releasing the tool and permitting it to be withdrawn from the spindle 62.

The collet 371 includes a rearwardly extending cylindrical portion 374 which is provided with an internal thread at its rearmost end for threadedly engaging the forward end of a draw bar 375. In addition to being in threaded engagement with the draw bar 375, the cylindrical portion 374 of the collet 371 is provided with a slot 376 which extends parallel to the axes of the collet and is engaged by the end of a set screw 377. The set screw 377 is threaded into the wall of the spindle 62 so that its end extends into the slot 376 to permit limited sliding axial movement of the collet 371 relative to the spindle 62. However, the set screw 377 serves to lock the collet to prevent it from rotating relative to the draw bar 375 so that it will not lose its threaded connection therewith.

The draw bar 375 is disposed within the longitudinal bore of the spindle 62 and serves to transmit the force which moves the collet 371 axially for releasing and clamping the tool 65 to the spindle 62. To this end, the draw bar 375 extends rearwardly of the collect 371 beyond the gear 365, as shown in FIG. 18, and its rear extremity is provided with a thread for threadedly receiving a collar 383. The draw bar 375 is yieldably urged rearwardly of the spindle 62 by a Belleville spring 384 which has one end bearing against the rearmost end of the spindle 62 through a washer 385 while its other end bears against the collar 383 through a spacer 386 so that it normally urges the collar 383, and the draw bar 375 to which the collar 383 is attached, rearwardly of the spindle 62. This force in a rearward direction applied by the spring 384 to the collet 371 through the draw bar 375 serves to draw the collet 371 tightly into the tapered portion 370 of the spindle 62 to cause the collet to contract for clamping a tool 65 therein. A shoulder 378 is formed in the bore of the spindle 62 to limit the rearward movement of the collet 371 for the purpose of preventing its excessive contraction when a tool 65 is not located within its bore 373.

In order to release the tool 65 in the collet 371, it is necessary to shift the collet slightly in a forward direction to move its tapered portion 372 out of tight engagement with the tapered portion 370 of the spindle 62. This is accomplished by an axial force applied to the draw bar 375 by a piston 390 which is actuated by hydraulic pressure admitted through a passage 391 and a port 392 into a cylinder 393 which slidably carries the piston 390, the hydraulic pressure operating against the end of the piston 390 to force it forwardly and move its forward extension 389 against the collar 383. The pressure exerted by the piston 390 moves the collar 383 and its associated draw bar 375 against the force of the spring 384 to compress the spring and effect a slight forward shifting of the collet 371 for releasing the tool 65. When the hydraulic pressure is withdrawn from the cylinder 393, the piston 390 and its associated extension 389 are retracted to their rearmost position by a spring 394 that has one end bearing against a shoulder 395 formed on the piston 390 with the opposite end of the spring 394 bearing against an annular shoulder 396 that extends inwardly from a collar 397.

The collar 397 is in threaded engagement with the forward end of a cylindrical housing 398 that is fixed to the spindle head 60 by suitable screws 399. As the piston 390 is actuated in a forward direction to release the tool 65 in the collet 371, it compresses the spring 394 between the shoulders 395 and 396 by virtue of the fact that the shoulder 396 is fixed with respect to the stationary housing 398, and the piston 390 and associated shoulder 395 move relative to the housing 398. Upon withdrawal of hydraulic pressure in the cylinder 393 the spring 394 acts to force the piston 390 to its rearmost limit of travel to draw its forward extension 389 out of engagement of the collar 383 so that the end of the extension 389 will not interfere with the rotation of the collar 383 with the spindle 62.

The rearward movement of the piston 390 by the spring 394 serves the further purpose of actuating a limit switch 405 to indicate in the electrical control system that the collet 371 is in its clamping position and a machining operation may be performed. In order to actuate the limit switch 405, the piston 390 is provided with a rearwardly extending sleeve portion 406 that is slidably contained within the bore of the housing 398 and its rear end engages the forward end of a pair of pins 407. The latter are slidably supported for axial movement within suitable holes formed in an inwardly extending annular flange 408 which is an integral part of a sleeve 409 that is disposed within the bore of the cylindrical housing 398 and is fixed to the housing by suitable screws 410 that extend through an outwardly extending annular flange 411 fixed to the sleeve 409 and into threaded engagement with the housing 398. The rear end of the pins 407 are in engagement with a cylindrical cam 415 that is slidably carried within the bore of the fixed sleeve 409.

The cylindrical cam 415 is carried forwardly within the bore of the sleeve 409 by a spring 416 which has one end bearing against a shoulder 417 formed on the cylindrical cam 415 and the opposite end of the spring bears against the wall of a housing 418 which is fixed to the spindle head 60 and carries the limit switch 405. The operating end of the cylindrical cam 415 includes a reduced diameter 419 and an enlarged diameter 420 which selectively engage a roller 421 that controls the operation of the limit switch 405. When the roller 421 is in engagement with the enlarged diameter 420 it is forced downwardly, as viewed in FIG. 18, to actuate the limit switch 405. On the other hand, when the cylindrical cam 415 moves forwardly, the reduced diameter portion 419 moves into engagement with the roller 421 to release the switch 405 to its normal position.

The cylindrical cam 415 operates in conjunction with the piston 390 so that the limit switch 405 is actuated when the collet 371 is in its clamping position, the switch 405 then indicating in the electrical control system that the collet is in clamping position so that a machining operation may be performed. On the other hand, when the piston is moved forwardly by hydraulic pressure to release the collet 371 in the manner previously described, the reduced diameter portion 419 of the cylindrical cam 415 moves into engagement with the roller 421 to release the limit switch 405 for the purpose of indicating in the electrical control system that the collet 371 is not in its clamping position.

Movement of the cylindrical cam 415 to actuate the limit switch 405 is caused by the rearward movement of the piston 390 through the operation of the spring 394 when the hydraulic pressure is withdrawn from the cylinder 393 as previously described. As the piston 390 moves rearwardly, the end of its sleeve portion 406 engages the pins 407. The pins 407, in turn, cause the rearward movement of the cylindrical cam 415 against the pressure of the spring 416 to move the enlarged diameter portion 420 into engagement with the roller 421 to actuate the limit switch 405. On the other hand, when pressure is admitted into the cylinder 393 to actuate the piston 390 in a forward direction for releasing the collet 371, the sleeve portion 406 moves forwardly with the piston 390 and the spring 416 associated with the cylindrical cam 415 moves the latter axially in a forward direction until the pins 407 contact the rear end of the sleeve portion 406 to bring the reduced diameter portion 419 of the cam into engagement with the roller 421 for releasing the limit switch 405. Thus, the limit switch 405 indicates in the electrical control system whether the collet 371 is in its released or clamping position.

The spindle 62 is adapted to also perform tapping operations and, as is well known in the art, the rate of rotation of the spindle 62 and its rate of axial feeding movement for feeding the tap into the workpiece must be maintained at a specific relationship in conformance with the pitch of the thread being formed. This predetermined relationship of the rate of rotation of the spindle 62 and its rate of axial feeding movement are established electrically through the operation of suitable servo mechanisms and the proper relationship will be normally maintained by the servo mechanisms during the entire tapping operation. However, in the event that the feeding movement of the spindle 62 toward the workpiece should become disproportionate to its rate of rotation for the particular tapping tool in the tool 65, the feed rate will be either increased or reduced as required, by the operation of a pair of limit switches 425 and 426.

Figure 19:
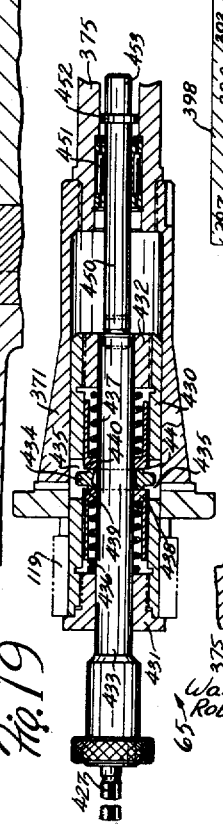
FIG. 19 is a detail view partly in side elevation and partly in vertical section taken through the center of a tapping tool adapted to operate with the spindle shown in FIGS. 17 and 18.

In order to provide for the actuation of the limit switches 425 and 426 to accommodate for an error in the feed rate of the spindle 62, a floating mounting is provided for the tapping cutter so that it may move axially relative to the spindle 62. The specific arrangement of a tool 65 which carries a tapping cutter 427 is illustrated in FIG. 19. The tapping tool arrangement, as there shown, comprises a shell 430 which is of the same diameter as the shell 116 of the conventional tool 65 for insertion into the collet 371. Both ends of the shell 430 have internal threads for receiving a front plug 431 and back plug 432 with the front plug 431 in threaded engagement with the forward end of the shell 430 and the back plug 432 being likewise threaded into the back end of the shell 430.

Both plugs 431 and 432 have a concentric hole for slidably supporting a holder 433 which carries the tapping cutter 427. The holder 433 and its associated tapping cutter 427 are therefore carried by the two plugs 431 and 432 with the holder 433 being slidable axially relative to the plugs. The holder 433 is retained within the shell 430 by a pin 434 that extends diametrically through the holder 433 with both ends of the pin 434 extending beyond the periphery of the holder 433 and into a pair of slots 435 that extend through the wall of the shell 430 and are diametrically opposed. Since the pin 434 extends into the slots 435, the holder 433 may move axially a limited amount relative to the shell 430 which is clamped to the spindle 62 by the collet 371. On the other hand, the width of each slot 435 conforms to the diameter of the pin 434 so that the rotational movement of the spindle 62 will be imparted immediately to holder 433 through the shell 430 and the pin 434 so that the holder will rotate with the spindle.

The holder 433 is normally maintained in a position with respect to the shell 430 so that the pin 434 is centrally located with respect to the length of the slots 435. Such positioning of the holder 433 is effected by a pair of opposed springs 436 and 437 that are disposed about the holder 433 within the shell 430. One end of the spring 436 bears against the front plug 431 while its opposite end bears against a washer 438, forcing the washer 438 against a shoulder 439 that is formed along the inner diameter of the shell 430. In like manner, the spring 437 has one end bearing against the back plug 432 and its other end against a washer 440 with the forward movement of the washer 440 in response to the action of the spring 437 being limited by a shoulder 441 that is also formed along the inner diameter of the shell 430. Both of the washers 438 and 440 engage the pin 434 for positioning the holder 433. The springs 436 and 437 force the washers against the shoulders 439 and 441 respectively to center the pin 434 along the length of the slot 435, as illustrated in FIG. 19.

The shoulders 439 and 441 serve to prevent the springs from assisting in the movement of the holder 433 in opposition to the other spring. Thus, if the axial feeding movement of the spindle head 60 is too slow for the rate of rotation of the spindle 62 to perform a tapping operation of the desired pitch, the tapping cutter 427 will tend to draw the holder 433 forwardly. Such forward movement of the holder 433 will serve to compress the spring 436 but the spring 437 will have no influence whatsoever on the movement in view of the fact that the washer 440 is bearing against the shoulder 441 and cannot move any further forwardly. The force developed by the rotation of the tapping cutter 427 will therefore act alone to draw the holder 433 forwardly against the pressure of the spring 436. If the feed rate of the spindle head 60 is too fast for the particular tapping operation being performed, of course, the holder 433 will shift rearwardly against the pressure of the spring 437 while the spring 436 will continue to force the washer 438 against the shoulder 439 and will have no influence on the rearward movement of the holder 433.

It will be noted that the spring 436 urges the holder 433 rearwardly and it is preferred that this spring be weaker than the spring 437. The strength of the spring 437 must be sufficient to withstand the forces developed in performing a tapping operation but the spring 436 may be substantially weaker so that it will apply a much smaller pressure to move the holder 433 rearwardly. With this arrangement the possibility of breaking the last few threads of the tapped hole when the tap is being withdrawn is reduced to a minimum since the spring 436 will yield readily to relieve the excessive forces that may develop on the threads when the tap is being withdrawn.

The purpose of the limited axial movement of the holder 433 is to apply a corrective action which serves to reduce or increase the feed rate as required. To this end, the rear end of the holder 433 is engaged by a bar 450 which is slidably supported by a bushing 451 within the longitudinal bore of the draw bar 375. The bar 450 extends rearwardly of the holder 433 and includes a flange 452 which is abutted by the forward end of a tube 453 that embraces the rear end of the bar 450 and is fixed thereto by any suitable means so that the tube 453 will move with the bar 450. The tube 453 is also slidably supported within the longitudinal bore of the bar 375 and extends rearwardly of its connection with the bar 450, being coupled at its rear end to another bar 454, as shown in FIG. 18. The bar 454 is slidably supported for axial movement by a bushing 455 contained at the rear end of the draw bar 375 so that the bar 450, the tube 453 and the bar 454 are freely movable for axial movement as a unit within the longitudinal bore of the draw bar 375.

The bar 454 extends rearwardly of the draw bar 375 into a bore of the forward extension 389 that is formed integrally with the piston 390. The rear end of the bar 454 is journalled in a bearing 461 which is retained within a collar 462 by a snap ring 463. The forward end of a tube 464 also extends into the bore of the collar 462 and is coupled thereto by a pin 465 so that the collar 462 serves as a coupling for connecting the bar 454 to the tube 464 so that these two members will move together. The tube 464 is supported for sliding axial movement by a pair of bushings 467 and 468 within a forwardly extending and reduced diameter portion 469 of the sleeve 409. Since the sleeve 409 is fixed relative to the spindle head 60, as previously described, the forwardly extending portion 469 thereof is likewise fixed relative to the spindle head 60.

A pin 470 is secured to the reduced diameter portion 469 within suitable radial holes formed in the portion 469 so that the pin 470 is also fixed relative to the spindle head 60. The pin 470 extends through a pair of diametrically opposed slots 471 formed in the tube 464 so that the tube may move a limited amount relative to the pin 470 and its associated sleeve portion 469. A spring 475 is contained within the bore of the tube 464 between the pin 470 and a plug 476 that is threaded into the forward end of the tube 464. The spring 475 is compressed between the plug 476 and the pin 470, and since the latter is fixed, it tends to urge the tube 464, the bar 454, the tube 453 and the bar 450 forwardly to move the forward end of the bar 450 into contact with the rear end of the holder 433. However, the force of the spring 475 is not sufficient to overcome the force exerted by the spring 436 on the holder 433 but it does retain the end of the bar 450 in engagement with the end of the holder 433.

Another bar 480 is slidably supported within the bore of the cylindrical cam 415 and extends into the bore of the tube 464, being suitably secured therein so that the bar 480 will move with the tube 464 in its axial movement. The rear end of the bar 480 carries a cylindrical cam 481 which functions to operate the two limit switches 425 and 426. The periphery of the cylindrical cam 481 is provided with a groove 482 that cooperates with the limit switch 425 and a second groove 483 that cooperates with the limit switch 426. A roller 484 that controls the operation of the limit switch 425 is received within the groove 482 while a roller 485 that controls the operation of the limit switch 426 is received within the groove 483.

It will be observed that the grooves 482 and 483 are in such relationship to the rollers 484 and 485 respectively, that a slight forward movement of the cam 481 will operate to actuate the roller 484 and its associated limit switch 425 while the roller 485 will merely ride in its associated groove 483 without being actuated. Conversely, a slight rearward movement of the cam 481 will actuate the roller 485 and its associated limit switch 426 while the roller 484 will then merely ride in the groove 482 without being actuated. Therefore, if the rate of the forward feeding movement of the spindle head 60 is excessive for the particular threading operation that is being performed, the holder 433 will move rearwardly a slight amount to move the cam 481 a like amount by reason of the connections previously described, against the force of the spring 475, and the limit switch 426 will be actuated to reduce the rate of feeding movement by a small amount. In like manner, if the forward feeding movement of the spindle head 60 is too slow for the threading operation being performed, the holder 433 will move forwardly a slight amount and the cylindrical cam 481 will move forwardly a like amount by operation of the spring 475 which maintains the forward end of the bar 450 in engagement with the rear end of the holder 433. The cam 481 will then actuate the roller 484 and its associated limit switch 425 to increase the feeding movement a compensatory amount. During the reverse feeding movement when withdrawing a tap from the threaded hole, the switches will be actuated in the opposite manner and the electrical circuit is arranged to accommodate the reverse as well as the forward feeding movement in a manner to be subsequently described.

On the other hand, if such axial movement of the cylindrical cam 481 is excessive, the switches will not be actuated individually as described, but both switches 425 and 426 will be actuated and the electrical control system will respond to terminate the machining operation then being performed so that corrective measures can be taken. It is therefore apparent that during a threading operation, the limit switches 425 and 426 will operate to compensate for a slight error in the rate of the feeding movement relative to the rate of rotation of the spindle 62 and if such error becomes excessive, the operation of the machine will be terminated automatically upon the actuation of both of the limit switches 425 and 526.

The hydraulic circuit for driving the various components described above is illustrated diagrammatically in FIG. 21 and comprises a pump 490 connected to draw hydraulic fluid from a reservoir 491. The output of the pump 490 is discharged into a pressure line 492 and a branch pressure line 493 with the exhaust fluid being carried back to the reservoir by a pair of return lines 494 and 495. The cross feeding movement of the spindle head 60 for feeding the spindle 62 toward and away from the workpiece is effected by a hydraulic motor 501 which is actuated by hydraulic pressure from the line 492 under the control of a hydraulic servo valve 502 that may be operated automatically in response to recorded data or by the manual manipulation of the electrical control circuit for controlling the rate and direction of rotation of the cross feed motor 501 to regulate the rate and direction of movement of the spindle head 60.

The spindle 62 is driven in its rotary movement by a hydraulic motor 505 under the control of another hydraulic servo valve 506 that is likewise controlled automatically either from recorded data or by the manual manipulation of the electrical control system. The hydraulic motor 505 is connected to drive the gear 365 and its associated spindle 62 through a range change transmission which in combination with the infinitely variable speed obtainable from the motor 505 provides a wide range of spindle speeds.

Hydraulic pressure from the lines 492 is also directed selectively to the cylinder 393 for actuating the piston 390 to compress the spring 384 for shifting the collet 371 forwardly for releasing the tool in the spindle 62. The flow of hydraulic pressure to the cylinder 393 is under the control of a valve 509 which is normally positioned to connect the cylinder 393 to the return line 494 so that the spring 384 may expand and draw the collet 371 to its clamping position for retaining a tool in the spindle 62. When it is desired to release the tool in the spindle 62, a solenoid coil 510 may be energized to actuate the valve which then serves to connect the pressure line 492 to the cylinder 393 for actuating the piston 390 to compress the spring 384 and release the tool within the collet 371.

The piston and cylinder mechanism 301 for extending and retracting the tool change arm 71 is under the control of a pair of directional valves 514 and 515 which normally connect both ends of the cylinder to the return line 494, as shown in FIG. 21. The valve 514 may be actuated by energizing a solenoid coil 516 while the valve 515 may be actuated by energizing a solenoid coil 517. Actuation of the valve 514 will position the valve to connect the left end of the cylinder 301, as viewed in FIG. 21, to the pressure line 492 to move the piston in a rightward direction for retracting the tool change arm 71. On the other hand, energization of the solenoid 517 will actuate the valve 515 to connect the opposite end of the cylinder 301 to the pressure line 492 for actuating its associated piston in a direction to extend the change arm 71. A throttle valve 518 is connected in a return line 519 that carries exhaust pressure from the piston and cylinder mechanism 301 to the return line 494 so that the rate of extension of the tool change arm 71 may be regulated. In like manner, a throttle valve 520 is connected in the line 521 which carries exhaust pressure from the opposite side of the piston and cylinder mechanism 301 so that the rate of retraction of the tool change arm 71 may be regulated.

Operation of the motor 130 for rotating the tool carrying ring 81 to move the tool storage sockets 115 in their circular path of travel is under the control of a pair of directional valves 527 and 528. Both of these valves are normally positioned to connect both sides of the motor 130 to the return line 494. The valve 528 may be actuated by energizing a solenoid coil 529 which will serve to connect a port of the motor 130 to the pressure line 492 for driving the ring 81 in a reverse direction. When the valve 528 is actuated, the exhaust from the motor 130 will flow through a line 530 and will by-pass a check valve 531 to flow through a throttle valve 532 that is set to establish a slow rate of rotation of the motor 130 so that the tool carrying ring 81 will be driven in a reverse direction at a creep rate for the purpose of positioning the selected tool storage socket in the manner previously described. From the throttle valve 532 the exhaust pressure flows through a line 533 and through the valve 527 to the return line 494, the valve 527 being in its normal position.

To effect a forward rotation of the tool carrying ring 81 for selecting the desired tool 65 from one of the tool storage sockets 115, the solenoid coil 529 is de-energized to place the valve 528 in its normal position for connecting a port of the motor to the return line 494. However, the valve 527 is actuated by energizing a solenoid coil 534 to direct hydraulic pressure from the pressure line 492 to a port of the motor 130 for driving it at its normal rate. The pressure will flow through the line 533 and the check valve 531 to the line 530 to the motor 130. The exhaust pressure will flow through a line 535 through a throttle valve 536 which establishes the forward rate of rotation of the motor 130. The exhaust fluid then continues through a line 537 and the valve 528 to the return line 494.

The hydraulic pressure in the line 533 for driving the tool carrying ring 81 in a forward direction also flows into a branch line 542 to the cylinder 163 for actuating the plunger 164 to pivot the rocker arm 157 upwardly against the pressure of the spring 165 so that it does not contact the coupling sleeve 161 that is associated with the output shaft 131 of the motor 130 and which is provided with the flats 160. During the reverse rotation of the motor 130 and the tool carrying ring 81, line pressure is not directed into the line 542 so that the plunger 164 is released and the spring 165 forces the rocker arm 157 downwardly in its pivotal movement into engagement with the coupling sleeve 161 upon which the flats 160 are formed. The reverse rotation of the tool carrying ring 81 will then continue as previously described until one of the flats 160 is in alignment with the bottom surface of the rocker arm 157 to permit the rocker arm to actuate the switch 150 for stopping the operation of the motor 130. At this time, the selected tool storage socket 115 will be accurately located at the tool change station 105.

As previously described, the rotary movement of the tool change arm 71 is effected by the hydraulic actuating mechanisms 321 and 322. The flow of hydraulic pressure to and from the plungers 325 and 325A and the sleeves 326 and 326A is controlled by three directional valves 543, 544 and 545. The line pressure from the pump 490 is carried to the three valves by a branch line 546 that receives the pressure from the branch pressure line 493.

The valve 543 controls the operation of the sleeves 326 and 326A being connected to the annular passage in which the sleeves are located by a line 347 and a line 348 which is connected to the annular passages. In its normal position, the valve 543 connects the annular passages containing the sleeves 326 and 326A to the return line 495 so that the sleeves are freely movable in either direction. However, the valve 543 may be actuated by energizing a solenoid coil 549, and such actuation of the valve 543 operates to connect the annular passages containing the sleeves 326 and 326A with the pressure line 546 so that both of the sleeves are simultaneously actuated to their inner position against the shoulders 327 and 327A which are illustrated in FIG. 10.

The plungers 325 and 325A are actuated individually and selectively by the operation of the valves 544 and 545 respectively. The valve 544 is connected to the bore of the cylinder 324 by a line 550 and normally connects the cylinder to the return line 495 so that line pressure is not applied to the plunger 325. However, the valve 544 may be actuated by energizing a solenoid coil 551 and actuation of the valve connects the pressure line 546 to the line 550 for directing pressure to the cylinder 324 to actuate the plunger 325 for shifting the plunger 284 in the manner previously described.

In like manner, when the valve 545 is in its normal position it connects the cylinder 324A with the return line 495 to allow the plunger 325A to move freely within its cooperating cylinder 324A. Pressure may be applied to the plunger 325A to force it against the plunger 284 by actuating the valve 545 through energization of a solenoid coil 552. Actuation of the valve 545 functions to connect the pressure line 546 to a line 553 for carrying the pressure to the cylinder 324A to actuate the plunger 325A. It is therefore apparent that pressure may be applied to the plungers 325 and 325A either individually or simultaneously by the selective operation of the valves 544 and 545 while actuation of the directional valve 543 will operate to apply pressure to both of the sleeves 326 and 326A simultaneously. The actuation of the valves 543, 544 and 545 by energization of their associated solenoid coils will therefore establish the four positions of the plunger 284 to obtain the four rotary positions of the tool change arm 71 in the manner previously described.

In accordance with the previous description, the piston and cylinder mechanism 176 operates to pivot the selected tool storage socket 115 and the hydraulic unit 72 outwardly at the tool change station 105 for moving the selected tool 65 out of the magazine 70 and swinging the tool change arm 71 to its operating position. The piston and cylinder mechanism 176 is operated by hydraulic pressure from the branch pressure line 493 under the control of a pair of directional valves 558 and 559. The valve 558 is normally positioned to connect the left end of the cylinder 176, as viewed in FIG. 21, to the return line 495 through a throttle valve 560 while the valve 559 is likewise normally positioned to connect the right side of the cylinder 176 to the return line 495 through a throttle valve 561. The valve 558 may be actuated by energizing a solenoid coil 562 and actuation of the valve will operate to direct hydraulic pressure from the branch pressure line 493 through a line 563 to the left end of the cylinder 176. Pressure applied to the left end of the cylinder 176 will force its associated piston to the retracted position wherein the tool storage socket 115 will be retracted within the magazine 70 and the hydraulic unit 72 will be pivoted to swing the tool change arm 71 to its inoperative position.

The valve 559 may be actuated by energizing a solenoid coil 564 for directing hydraulic pressure from the branch pressure line 493 through a conduit 565 to the right end of the cylinder 176, as viewed in FIG. 21. The hydraulic pressure applied to the right end of the cylinder 176 will force its associated piston in a leftward direction for effecting the pivotal movement of the selected tool storage socket 115 outwardly of the magazine 70 and for pivoting the hydraulic unit 72 in a direction to swing the tool change arm 71 to its operative position. When the valve 559 is actuated, the valve 558 will be deactuated and the exhaust pressure from the cylinder 176 will be directed to the return line 495 through the valve 558 and the throttle valve 560 so that the rate of the pivoting movement will be established by the setting of the throttle valve 560. On the other hand, when these members are being retracted, the exhaust pressure from the piston and cylinder mechanism 176 will flow through the deactuated valve 559 and the throttle valve 561 so that the latter establishes the rate of the retracting movement.

The electrical control circuit for controlling the operation of the machine is shown in the wiring diagrams illustrated in FIGS. 29, 30 and 31. In these diagrams the direct current components obtain power from a direct current power line DC–1 and are connected to ground represented by the line DC–2. The alternating current components are connected across a pair of alternating current power lines AC–1 and AC–2, as illustrated in FIG. 30. Each of the electrical components is shown in the wiring diagrams as connected across the power lines in one of the plurality of conductors or lines that are connected across the power lines with each of these lines being identified successively by the numerals L1 to L114 inclusive, so that the components may be readily located in the diagrams. The contacts of the various relays are identified by the same reference numerals and letters as their associated relay coils with a numeral suffix added for the purpose of distinguishing each individual contact from the others. Some of the relays have a coil appearing in one figure and one or more of its contacts in another figure. In such cases, the relay coil is depicted in solid lines in its appropriate location in the circuit, and its showing is repeated in broken lines, disconnected from the wiring circuit, in the other figures which contain some of its contacts. With this arrangement it may be immediately ascertained that such contacts are actuated by a relay coil which is connected in a portion of the circuit that is shown in another figure.

The power lines are energized by closing a manually operated master switch 575 which is shown on line L25 in FIG. 30. Closing of the switch 575 operates to energize the coil of a master relay CRM which has two normally open contacts CRM–1 and CRM–2 that are connected in the power lines. Energization of the master relay CRM causes the closing of its associated contacts CRM–1 and CMR–2 to energize the power lines. Energization of the relay CRM also closes a normally open contact CRM–3 to establish a holding circuit for maintaining the relay CRM energized when the switch 575 is released. The power lines are de-energized by actuating a stop switch 577 to break the circuit to the master relay CRM.

As previously mentioned, the machine may be operated entirely automatically from recorded data contained on the record such as magnetic or punched tape 579 which is read by a tape reader 578 shown diagrammatically in FIG. 30. If the machine is to be placed under the control of signals received from such recorded data, a manually operated switch 576 is closed to complete the circuit to three automatic relays 7CRA, 8CRA and 9CRA. The energization of these relays will condition the entire electrical control circuit for operation in response to signals received from the record. For example, the energization of the relay 7CRA closes its normally open contact 7CRA–5 in line L74 to electrically connect the tape reader 578 in the circuit. The tape reader 578 functions to produce the appropriate electrical signals in response to the information contained on the tape 579 for fully automatic operation of the machine. If the various functions of the machine are to be initiated by the manual operation of switches, the switch 576 is allowed to remain in its open position so that the automatic relays 7CRA, 8CRA and 9CRA are not energized.

The electrical tool designation circuit that operates in conjunction with the tool reading head 140 is illustrated in FIG. 29 and is energized by the direct current power line DC–1. The initial step in the operation is to indicate in the electrical control system which one of the tools 65 is to be operated with the spindle 62 for performing the succeeding machining operation. It will be recalled that each of the tools 65 is identified by a number and is coded in accordance with the binary numbering system with five digits of the binary system being provided to make thirty-one numbers available for identifying the thirty-one tools 65. The number of the desired tool may be impressed upon the electrical control system manually, or it may be done automatically in response to signals from recorded data.

The desired tool number is manually impressed upon the electrical control system by actuating a plurality of manually operated switches 581, 582, 583, 584 and 585, either singly or in any combination, to indicate in the electrical control system that any one of the tools numbered from 1 to 31 inclusive, is desired to be placed in the spindle 62. The switch 581 represents the first digit of the binary number while each succeeding switch represents the succeeding digit of the number with the switch 585 representing the fifth digit.

For automatic indication of the desired tool to be placed in the spindle 62 a plurality of normally open contacts 591, 592, 593, 594 and 595 are provided and are closed in response to signals from the record as for example, the electrical signals produced by the tape reader 578 from the tape. Contact 591 represents the first digit of the binary number and each succeeding contact represents a succeeding digit with the contact 595 representing the fifth digit of the number. Thus, if the machine is being operated from recorded data the switches 581 to 585 inclusive, will not be actuated but the contacts 591 to 595 will be closed in response to a signal from the record, the contacts being closed either singly or in any combination to indicate the number of the desired tool in the electrical control system.

The manually operated switches 581 to 585 inclusive, and the automatic contacts 591 to 595 inclusive, operate to complete circuits for energizing a plurality of relays 15CRE, 16CRE, 17CRE, 18CRE and 19CRE respectively. Thus, if tool No. 1 is desired to be placed in the spindle 62 for the succeeding machining operation and the machine is being manually controlled, only the switch 581 will be closed to indicate the numeral 1 for the first digit of the binary number. Since the machine is being manually controlled, the relay 8CRA is not energized and its associated contact 8CRA–5 in line L1 will remain closed. A circuit will therefore be completed from the power line DC–1 through the closed contact 8CRA–5, the closed switch 581, a rectifier 601 to the coil of the relay 15CRE and thence to ground represented by the line DC–2. Energization of the relay 15CRE will represent the numeral 1 in the first digit of the binary number. If none of the other relays 16CRE, 17CRE, 18CRE or 19CRE are energized, the binary number indicated will be 00001 and tool No. 1 will be selected for placement in the spindle 62 for performing the succeeding machining operation.

With the machine under the control of recorded data, the relay 8CRA will be energized and its associated normally closed contact 8CRA–5 in line L1 would be open so that a circuit cannot be completed to any of the relays 15CRE to 19CRE through the manually operated switches 581 to 585 inclusive. However, energization of the automatic relay 8CRA will close its normally open contact 8CRA–6 in line L3 to enable any of the relays to be energized by closing any of the normally open automatic contacts 591 to 595 inclusive. Assuming, for the sake of example, that tool No. 1 is again desired, only the contact 591 will be closed. Closing of the contact 591 will serve to energize the relay 15CRE, the current flowing from the line DC–1 to the now closed contact 8CRA–6, the closed contact 591, a rectifier 602, and a conductor 603 to the relay 15CRE and thence to the ground DC–2.

It will be noted that five rectifiers 601 are provided, one for each of the manually operated switches 581 to 585 inclusive, and five rectifiers 602 are provided, one for each of the automatically operated contacts 591 to 595 inclusive. These rectifiers in combination with the contacts 8CRA–5 and 8CRA–6 serve to isolate the manual mode of operation from the automatic mode of operation in connection with recorded data, since the rectifiers will permit the flow of current toward the ground DC–2 only and will not allow a flow of current in the reverse direction. Since each of the five rectifiers 601 and each of the five rectifiers 602 function in the same manner with one rectifier 601 being provided for each of the manually operated switches and one rectifier 602 being provided for each of the automatically operated contacts, the five rectifiers operating with the manually operated switches have been identified by the same reference numeral 601, and the five rectifiers operating with the automatic contacts have been identified by the same reference numeral 602.

A latching relay 20CRE is provided in the circuit for operation with the switch 581 or the automatic contact 591 and, as well known in the art, the latching relay 20CRE, once energized, will not be deactuated when its coil is deenergized but will only be deactuated when its cooperating unlatching relay 20CREU is energized. In like manner, a latching relay 21CRE is provided for operation with the switch 582 and the automatic contact 592 with an unlatching relay 21CREU being provided for deactuating the latching relay 21CRE. Likewise, a latching relay 22CRE is provided for operation with the switch 583 and the contact 593 and it is deactuated by an unlatching relay 22CREU. Another latching relay 23CRE is provided orf operation with the switch 584 and the automatic contact 594 and it is deactuated by the energization of an unlatching relay 23CREU. In like manner, a latching relay 24CRE is included in the circuit for operation with the switch 585 and the automatic contact 595, with an unlatching relay 24CREU being provided for deactuating the latching relay 24CRE.

Five rectifiers 604 are provided in the circuit with one of the rectifiers 604 being connected in the same line with the coils of each of the latching relays 20CRE to 24CRE inclusive. The purpose of the rectifiers 604 is to prevent the energization of the latching relays 20CRE to 24CRE at the same time that the relays 15CRE to 19CRE are energized. By reason of the presence of the rectifiers 604, the latching relays 20CRE to 24CRE can only be energized through a common conductor 610 and the closing of a normally open contact 26CRE–1 in line L17 as well as the closing of either one of a pair of normally open contacts 2CRL–1 and 3CRL–1.

It will be recalled that the reading head 140 was previously described as having five movable fingers 141 which engage the binary coding on the collars 119 of each of the tools 65 as they move in their circular path past the reading head and that each of the fingers 141 is connected to operate one of the five switches 146 whenever it was shifted by the presence of a land 135 on the collar 119 along the peripheral strips with which the individual fingers 141 are in contact. The five switches 146 are shown diagrammatically in FIG. 29 in line L21 with the reference numerals for the five switches and their component parts being provided with a numerical suffix from 1 to 5 respectively for indicating the digit of the binary number which each switch represents. Thus, the reference numeral 146–1, in FIG. 29, indicates the switch 146 that represents the first digit of the binary number and its components are also provided with the suffix 1. In like manner, the reference numeral 146–5, in FIG. 29, identifies the switch 146 that represents the fifth digit of the binary number.

Each of the switches 146–1 to 146–5 inclusive, operates in conjunction with a normally open contact and a normally closed contact of one of the five relays 15CRE to 19CRE inclusive, with each switch 146 functioning with the contacts of the relay which represents the same digit of the binary number that the switch does. Thus, switch 146–1 operates in conjunction with the normally open contact 15CRE–3 and a normally closed contact 15CRE–4 both of which are actuated by energization of the relay 15CRE. Likewise, the switch 146–2 operates in conjunction with two contacts of the relay 16CRE, one being a normally open contact 16CRE–3 while the other is a normally closed contact 16CRE–4. In like manner, the switch 146–3 operates in conjunction with the contacts 17CRE–3 and 17CRE–4 of the relay 17CRE while the switch 146–4 operates in cooperation with the contacts 18CRE–3 and 18CRE–4 of the relay 18CRE and the switch 146–5 operates in association with two contacts 19CRE–3 and 19CRE–4 of the relay 19CRE. The operation of the switches 146–1 to 146–5 inclusive in combination with the operation of the relays 15CRE to 19CRE inclusive will indicate in the electrical control circuit when the desired tool arrives at the tool change station 105.

In the present example it has been assumed that tool No. 1 is desired and therefore only relay 15CRE has been energized. As a result, the normally open contact 15CRE–3 line L20 has been closed by energization of the relay 15CRE and its normally closed contact 15CRE–4 has been opened. Since the contact 15CRE–4 has been opened, a circuit cannot be completed to a relay 26CRE which, when energized, indicates that the desired tool has arrived at the change station 105. However, when a tool with only one land 135 located along the peripheral strip that represents the first digit of the binary number arrives at the tool change station 105, the first finger 141 representing the first digit of the binary number will be actuated to actuate its associated switch 146–1. Actuation of the switch 146–1 will move its cooperating contact bar 145–1 out of engagement with the contact 147–1 and into engagement with the contact 148–1. When this occurs, a circuit will be completed to the relay 26CRE through the contact bar 145–1 the closed contact 15CRE–3, the contact bar 145–2, and thence through the other switch contact bars and normally closed relay contacts shown in lines L19 and L20 of FIG. 29.

If tool No. 17 represented by the binary number 10001 were desired instead of tool No. 1, the relay 19CRE would also be energized by actuation of the manually operated switch 585 or by the closing of the automatic contact 595 in response to a signal from the recorded data. Energization of the relay 19CRE would cause the closure of its associated contact 19CRE–3 in line L20 and the opening of its normally closed contact 19CRE–4 in line L22. It is apparent, therefore, that the switch 146–5 would also have to be actuated by the presence of a land 135 on the peripheral strip representing the fifth digit of the binary number while the switch 146–1 would again have to be actuated by the presence of a land 135 on the peripheral strip representing the first digit of the binary number to indicate the numeral "1" for the first and fifth digits of the binary number. With both of these switches actuated the circuit would be completed to the relay 26CRE when coincidence is obtained by the location of the tool No. 17 at the tool change station 105.

The purpose of the five latching relays 20CRE to 24CRE inclusive is to store the number that has been impressed upon the electrical control circuit by the selective actuation of the switches 581 to 585 or the selective closure of the contacts 591 to 595 in the manner previously described. The five latching relays 20CRE to 24CRE operate in conjunction with the five relays 15CRE to 19CRE respectively. Thus, the latching relay 20CRE will be energized after the relay 15CRE is energized to indicate the presence of the numeral "1" in the first digit of the binary number. In like manner, the latching relay 21CRE will be energized after the relay 16CRE is energized by actuation of the switch 582 or the closing of the contacts 592. In the same manner, the latching relay 22CRE operates with the relay 17CRE, the latching relay 23CRE operates with the relay 18CRE, and the latching relay 24CRE will be energized after the relay 19CRE is energized to indicate the presence of the numeral "1" in the fifth digit of the binary number.

However, as previously described, the desired tool is moved to the tool change station 105 while a preceding machining operation is being performed and it is desired to retain the identifying number of the preceding tool stored in the latching relays until the tool change is to actually take place. For this reason the latching relays are not energized simultaneously with the selection relays 15CRE to 19CRE but are energized only when a normally open contact 26CRE–1 in line L17 is closed and either one of two normally open contacts 2CRL–1 or 3CRL–1 are closed, the latter two contacts being closed when the tool change is about to take place.

The number of the preceding tool used in the spindle 62 will, therefore, be stored in the latching relays until the tool change actually takes place. When this occurs, one or the other of the normally open contacts 2CRL–1 or 3CRL–1 in lines L18 and L17 will be closed and the selected ones of the latching relays 20CRE to 24CRE will be energized.

At the time that the latching relays are energized, upon closure of the contact 26CRE–1 and one of the normally open contacts 2CRL–1 or 3CRL–1, all of the unlatching relays 20CREU to 24CREU will be energized to unlatch their associated latching relays. The energization of the unlatching relays occurs through a normally closed contact 25CRE–1 in line L15, and a common conductor 611 to each of the unlatching relays. The circuit then continues from each of the unlatching relays through the common conductor 610, the now closed contact 26CRE–1 and the closed contact 2CRL–1 or 3CRL–1 to the ground DC–2. During this period, since the unlatching relays are energized, the latching relays 20CRE to 24CRE will behave as normal relays, but the latching relays 20CRE to 24CRE will be energized only in the combination which identifies the desired tool number as previously selected.

For example, assuming again that the machine is under automatic control and tool No. 17 is desired, the binary number 10001 identifies tool No. 17 and therefore relays 15CRE and 19CRE representing the first and fifth digits of the binary number will be energized. Upon closure of the contacts 26CRE–1 and either 2CRL–1 or 3CRL–1, the corresponding latching relays 20CRE and 24CRE will be energized. The circuit for energizing these two relays is completed from the power line DC–1 through the now closed automatic contact 8CRA–6, the now closed automatic contact 591, the rectifier 602, the rectifier 604 to the relay 20CRE and thence through the common conductor 610 and the now closed contact 26CRE–1 and either the now closed contact 2CRL–1 or contact 3CRL–1 to the ground DC–2.

Similarly, the latching relay 24CRE will be energized by a flow of current through the automatic contact 8CRA–6, a common conductor 612, the now closed automatic contact 595, the rectifier 602 and the rectifier 604 to the relay 24CRE. The flow of current then continues from the relay 24CRE to the common conductor 610 and thence through the closed contact 26CRE–1 and the closed contact 2CRL–1 or 3CRL–1 to the ground DC–2. Both latching relays 20CRE and 24CRE are, therefore, energized to store the No. 17 which identifies the desired tool. In order to store this number in the latching relays it is necessary to de-energize the unlatching relays 20CREU to 24CREU and this is accomplished by energizing a relay 25CRE in a manner to be described to open the normally closed contact 25CRE–1 in line L15. With this contact open, the circuit to the unlatching relays will be broken so that the two latching relays 20CRE and 24CRE which produce the binary number 10001 will remain actuated even though the automatic contacts 591 and 595 through which they were energized will be opened, until the unlatching relays are again energized when the succeeding tool change is to take place.

As previously described, when the desired tool 65 is moved to the tool change station 105, the tool carrying ring will overrun slightly and is then reversed at a creep rate to accurately locate the desired tool 65 at the tool change station 105. The switches 146 will be deactuated during this overrun of the ring 81 and the relay 26CRE would, therefore, be de-energized upon deactuation of the switches. In order to avoid this, a holding circuit is provided for the relay 26CRE with the current flowing from the power line DC–1 through a normally closed contact 32CR–1 in line L23 and a now closed contact 26CRE–2 to the relay 26CRE. The ring 81 is moved at a creep rate in the reverse direction until the limit switch 150 is actuated by the rocker arm 157, as previously described. When this occurs, the relay 32CR, shown in FIG. 30, on line L39 will be energized to open the normally closed contact 32CR–1 in line L23. This will break the holding circuit for the relay 26CRE but the switch 146 will then be actuated by the accurate location of the desired tool 65 so that de-energization of the relay 26CRE will not occur.

Thus, the tool at the change station 105 is read twice as a check to insure that the proper tool is at the change station. If, for some reason, the coding on the tool was erroneously read when the tool was first identified by the reading head, this may be corrected when the tool 65 is again moved into engagement with the fingers 141 when the ring 81 is reversed. If the second reading does not correspond to the first reading, coincidence will not be obtained in the circuit and the relay 26CRE will become de-energized. The ring 81 will then start rotating again to continue its search for the desired tool.

The energization of the relay 25CRE will not occur until such time as there is coincidence in the energization of the selected relays 15CRE to 19CRE and their corresponding latching relays 20CRE to 24CRE respectively, by reason of the circuit shown in lines L18 and L19 of FIG. 29. Thus, since in the above described example, tool No. 17 was desired for the succeeding machining operation, relays 15CRE and 19CRE were energized to yield the binary number 10001 which corresponds to the decimal system No. 17. However, their corresponding latching relays 20CRE and 24CRE will not be energized until the selected tool is located at the tool change station 105 to energize the relay 26CRE for closing its normally open contact 26CRE–1, and until one or the other of the contacts 2CRL–1 or 3CRL–1 are closed by energization of their cooperating relays.

When only the tool selection relays 15CRE and 19CRE are energized, the normally open contacts 15CRE–1 and 19CRE–1 in line L18 will be closed and the normally closed contacts 15CRE–2 and 19CRE–2 in line L19 will be open. However the contacts associated with them, 20CRE–1 and 24CRE–1 in line L18 will remain open while the contacts 20CRE–2 and 24CRE–2 in line L19 will remain closed. A circuit, therefore, cannot be completed to the relay 25CRE. However, when the two latching relays 20CRE and 24CRE are energized in the manner previously described, their associated contacts in lines L18 and L19 will be actuated to complete the circuit to the relay 25CRE. Thus, the current will flow from the power line DC–1 through the now closed contacts 15CRE–1 and 20CRE–1, through a conductor 613, and thence through the closed contacts 16CRE–2, 21CRE–2, 17CRE–2, 22CRE–2, 18CRE–2, 23CRE–2, a conductor 614, the now closed contacts 19CRE–1 and 24CRE–1, and a conductor 615 to the relay 25CRE and thence to the ground DC–2. Energization of the relay 25CRE will open its normally closed contact 25CRE–1 in line L15 to de-energize the unlatching relays 20CREU to 24CREU inclusive so that the energized associated latching relays will not be deactuated until the unlatching relays are again energized.

An alternate form of reading head generally identified by the reference numeral 620 is illustrated in FIGS. 32 to 34 inclusive, the reading head 620 being operable to replace the reading head 140 which was previously described although the coding arrangement on the collar 119 of the tools 65 would have to be modified to accommodate the alternate form of reading head 620. The advantage of the reading head 620 lies in the fact that the "0" digits of the binary number must be positively identified as well as the "1" digits. With this arrangement, a tool cannot be erroneously identified if any of the contacting elements fail to make proper engagement with the lands 135 on the collar 119 of the tools 65.

The reading head 620 comprises a base 621 upon which an upstanding supporting member 622 is mounted, being secured to the top of the base 621 by screws 623. The supporting member 622 is provided with an inclined face 624 to which a block 625 is secured by screws 626, the block 625 being fabricated of an electrical insulating material. Ten electrical brushes generally identified by the reference numeral 630 are secured to the block 625 in equally spaced relationship by an insulated plate 631. The brushes 630 extend downwardly from the block 625 and are shaped to form a vertically disposed contact portion 632 which engages the lands 135 on the collar 119. The base 621 is provided with a plurality of slots 633 with one slot 633 being provided for each of the ten electrical brushes 630. The lower extremity of each of the brushes 630 extends inwardly into one of the slots 633 which serves to maintain the proper alignment of the ten brushes 630.

The operation of the electrical brushes 630 in conjunction with the lands 135 on the collar 119 is best illustrated in FIG. 34. The collar 119 is provided with five peripheral strips, each of which represents one of the five digits of the binary numeral. These peripheral strips have been identified by the reference numerals 641, 642, 643, 644 and 645 with the peripheral strip 641 representing the first digit of the binary numeral and the succeeding peripheral strips representing the four succeeding digits of the numeral. Each of the peripheral strips is always provided with a land 135 along half of its width but the land may be located on either side of the strip to make contact with one of a pair of the electrical brushes 630. Two electrical brushes 630 are provided for each peripheral strip but only one of each pair of brushes will be contacted by a land 135 on any single tool 65. However, one of each pair of brushes must be contacted by a land 135 to indicate whether a "0" or a "1" is indicated for that particular digit.

For example, the peripheral strip 641 represents the first digit of the binary number, and, as illustrated in FIG. 34, it is provided with a land 135 on its right half. Two electrical brushes 651A and 651B cooperate with the peripheral strip 641 and whenever the land 135 appears on the right half of the peripheral strip 641 it will be contacted by an electrical brush 651A to indicate the number "1" for the first digit of the binary number. If the land 135 were located on the left half of the peripheral strip 641 it would be contacted by the brush 651B to indicate the numeral "0" for the first digit of the binary number. In FIG. 34, each of the ten electrical brushes 630 is individually identified and is provided with a suffix, the suffix "A" indicating that that particular brush represents the numeral "1" while the suffix "B" indicates that that particular brush represents the numeral "0" for the particular digit of the binary number.

The peripheral strip 642 representing the second digit of the binary number is shown with a land 135 along the right half of its width and it is engaged by a brush 652A to indicate the numeral "1" for the second digit of the binary number. The third peripheral strip 643 represents the third digit of the binary number and it is shown with a land 135 along the left half of its width to engage an electrical brush 653B to indicate the numeral "0" for the third digit of the binary number. The peripheral strip 644 cooperates with a pair of electrical brushes 654A and 654B, the strip being shown with a land 135 along the left half of its width which is contacted by the brush 654B to indicate the numeral "0" for the fourth digit of the binary number. The last peripheral strip represents the fifth digit of the numeral and is provided with a land 135 along the right half of its width which is contacted by the brush 655A to indicate the numeral "1" for the fifth digit of the binary number. Therefore, with the brushes 630 contacted, as shown in FIG. 34, by the lands 135, the coding indicates the binary number 10011 which according to the decimal system is tool No. 19. The binary number 10011 is shown in FIG. 34 with each digit being located under the peripheral strip on the collar 119 by which it is represented.

The electrical wiring for the tool reading head 620 is shown diagrammatically in FIG. 35 and this wiring replaces the arrangement of switches and contacts illustrated on lines L20, L21, L22 and L23 in FIG. 29, which is provided for the tool reading head 140. Each of the tool selection relays 15CRE to 19CRE are provided with a normally open contact and a normally closed contact connected in the circuit illustrated in FIG. 35. The two contacts of the relay 15CRE which represents the first digit of the binary numeral cooperate with the two electrical brushes 651A and 651B which also represent the first digit of the binary numeral. Similarly, the two contacts of the relay 16CRE which represents the second digit of the binary numeral cooperate with the two electrical brushes 652A and 652B which also represent the second digit of the binary numeral. In like manner, the contacts of the relays 17CRE, 18CRE and 19CRE cooperate with the corresponding electrical brushes 630. The coding for tool No. 19 is illustrated in FIG. 34, and this number is impressed upon the electrical circuit by energizing the relays 15CRE, 16CRE and 19CRE in the manner previously described to indicate that tool No. 19 is desired. The contacts associated with these relays will, therefore, be actuated so that they are in the opposite condition of that shown in FIG. 35. Thus, normally open contact 15CRE–5 will be closed while normally closed contact 15CRE–6 will be open. In like manner, normally open contact 16CRE–5 will be closed and normally closed contact 16CRE–6 will be open while normally open contact 19CRE–5 will be closed and normally closed contact 19CRE–6 will be open. The other contacts will remain in their normal condition, as shown in FIG. 35.

The electrical brushes 630 are all connected in the electrical circuit as shown and the collar 119 of each tool 65 is connected to ground as indicated in FIG. 35. If tool No. 19 is desired, and the brushes are contacted by the lands 135 in the manner illustrated in FIG. 34, coincidence is obtained with the various contacts in FIG. 35 and an electrical circuit will be completed through one of each pair of the brushes 630. When this occurs, relay 26CRE will be energized to produce the same effect that was produced when it was energized by the coincidence of the switches 146 of the tool reading head 140, as previously described.

In the case of the arrangement for the first digit of the binary number, the current will flow from the power line DC–1 to a resistor 660 of relatively low value through the now closed contact 15CRE–5 and the closed brush 651A to ground to complete the circuit. If coincidence exists, the circuit is completed in like manner through one or the other of each of the several pair of brushes 630. The brushes are shown in FIG. 35 as being contacted by the lands 135 of the tool identified as No. 19 in the manner shown in FIG. 34. Assuming that the No. 19 was impressed upon the electrical control system, the relays 15CRE, 16CRE and 19CRE representing the first, second and fifth digits of the binary number 10011 will be energized. The electrical brushes 651A, 652A, 653B, 654B and 655A have been engaged by the lands 135 to enable a circuit to be completed through them, as shown in FIG. 35, and since the relays 15CRE, 16CRE and 19CRE have been energized in impressing the number on the electrical control system, a circuit can be completed through one of each pair of the brushes 630 to obtain coincidence indicating that the desired tool is at the tool change station 105.

If the tool 65 at the tool change station 105 is not the desired tool No. 19, a circuit will not be completed through one of each pair of the brushes 630 and coincidence will not be obtained. Thus, if tool No. 18 represented by the binary number 10010 arrives at the change station 105, the first digit of the binary number is "0" and brush 651A will not be contacted by a land 135 but brush 651B will be contacted instead. Therefore, the circuit will not be completed through either one of the brushes, since relay 15CRE was energized when impressing the No. 19 in the electrical control circuit. As a result, its normally open contact 15CRE–5 will be closed and its normally closed contact 15CRE–6 will be open. In view of the fact that the brush 651A is not engaged by a land 135 a circuit cannot be completed through it, and since contact 15CRE–6 is open a circuit cannot be completed through the closed brush 651B. Coincidence is therefore not obtained.

When coincidence is not obtained the current will flow from the resistor 660 through a conductor 661, a rectifier 662, a common conductor 663 and a resistance 664 of relatively high value to ground DC–2. Since the resistance 664 is several times greater than the resistance 660, the potential at the juncture 665 as well as the potential at the juncture 666 will be only slightly lower than the voltage delivered by the power line DC–1 while the voltage across the relay 26CRE will be too low to actuate it since relay 26CRE is designed to be actuated at a higher voltage value.

The potential at the juncture 666 will not be reduced significantly even if four pair of the electrical brushes 630 are in coincidence. However, when all five pair are in coincidence so that an electrical circuit is completed across one of each pair of the electrical brushes 630, the high potential is no longer maintained at the juncture 666 and the voltage across the relay 26CRE will increase sufficiently to actuate the relay since the resistance of the relay coil 26CRE is several times greater than the resistance 664. When the relay 26CRE is actuated, a holding circuit is established through the normally closed contact 32CR–1 and the normally open contact 26CRE–2 in the same manner as previously described in the circuit for the tool reading head 140.

FIG. 30 illustrates diagrammatically the electrical control circuit for controlling the rotation of the ring 81 to complete the tool search for locating the desired tool at the tool change station 105 and also illustrates the electrical control circuit for controlling the tool change operation. Before the ring 81 is rotated, it is essential that the tool change arm 71 be in its vertical position and retracted, and that the connecting rod 177 of the piston and cylinder mechanism 176 be retracted so that a tool storage socket 115 is not extending from the magazine 70 and that the hydraulic unit 72 with the tool change arm 71 is swung back to its inoperative position.

When these three conditions are satisfied, the limit switches 184, 309 and 348 shown diagrammatically in line L40 in FIG. 30 will be closed. This is apparent from the previous description, since the limit switch 309 illustrated in FIG. 16 is actuated when the piston and cylinder mechanism 301 has retracted the tool change arm 71. In like manner, the limit switch 184, as shown in FIG. 4, will be actuated when the piston and cylinder mechanism 176 is in its retracted position so that the tool change arm 71 is in its inoperative position and a tool storage socket 115 is not pivoted outwardly of the magazine 70. The switches 309 and 184 are normally open switches, and when actuated as described, will be in their closed position. On the other hand, the limit switch 348 is normally closed and is deactuated when the tool changes arm 71 is in its vertical position. This is apparent from the views in FIGS. 22B and 25B in relation to the views of the tool change arm 71 in FIGS. 22A and 25A. When the tool change arm 71 is in the vertical position shown in FIG. 22A, the roller 348A of the limit switch 348 is in the notch 357 of the cam 355,, as shown in FIG. 25B, and since the roller 348A is in the notch, the limit switch 348 is deactuated. When the tool change arm 71 is displaced 180° from the position shown in FIG. 22A to the position shown in FIG. 25A, the roller 348A is within the notch 358 to again deactuate the limit switch 348. Therefore, the limit switch 348 is deactuated to its closed position for either one of the two vertical positions of the tool change arm 71.

With the three switches 309, 348 and 184 thus closed, a circuit is completed through these switches as well as through a normally closed contact 2CRL–9 and a normally closed contact 3CRL–7 in line L40 to energize a relay 33CR. Energization of the relay 33CR closes its normally open contact 33CR–1 in line L35 and rotation of the ring 81 may be initiated. The rotation of the ring 81 may be initiated by manually actuating a switch generally identified by the reference numeral 670 to actuate its three contact bars 671, 672 and 673 so that they bridge their cooperating contacts. The rotation of the ring 81 is initiated automatically by the closing of a contact 675 shown in line L32 in response to a signal from recorded data. Assuming that the machine is being operated automatically in response to signals from recorded data, the contact 675 will be closed to complete a circuit through a normally closed contact 25CRE–2 in line L31 through the closed contact 675 and since the machine is under automatic control, a contact 9CRA–2 on line L32 will also be closed. The circuit then continues from the new closed contact 9CRA–2 to the now closed contact 33CR–1 in line L35 and through a normally closed contact 26CRE–3 in line L32 to the solenoid 534 which will actuate the valve 527 for initiating forward rotation of the ring 81 as previously described. The actuation of the valve 527 also serves to direct hydraulic pressure to the cylinder 163 for actuating the plunger 164 to shift the rocker arm 157 to deactuate the limit switch 150 as previously described.

The signal from the recorded data for initiating rotation of the ring 81 may be momentary, and in addition to energizing the solenoid 534, such closure of the contact 675 will also serve to energize a relay 30CR in line L31 to close its normally open contact 30CR–1 shown in line L37. Closing of the contact 30CR–1 serves to by-pass the contact 675 so that the energization of the solenoid 534 will be retained despite the opening of the automatic contact 675.

Rotation of the ring 81 will continue until the desired tool arrives at the tool change station 105. When this occurs, the relay 26CRE, shown in line L20 in FIG. 29, will be energized in the manner previously described, to open its normally closed contact 26CRE–3 in line L32. This breaks the circuit to solenoid 534 to terminate forward rotation of the ring 81.

As previously mentioned, however, the ring 81 will overrun slightly so that it may be reversed at a creep rate to accurately locate the desired tool at the tool change station 105. Therefore, the energization of the relay 26CRE will close its normally open contact 26CRE–4 in line L33 to complete a circuit to the solenoid 529 through a normally closed contact 32CR–2 for actuating the valve 528 to drive the ring 81 in a reverse direction at a creep rate, as previously described. When accurate location of the desired tool at the tool change station 105 is achieved, the limit switch 150 will be actuated by the rocker arm 157 in the manner previously described, and this will close the switch 150, shown diagrammatically in line L39 in FIG. 30, to complete a circuit to the relay 32CR for energizing it. Energization of the relay 32CR will cause the opening of its normally closed contact 32CR–2 in line L33 to break the circuit to the solenoid 529 and de-energize it for terminating the reverse rotation of the ring 81. When this occurs the desired tool 65 will be accurately located at the tool change station 105 so that a tool change operation may be completed.

The cycle for the indexing of the ring 81 was described above with the assumption that the desired tool was in the magazine 70 though not located at the tool change station 105. However, the desired tool may already be in the spindle 62 or it may be in the magazine 70 but properly located at the tool change station 105. Under these conditions, rotation of the ring 81 would not occur. Considering first the situation where the desired tool is already in the spindle 62, the latching relays 20CRE to 24CRE will already be energized in the combination to identify the desired tool since the desired tool number is stored in these relays until the actual tool change is about to take place, as previously described. When the next desired tool number is impressed upon the control circuit by, for example, the actuation of the selected contacts 591 to 595, the corresponding selection relays 15CRE to 19CRE will be energized to impress the number upon the control circuit. Since this same number is already stored in the latching relays 20CRE to 24CRE as a result of the previous tool selection, coincidence is obtained in the circuit shown in lines L18 and L19 in FIG. 29 to energize the coincidence relay 25CRE. Its associated normally closed contact 25CRE–2 in line L31 in FIG. 30 will, therefore, be opened to preclude the completion of a circuit through the relay 30CR, the solenoid 534, and the solenoid 529, as the circuit to each of these elements is completed through the normally closed contact 25CRE–2. Since neither one of these solenoids will be energized, the ring 81 will not rotate.

In the event that the desired tool is in the magazine 70 but is located at the tool change station 105, the relays 15CRE to 19CRE will be energized in the combination to indicate the desired tool number. In this case, the latching relays 20CRE to 24CRE will not coincide with the selection relays 15CRE to 19CRE inasmuch as a different tool is in the spindle 62, and the latching relays are energized in the combination to identify the tool in the spindle. However, the energized selection relays 15CRE to 19CRE will actuate their associated contacts in lines L20 and L22 in FIG. 29 and since the desired tool is at the tool change station 105, the contact bars 145 of the switches 146 will be actuated in the proper combination by the lands 135 of the desired tool at the change station. Therefore, relay 26CRE will be energized. As a result, its associated normally closed contact 26CRE–3 in line L32 will be opened to break the circuit to the solenoid coil 534 and prevent forward rotation of the ring 81. Furthermore, since the ring 81 is accurately indexed to locate the desired tool at the change station 105, the limit switch 150 will be actuated by the rocker arm 157 in the manner previously described to energize the relay 32CR on line L39. Energization of this relay will open its normally closed contact 32CR–2 in line L33 to break the circuit to solenoid coil 529 so that a reverse rotation of the ring 81 at a creep rate will, likewise, not take place. It is, therefore, apparent that the control circuit accommodates all the locations of the desired tool when its identifying number is impressed upon the control circuit by the energization of the relays 15CRE to 19CRE in the particular combination which identifies the desired tool.

With the ring 81 properly indexed to locate the desired tool at the tool change station 105, the control circuit must be conditioned to establish either a clockwise or a counterclockwise direction of rotation of the tool change arm 71 for its 180° angular movement in interchanging the tools 65 that have been withdrawn from the spindle 62 and the magazine 70. It will be recalled from the previous description that in each alternate tool change cycle the tool change arm rotates 180° in a clockwise direction to interchange the tools while this step is completed by a counterclockwise direction of rotation for the other alternate tool change cycles. Furthermore, at the completion of each tool change cycle, the tool change arm 71 is displaced 180° from the position in which it was disposed when the tool change cycle was initiated. The condition of the limit switch 349 will determine whether the succeeding tool change cycle requires a 180° clockwise or counterclockwise direction of rotation of the tool change arm 71 to interchange the two tools 65 carried in its grips. To this end, the limit switch 349, as shown in line L50 in FIG. 30, has a contact bar which cooperates with two contacts 679 and 680, its normal position being to bridge the contact 680, and when actuated it bridges the contact 679.

In FIG. 22B, the position of the switch actuating cam 355 is shown when the tool change arm 71 is in a vertical position and the next tool interchange is to be initiated with the arm rotating 180° in a clockwise direction. On the other hand, FIG. 25B illustrates the position of the cam 355 when the tool change arm 71 is in a vertical position but displaced 180° from the position depicted in FIG. 22A and the succeeding tool interchange is to be completed with a 180° counterclockwise rotation of the tool change arm 71. It will further be observed from the view in FIG. 22B that the roller 349A of the limit switch 349 is out of the groove 356 and is, therefore, actuated so that its contact bar is in engagement with the contact 679, as illustrated in FIG. 30. When the tool change arm 71 is displaced 180° from the position shown in FIG. 22A, the cam 355 will likewise be displaced through an angle of 180° as illustrated in FIG. 25B, and as there shown, the roller 349A of the limit switch 349 will be within the groove 356 so that the limit switch is deactuated and its contact bar will be in engagement with the contact 680 to produce a 180° counterclockwise direction of rotation of the tool change arm 71 in completing a tool interchange.

If the limit switch 349 is actuated to cause a 180° clockwise rotation of the tool change arm 71 in completing a tool interchange, a relay 36CR will be energized. On the other hand, if the limit switch 349 is deactuated to indicate a 180° counterclockwise direction of rotation of the tool change arm 71 to complete a tool interchange, a relay 37CR will be energized. However, before either one of these two relays are energized to initiate a tool change cycle, it is essential that the spindle head 60 be located in its retracted position to accurately locate the tool 65 in the spindle 62 with respect to the tool change arm 71. Therefore, a limit switch 683, shown diagrammatically in line L50, is connected to be actuated by the spindle head 60 when the latter arrives at its retracted position. Before either one of the relays 36CR or 37CR may be energized, the limit switch 683 must be actuated to its closed position to complete the circuit. Since relay 32CR is energized, as previously described, by actuation of the switch 150 upon the completion of the indexing of the ring 81, its normally open contact 32CR–3 in line L50 will be closed and, assuming that a clockwise rotation of the tool change arm 71 is required to interchange two tools 65 in the succeeding tool change cycle, a circuit will be completed to the relay 36CR through the now closed limit switch 683, the now closed contact 32CR–3 and the actuated limit switch 349.

Energization of the relay 36CR serves to close its normally open contact 36CR–1 in line L41 to complete a circuit for energizing a latching relay 2CRL. The current for energizing the relay 2CRL flows through the three closed switches 309, 348 and 184 to the normally open contact 9CRA–5 in line L42 which will be closed if the machine is under automatic operation from recorded data. From the new closed contact 9CRA–5 the current will continue through the now closed contact 26CRE–5 and the now closed contact 36CR–1 to the latching relay 2CRL. If the machine is not under the control of recorded data, the relay 9CRA will not be energized and the current will by-pass the open contact 9CRA–5 and flow through the closed contact bar 672 of the switch 670 and thence through the normally closed contact 9CRA–4 and the now closed contacts 26CRE–5 and 36CR–1 to the relay 2CRL. The relay 2CRL, as previously mentioned, is a latching relay and will not be deactuated when its coil is de-energized, but will only be deactuated when its cooperating unlatching relay 2CRU, in line L44, is energized.

It will be noted that the normally open contact

26CRE–5 is in the circuit to the latching relay 2CRL so that the relay 26CRE must be energized to energize the latching relay 2CRL for initiating a tool change cycle. If the desired tool is already in the spindle 62, the relay 26CRE will not be energized so that its contact 26CRE–5 in line L41 will remain open and the latching relay 2CRL will not be energized and a tool change cycle will not be initiated. Therefore, if the desired tool is already in the spindle 62, the ring 81 will not be indexed and a tool change cycle will not be initiated. However, if the desired tool is in the magazine 70 but properly located at the tool change station 105, the indexing of the ring 81 will not occur, but the relay 26CRE will be energized and its contact 26CRE–5 will be closed to permit initiation of a tool change cycle.

The immediate effect of energizing the latching relay 2CRL is to open its normally closed contacts 2CRL–9 in line L40 and 2CRL–2 in line L48 to de-energize the relays 33CR and 35CR respectively. De-energization of the relays 33CR and 35CR will serve to open their normally open contacts 33CR–3 on line L45 and 35CR–1 in line L46 so that both unlatching relays 2CRU and 3CRU are de-energized, these unlatching relays serving to de-actuate the two latching relays 2CRL and 3CRL. The opening of the contacts 33CR–3 and 35CR–1 further serve to break the circuit to the solenoid 562 to insure that this solenoid will not be energized for swinging the tool change arm 71 to its inoperative position and withdraw the tool storage socket 115 into the magazine 70.

The energization of the relay 2CRL also functions to close its normally open contact 2CRL–1 in line L18 in FIG. 29 to complete the circuit for energizing the unlatching relays 20CREU to 24CREU inclusive, for de-actuating the relays 20CRE to 24CRE to remove the identification of the preceding tool which was stored on the latching relays 20CRE to 24CRE in the particular combination identifying the tool in the spindle. At the same time, the closing of the contact 2CRL–1 also serves to complete a circuit for energizing the latching relays 20CRE to 24CRE in accordance with the input signals so that they are energized in the same combination that the selection relays 15CRE to 19CRE are energized for storing the number of the tool that is being placed into the spindle 62 by the tool change mechanism. The circuit for energizing the unlatching relays 20CREU to 24CREU and the latching relays 20CRE to 24CRE in the selected combination includes the normally open contact 26CRE–1. However, since the desired tool is at the tool change station and has actuated the reading head 140, the relay 26CRE will be energized to close the contact 26CRE–1 for completing the circuit.

When the energization of the relays 20CRE to 24CRE is in the combination corresponding to the energization of the selection relays 15CRE to 19CRE, coincidence occurs in the circuit illustrated in lines L18 and L19 to energize the relay 25CRE, as previously described. The energization of this relay serves to open its normally closed contact 25CRE–1 on line L15 to break the circuit to the unlatching relays 20CREU to 24CREU so that the latching relays 20CRE to 24CRE cannot be deactuated and the identifying number of the tool that is being placed in the spindle 62 is stored in the latching relays and will not be removed therefrom until the succeeding tool change is about to take place. Energization of the relay 25CRE also serves to open its normally closed contact 25CRE–2 in line L31 in FIG. 30 to insure that the relay 30CR and the solenoids 534 and 529 will not be energized so that rotation of the ring 81 cannot occur.

With the relay 25CRE energized, the solenoid 564 will be energized to actuate the valve 559 for actuating the piston and cylinder mechanism 176 to swing the tool change arm 71 to its operative position and the tool storage socket 115 with the selected tool 65 outwardly of the magazine 70. This circuit is completed through the actuated limit switch 683, the now closed contact 32CR–3 in line L50 and the now closed contact 25CRE–4 in line L51. From the contact 25CRE–4 the circuit continues through the contact bar 673 which will be closed if the machine is under manual control. If the machine is under automatic control, a contact 9CRA–6 in line L53 will be closed and the current will flow through it and through a conductor 685 and thence through a now closed contact 2CRL–3 and a normally closed contact 3CRL–3 to the solenoid 564.

Energization of the solenoid 546, of course, swings the tool change arm 71 outwardly and pivots the tool storage socket 115 containing the selected tool 65 outwardly of the magazine 70. As this occurs, the binary coding on the tool 65 moves out of engagement with the fingers 141 of the tool reading head 140 so that coincidence is lost in the circuit shown in lines L20, L21 and L22 of FIG. 29 to de-energize the relay 26CRE. De-energization of this relay operates to open its contact 26CRE–1 in line L17 so that the unlatching relays 20CREU to 24CREU cannot be energized when the relay 25CRE is de-energized by the removal of the input signals to the relays 15CRE to 19CRE. The identification number of the tool being moved to the spindle 62 is, therefore, stored in the relays 20CRE to 24CRE until the next tool change cycle takes place. De-energization of the relay 26CRE also operates to open its normally open contact 26CRE–5 in line L41 in FIG. 30 to de-energize the relay 2CRL. However, the relay 2CRL is a latching relay and de-energization of its coil will not deactuate the relay, this not occurring until the unlatching relay 2CRU is energized.

After the tool change arm 71 and the tool change socket 115 have been pivoted 90° by the piston and cylinder mechanism 176, the limit switch 185 will be actuated to close the switch and complete a circuit to a relay 38CR in line L55 in FIG. 30. The current to the relay 38CR will flow through the now closed limit switch 683 in line L50 to the now closed contact 32CR–3 and the now closed contact 25CRE–4 in line L51 and thence to the contact bar 673 which will be closed if the machine is being operated manually. If the machine is under the control of recorded data, the current will flow through the closed contact 9CRA–6, a conductor 685 through the now closed contact 2CRL–3 and the normally closed contact 3CRL–3, through a conductor 686 to the now closed limit switch 185 and thence to the relay 38CR.

Energization of the relay 38CR will serve to close its normally open contact 38CR–1 in line L53. It is imperative that the spindle 62 be locked to prevent its rotation before the tool change takes place. When this is accomplished, a relay (not shown) is energized to close a normally open contact 20CR–1 in line L57 and with the contact 20CR–1 and the contact 38CR–1 both closed, the cycle of operation of the tool change arm 71 may commence.

The first step in the cycle is to rotate the tool change arm 71 in a clockwise direction from the vertical position shown in FIG. 22A to the position illustrated in FIG. 23A, wherein the tool grips 73 and 74 engage the tools in the spindle 62 and the tool change socket 115 respectively. In order to accomplish this rotational movement, it is necessary to direct fluid pressure to both sleeves 326 and 326A and to the lower plunger 325A of the hydraulic actuating mechanisms 321 and 322, as indicated in FIG. 23. As previously described, the limit switch 310 is actuated by the dog 313, as illustrated in FIG. 16, when the tool change arm 71 is in its extended position. Since the initial rotary movement of the tool change arm 71 to the position illustrated in FIG. 23A occurs when the tool change arm 71 is retracted, the limit switch 310 is deactuated and its contact bar is therefore in engagement with a cooperating contact 688, as shown in line L63 in FIG. 30.

The relay 36CR is energized in view of the fact that the tool change cycle requires a 180° clockwise direction of rotation of the arm 71 to interchange tools so its normally open contact 36CR–3 on line L63 is closed. The circuit to the solenoid 552 is, therefore, completed through the now closed contacts 20CR–1 and 38CR–1 in line L57, through a common conductor 689 to the switch 310 on line L63. From the switch 310, the current flows through its contact 688 to the now closed contact 36CR–3 and the now closed contact 2CRL–7 to the solenoid 552. At the same time, current flowing through the now colsed contact 36CR–3 in line L63 flows into a conductor 690 to a normally closed contact 37CR-4 and a now closed contact 2CRL–6 to the solenoid 549 in line L60. Thus, the energization of the solenoid 549 serves to actuate the valve 543 for directing hydraulic pressure to both sleeves 326 and 326A of the hydraulic actuating mechanisms 321 and 322. The energization of the solenoid 552 functions to actuate the solenoid valve 545 to direct hydraulic pressure to the lower plunger 325A. This combination of hydraulic pressure in the hydraulic actuating mechanisms 321 and 322 functions to shift the plunger 284 to cause a clockwise rotational movement of the tool change arm 71 from its vertical position illustrated in FIG. 22A to the position illustrated in FIG. 23A, and the tool grips 73 and 74 will then engage the tools 65 in the spindle 62 and in the tool change socket 115.

Before the tool 65 in the spindle 62 can be withdrawn therefrom it is necessary to release the collet. As previously described, this is accomplished by energizing the solenoid 510 to actuate the valve 509 for directing hydraulic pressure to the cylinder 393 to compress the spring 384 and shift the draw bar 375 in a forward direction. The solenoid 510, shown in line L69 in FIG. 30, may be energized through a normally closed contact 34CR–3 or through the normally closed limit switch 350 and the normally closed contact 35CR–2. Since the tool change arm 71 is still in its retracted position, the limit switch 309 is actuated to complete a circuit to the relay 34CR in line L47. The normally closed contact 34CR–3 of the relay 34CR in line L69 is, therefore, open so that a circuit cannot be completed through it to the solenoid 510. Furthermore, when the tool change arm 71 was in its vertical position, the roller 350A of the limit switch 350 was not located in either one of the notches 357 or 358 as shown in FIG. 22B so that the switch was actuated to its open condition, as shown on line L70, and a circuit could not be completed through it to the solenoid 510.

However, when the tool change arm 71 arrived at the position shown in FIG. 23A, the cam 355 rotated to the position shown in FIG. 23B to move the notch 358 into alignment with the roller 350A to deactuate the limit switch 350 to its closed position. This completed a circuit to the solenoid 510 through the now closed contacts 20CR–1, 38CR–1 in line L57, and through the common conductor 689 to the now closed limit switch 350. From the switch 350 the flow of current continues through the normally closed contact 35CR–2 in line L70 and thence to the solenoid 510 in line L69. With the energization of the solenoid 510, the collet 371 is released to permit the withdrawal and insertion of a tool 65 into the spindle 62.

The next step in the cycle is to extend the tool change arm 71 for the purpose of withdrawing the two tools 65 from the spindle 62 and tool storage socket 115. This is accomplished by energizing the solenoid 517 to actuate the valve 515 for directing hydraulic pressure to the piston and cylinder mechanism 301 to actuate it for moving the tool change arm 71 to its extended position. As previously described, the releasing of the collet 371 will cause a forward movement of the cylindrical cam 415 to deactuate the limit switch 405. As shown in lines L71 and L73, the switch 405 is provided with a normally closed contact bar 691 and a normally open contact bar 692 so that when the switch is deactuated by the releasing of the collet 371, the contact bar 691 will engage a cooperating contact 693 to complete the circuit to the solenoid 517. The current to the solenoid 517 flows through the now closed contacts 20CR–1 and 38CR–1 in line L57, through the conductor 689 and the now closed limit switch 350 into a conductor 694 and the closed contact bar 691 to the contact 693 and thence through a normally closed contact 35CR–3 in line L71 to the solenoid 517. This actuates the piston and cylinder mechanism 301 and the tools 65 are, therefore, withdrawn from the spindle 62 and the tool storage socket 115.

The next step in the cycle is to revolve the tool change arm 71 in a clockwise direction through an angle of 180° from the position shown in FIG. 23A to the position shown in FIG. 24A so that the position of the two tools 65 in the tool grips 73 and 74 is interchanged. To accomplish this it is necessary to direct hydraulic pressure into the port 329 to actuate the plunger 325 while the other three ports in the hydraulic actuating mechanisms 321 and 322 are to be connected to exhaust. This is accomplished by energizing the solenoid 551 to actuate the valve 544 while the solenoids 549 and 552 are de-energized. When the tool change arms 71 was fully extended by the energization of the solenoid 517, the limit switch 310 associated with the piston and cylinder mechanism 301 was actuated to move its contact bar 688 from the position illustrated diagrammatically in line L63 into engagement with a contact 695 and this actuation of the switch 310 serves to break the circuit to the solenoids 549 and 552.

Furthermore, when the movement was initiated to extend the tool change arm 71, the limit switch 309, also associated with the piston and cylinder mechanism 301, was deactuated since it is only actuated when the tool change arm 71 is in its fully retracted position. This opening of the switch 309, shown diagrammatically in line L40, serves to break the circuit to the relay 34CR to close its normally closed contact 34CR–3 in line L69 so that the circuit to the solenoid 510 for releasing the collet 371 may be maintained even though the limit switch 350 is actuated by further rotation of the cam 355 which will move its notch 357 out of alignment with the roller 350A.

When the limit switch 310 was actuated by the movement of the tool change arm 71 to its fully extended position, as previously mentioned, it moved its contact bar out of engagement with the contact 688 and into engagement with its associated contact 695. This served to break the circuit to the solenoids 549 and 552 to de-energize them but completed a circuit to energize the solenoid 551 for actuating the valve 544 to direct hydraulic pressure to the plunger 325 of the hydraulic actuating mechanism 321. The circuit for energizing the solenoid 551 flows from the now closed contacts 20CR–1 and 38CR–1 in line L57 and thence through the conductor 689 and the contact bar of the switch 310 to the contact 695. From the contact 695 the flow of current continues to a conductor 696 and into a conductor 697 and a conductor 698 to the now closed contact 2CRL–5 in line L65. From the contact 2CRL–5 the flow of current continues to the solenoid 551 to energize it. With the valve 544 actuated by the energization of the solenoid 551, the hydraulic pressure is directed to the plunger 325 to actuate it while the other ports of the hydraulic actuating mechanisms 321 and 322 are connected to exhaust by reason of the de-energization of the solenoids 549 and 552.

The plunger 284 will then move downwardly from the position illustrated in FIG. 23 to its lowermost position where its notch 333 engages the detent mechanism 337, as shown in FIG. 24, to effect a 180° rotation of the tool change arm 71 to the position shown in FIG. 24A. The cam 355 will rotate with the tool change arm 71 to the position shown in FIG. 24B.

As the cam 355 rotated in a clockwise direction from the position shown in FIG. 23B to the position illustrated in FIG. 24B, the groove 356 moved with the cam to receive the roller 349A and deactuate the limit switch 349. This caused the contact bar of the switch 349 to drop out of engagement with the contact 679 on line L50 and into engagement with its associated contact 680. Such deactuation of the switch 349 operates to de-energize the relay 36CR and energize the relay 37CR. The energization of the relay 37CR functions to close its normally open contact 37CR–6 in line L49 to complete a circuit through it and the normally closed contact 3CRL–2 to the relay 35CR to energize it. The energization of the relay 35CR serves to open its normally closed contact 35CR–3 in line L71 to break the circuit to the solenoid 517 to deactuate the valve 515 to terminate the flow of hydraulic pressure for extending the tool change arm 71. However, before the arm is retracted, the solenoid 516 must be energized to actuate the valve 514 for directing hydraulic pressure to the piston and cylinder mechanism 301 to retract the arm.

When the cam 355 arrives at the position illustrated in FIG. 24B, upon a 180° angular displacement of the tool change arm 71 in a clockwise direction, the notch 357 will move into alignment with the roller 350A to deactuate the limit switch 350. A circuit is, therefore, completed to the solenoid 516 through the now closed contacts 20CR–1 and 38CR–1 in line L57, through the conductor 689 and the closed switch 350 into the conductor 694. From the conductor 694 the flow of current continues through the closed contact bar 691 of the switch 405, into a conductor 705 to the now closed contact 35CR–4 and the normally closed contact 34CR–4 to the solenoid 516. Energization of the solenoid 516 will serve to actuate the valve 514 for directing hydraulic pressure to the piston and cylinder mechanism 301 for retracting the tool change arm 71. As the tool change arm 71 is retracted, it inserts the new tool into the spindle 62 and the previously used tool into the tool storage socket 115. When the tool change arm 71 arrives at its fully retracted position, the limit switch 309 will be actuated to again complete the circuit to the relay 34CR in line L47. Energization of the relay 34CR functions to open its normally closed contact 34CR–4 in line L72 to break the circuit to the solenoid 516.

When the retraction of the tool change arm 71 begins, the limit switch 310, through which the solenoid 551 was energized, is deactuated but it is necessary that the solenoid 551 remain energized while the retraction is taking place to hold the tool change arm 71 in its rotary position. Therefore, when relay 35CR was energized it closed its normally open contact 35CR–5 in line L57 to establish a parallel circuit for retaining the solenoid 551 energized. The flow of current then by-passes the switch 310 and flows through the now closed contacts 20CR–1, 38CR–1, and 35CR–5 in line L57 and thence through the conductor 697, the conductor 698 and the now closed contact 2CRL–5 in line L65 to the solenoid 551. The tool change arm 71 is, therefore, retained in its rotary position while it is being retracted to insert a new tool 65 in the spindle 62 and the previously used tool 65 in the tool storage socket 115.

As previously mentioned, when the tool change arm 71 was fully retracted, the limit switch 309 was actuated to energize the relay 34CR The energization of the relay 34CR operates to open its normally closed contact 34CR–3 in line L69 to break the circuit to the solenoid 510 for terminating the flow of hydraulic pressure to the cylinder 193 and connect the cylinder to exhaust The spring 384 then operates to retract the draw bar 375 to actuate the collet 371 for locking the new tool in the spindle 62. The actuation of the collet 371 causes the previously described rearward movement of the cylindrical cam 415 to actuate the limit switch 405. Actuation of the limit switch 405 operates to open its normally closed contact bar 691 and close its normally open contact bar 692. The opening of the contact bar 691 would break the circuit to the solenoid 516 but as its associated contact bar 692 closes with the actuation of the switch 405, a parallel circuit is established through the now closed contact bar 692 and the now closed contact 34CR–5 in line L73 to the solenoid 516 for the purpose of retaining the hydraulic pressure to maintain the tool change arm 71 in its retracted position.

The next step in the cycle is to rotate the tool change arm 71 in a counterclockwise direction from the position shown in FIG. 24A to the vertical position depicted in FIG. 25A. In order to accomplish this, it is necessary, as indicated in FIG. 25, to direct hydraulic pressure to the plunger 325 and to the two sleeves 326 and 326A, while the port 329A which is in communication with the cylinder containing the plunger 325A is connected to exhaust. These hydraulic connections are obtained by energizing the solenoids 549 and 551, the latter being already energized from the preceding step in the cycle. The solenoid 552 will remain de-energized to connect the cylinder containing the plunger 325A to exhaust.

As previously mentioned, the relay 34CR became energized when the tool change arm 71 was fully retracted and actuated the limit switch 309. The relay 37CR likewise was energized when the limit switch 349 was deactuated by the rotation of the cam 355 causing the entrance of the roller 349A into the groove 356. With these two relays energized, their normally open contacts 34CR–2 and 37CR–3 in line L61 become closed to complete a circuit to the solenoid 549. The current for energizing the solenoid 549 flows through the now closed contacts 20CR–1 and 38CR–1 in line L57 and thence through a conductor 699 and the now closed contacts 34CR–2, 37CR–3 and 2CRL–6 in line L61. From the contact 2CRL–6, the current continues through a conductor 700 in line L60 to the solenoid 549 and returns to its source represented by the line AC–2 to complete the circuit. With the solenoids 549 and 551 energized, the valves 543 and 544 are actuated to direct the hydraulic pressure to the sleeves 326 and 326A as well as to the plunger 325 to cause a shifting of the plunger 284 upwardly to move its notch 334 into engagement with the detent mechanism 337, as illustrated in FIG. 25. This upward movement of the plunger 284 functions to cause a counterclockwise rotation of the tool change arm 71 to its vertical position, as illustrated in FIG. 25A. It will be noted that the tool change arm 71 is displaced by an angle of 180° from the position shown in FIG. 22A from which it initiated the tool change cycle and as a consequence, the succeeding tool change cycle must include a 180° counterclockwise rotation of the tool change arm 71 for interchanging the two tools 65 in its grips 73 and 74, while in the cycle just described this step was completed by a 180° clockwise rotation of the tool change arm 71.

As the cam 355 rotates with the tool change arm 71, while the latter revolves to the vertical position illustrated in FIG. 25A, the notch 358 will move into alignment with the roller 348A of the limit switch 348 to deactuate the switch to its closed condition. This completes a circuit through the closed limit switch 309, the closed limit switch 348 to the now closed contact 35CR–1 in line L46 and the current continues therefrom to the solenoid 562. Energization of the solenoid 562 actuates the valve 558 to direct hydraulic pressure to the piston and cylinder mechanism 176 for swinging the tool change arm 71 to its inoperative position and to pivot the tool storage socket 115 into the magazine 70. At the same time, the current flows from the now closed contact 35CR–1 in line L46 into a conductor 706 to both unlatching relays 2CRU and 3CRU and since only the latching relay 2CRL was actuated, the energization of its cooperating unlatching relay 2CRU will serve to deactuate it.

When the tool change arm 71 is swung back to its inoperative position and the tool storage socket 115 is pivoted into the magazine 70, the limit switch 184 will be actuated to its closed condition to energize the relay 33CR. The current to the relay 33CR will flow through the three closed limit switches 309, 348 and 184 to the normally closed contact 2CRL–9 and the normally closed contact 3CRL–7 in line L40 to the relay 33CR to energize it. Energization of the relay 33CR indicates that the tool change operation has been completed and a succeeding tool change cycle may take place.

It will be observed that when the tool change cycle was initiated from the position of the tool change arm 71 as illustrated in FIG. 22A, the roller 349A of the limit switch 349 was out of the groove 356 and, therefore, actuated. Since the switch 349 was actuated, its contact bar engaged the contact 679 to complete a circuit for energizing the relay 36CR. The energization of the relay 36CR closed its normally open contact 36CR–1 in line L41 to energize the latching relay 2CRL. With the latching relay 2CRL energized the tool change cycle included a 180° clockwise rotation of the tool change arm 71 from the position shown in FIG. 23A to the position depicted in FIG. 24A for interchanging the position of the two tools 65 in its grips 73 and 74.

Upon the completion of the cycle, it will be observed that the roller 349A is located in the groove 356 so that the limit switch 349 is deactuated. Its contact bar is, therefore, in engagement with the contact 680 to complete the circuit to the relay 37CR instead of to the relay 36CR when the succeeding tool change cycle has been initiated. With the relay 37CR energized, its normally open contact 37CR–1 in line L43 is closed to complete a circuit for energizing the relay 3CRL instead of the relay 2CRL. With the relay 3CRL energized the solenoid 551 will be energized rather than the two solenoids 549 and 552 and the hydraulic pressure will be directed to the plunger 325 only. As a result, the plunger 284 will be moved to its lowermost position to bring its notch 333 into engagement with the detent mechanism 337 and such movement of the plunger 284 will produce a rotational movement of the tool change arm 71 in a clockwise direction to the position shown in FIG. 26A. The succeeding 180° rotational movement of the tool change arm 71, however, will occur in a counterclockwise direction rather than a clockwise direction by the energization of the solenoids 549 and 552. The electrical control circuit will then operate in a manner similar to its operation for the first described tool change cycle to complete the second tool change cycle. Upon its completion, the tool change arm 71 will be in the vertical position illustrated in FIG. 28A, displaced through an angle of 180° from its vertical position illustrated in FIG. 25A and identical to its original position, as shown in FIG. 22A.

The electrical control circuit for regulating threading operations as illustrated in FIG. 31. In threading operations, the rate of rotation of the spindle 62 must be in a proportion to the rate of the feeding movement of the spindle head 60 to conform to the pitch of the thread being machined. As previously mentioned, the rate of rotation of the spindle 62 is under the control of the hydraulic servo valve 506. The servo valve 506 may be regulated manually to establish the rate of rotation of the spindle 62 by manipulating a potentiometer 715, and the voltage, of a value as established by the setting of the potentiometer 715, will flow from the power source DC–1 into a resistor 716 and thence through the potentiometer 715 through a normally closed contact 7CRA–4 in line L82 to the hydraulic servo valve 506 and then to ground represented by the line DC–2.

If the rate of rotation of the spindle 62 is to be regulated automatically from recorded data, the signals from the record will be directed into a conductor 717. With the machine under automatic control, the relay 7CRA will be energized so that its normally closed contact 7CRA–4 in line L82 will be open but its normally open contact 7CRA–3 in line L83 will be closed and the current will flow from the conductor 717 into the now closed contact 7CRA–3 to the hydraulic servo valve 506 and thence to the ground represented by the line DC–2. The rate of rotation of the spindle 62 will then be regulated from the signals obtained from the record and directed into the conductor 717.

In like manner, the feed rate of the spindle head 62 in either direction is regulated by the hydraulic servo valve 502. If the machine is being operated manually, the hydraulic servo valve 502 is controlled by the manipulation of a potentiometer, generally identified by the reference numeral 720. The current will then flow from a D.C. source 721 through a conductor 722 and the potentiometer 720 to a normally closed automatic contact 7CRA–2 in line L78 and a normally closed tapping contact 5CRE–1 to the hydraulic servo valve 502 and thence to ground. If the machine is being operated automatically in response to signals from a record, the relay 7CRA will be energized and its normally closed contact 7CRA–2 in line L78 will be open while its normally open contact 7CRA–1 in line L77 will be closed. Under these circumstances a voltage cannot be obtained through the potentiometer 720 but the signals from the record are directed into a conductor 723 and flow therefrom to the now closed contact 7CRA–1 and the normally closed contact 5CRE–1 to the hydraulic servo valve 502.

A tapping operation is initiated by energizing a relay 23CR shown in line L84. The relay 23CR may be energized manually by operating a manual switch, generally identified by the reference numeral 725, to its closed condition so that it bridges its associated contacts. With the switch 725 closed, a circuit is completed through the closed contact bar of the switch 725, a normally closed automatic contact 8CRA–1, the relay 23CR and a normally closed contact 34CRE–1 to ground represented by the line DC–2. Energization of the relay 23CR will serve to effect forward rotation of the spindle 62.

In addition to the energization of relay 23CR, a relay 25CR in line L86 is also always energized during forward rotation of the spindle and the spindle is reversed to withdraw the tap from the threaded hole by de-energizing the relay 25CR. The relay 25CR is energized through a normally closed switch 727 on line L88, the current flowing through the switch 727 and a normally closed automatic contact 8CRA–4 to the relay 25CR. If a withdrawal of the tap is to be initiated, the manual switch 727 is opened, to break the circuit to the relay 25CR for de-energizing it and thereby cause the reverse rotation of the spindle. In automatic operation, the circuit to the relay 25CR is maintained through either one of two normally closed contacts 736 and 737 and through a then closed contact 8CRA–3 on line L86 to the relay 25CR.

When a tapping operation is to be initiated from a record, the signal from the record serves to close a normally open contact 735 in line L85 and opens the normally closed contacts 736 in line L86. Although the contact 736 is then opened, the circuit to the relay 25CR remains energized through the contact 737 in line L87 which is opened for causing a reversal of the spindle in automatic tapping operations. The current for energizing the relay 23CR will then flow through the now closed contact 735 and a now closed contact 8CRA–2 to the relay 23CR and thence through the normally closed contact 34CRE–1 in line L84 to ground represented by the line DC–2. When a withdrawal of the tap is to be initiated under automatic operation, a signal from the record will open the contact 737 to break the circuit to the relay 25CR in line L86 and thereby effect a reverse rotation of the spindle 62 for withdrawing the tap from the threaded hole.

The energization of the relay 23CR to initiate a tapping operation will close its normally open contact 23CR–1 in line L74, and another normally open contact 24CRE–2 in line L74 will be closed for reasons to be subsequently described. A circuit is, therefore completed to the relay 5CRE to open its normally closed contact 5CRE–1 in line L78 and close its normally open contact 5CRE–2 in line L79. With the contact 5CRE–1 open it will be noted that a voltage cannot be obtained from either the potentiometer 720 or the record through the conductor 723 for regulating the hydraulic servo valve 502. The current for regulating the valve can then only be obtained from a source to be subsequently described and the voltage from this source is directed into a conductor 738 and through the now closed contact 5CRE–2 in line L79 for regulating the hydraulic servo valve 502.

The electrical control circuit for obtaining the proper ratio of the rate of rotation of the spindle 62 relative to the feed rate of rotation of the spindle head 60 is illustrated diagrammatically in lines L98 to L114 of FIG. 31. Since only a minority of the tools 65 will have tapping cutters, the circuit is arranged so that the taps will be identified by any of the numbers from 16 to 31 only. Therefore, only tools No. 16 to 31 will contain tapping cutters and some of these tools may have other types of cutters. Sixteen terminals T16 to T31 inclusive are provided with one terminal being utilized for each of the tools No. 16 to 31 respectively. In like manner, a pitch selection voltage divider, generally identified by the reference numeral 745, is provided with a plurality of terminals for cooperation with the terminals T16 to T31 inclusive, for establishing the ratio of the rate of rotation of the spindle 62 relative to the feed rate of the spindle head 60.

Thus, a jumper 746 is illustrated diagrammatically by a broken line connecting the terminal T19 to the terminal 16P of the voltage divider 745. This indicates that tool No. 19 is provided with a tap having a pitch of 16 threads per inch, and by connecting the terminal T19 with the terminal 16P of the voltage divider 745 the proper ratio of the rate of rotation of the spindle 62 relative to the feed rate of the spindle head 60 will be established. In the same manner, any of the other terminals T16 to T31 may be connected to one of the terminals of the voltage divider 745 to establish the proper ratio of the rate of rotation of the spindle 62 to the feed rate of the spindle head 60 for the particular pitch of the tap in the other tools. For example, it may be assumed that tool No. 28 is a tap having a pitch of 24 threads per inch, and a jumper will then be connected to connect the terminal T28 to the terminal 24P of the voltage divider 745 which will serve to establish the proper ratio when the tool 28 is selected and inserted into the spindle for a tapping operation.

If any of the tools No. 16 to 31 inclusive, are not provided with taps, a jumper 747 is utilized to connect the corresponding terminal from T16 to T31 wtih any one of a plurality of terminals 748 on a bus bar, generally identified by the reference numeral 750. Thus, in the illustrated example in FIG. 31, the tools identified by the numbers 17 and 18 are not tapping tools and the terminal T17 is connected to one of the terminals 748 of the bus bar 750 by the jumper 747 and the terminal T18 is, likewise, connected by a jumper 747 to another terminal 748 of the bus bar 750. The bus bar 750 is connected to relay 34CRE and if one of the tools numbered 16 to 31 inclusive, is selected for a machining operation, and is not a tapping tool, a circuit will be completed through the bus bar 750 to energize the relay 34CRE. Energization of the relay 34CRE will serve to open its normally closed contact 34CRE-1 in line L84, and thereby prevent energization of the tapping relay 23CR. This is merely a safety measure to avoid inadvertent energization of the relay 23CR if a tapping tool is not selected for the machining operation.

It will be observed that the voltage divider comprises a series of resistors 751 connected in series and the greater the pitch of the tap thread, the greater the number of resistors 751 will be included in the circuit to decrease the feed rate of the spindle head 60 in relation to the rate of rotation of the spindle 62.

It should be noted that since the taps are contained only in the tools 65 identified by the numbers 16 to 31 inclusive, the latching relay 24CRE will always be energized for one of the tapping tools. This is true because the latching relay 24CRE represents the fifth digit of the binary number which is expressed decimally as No. 16, and if tool No. 16 is selected, only latching relay 24CRE will be energized. On the other hand, if a higher numbered tool is selected, latching relay 24CRE plus one or more of the other latching relays 20CRE to 23CRE will be energized. Therefore, whenever a tapping tool is selected, the latching relay 24 CRE will be energized and its normally open contact 24CRE–3 in line L74 will be closed for completing the circuit to the relay 5CRE which was previously described. Energization of the relay 5CRE is essential for a threading operation to close its normally open contact 5CRE–2 in line L79 to enable the threading control voltages to flow therethrough from the conductor 738 for regulating the hydraulic servo valve 502 in accordance with the pitch of the thread being formed.

It will be observed in the circuit shown in lines L98 to L113, that the terminals T16 to T31 inclusive are associated with a plurality of contacts of the latching relays 20CRE to 23CRE inclusive. The several contacts of each of the latching relays are shown in vertical alignment. Thus, the latching relay 20CRE is associated with the contacts 20CRE–3 to 20CRE–18 inclusive. In like manner, the latching relay 21CRE is provided with the contacts 21CRE–3 to 21CRE–10, while the latching relay 22CRE is provided with the contacts 22CRE–3 to 22CRE–6, and the latching relay 23CRE is provided with the two contacts 23CRE–3 and 23CRE–4. The normally open and normally closed contacts of the latching relays 20CRE to 23CRE, shown in lines L98 to L113 in FIG. 31, are arranged in such fashion that whenever one of the tools 16 to 31 inclusive, is selected for a machining operation, a circuit will be completed from a conductor 756 through the contacts mentioned to the corresponding terminal T16 to T31 for completing a circuit either to the relay 34CRE or to the voltage divider 745 depending upon whether or not a tapping tool has been selected.

For example, assuming that tool No. 19 has been selected for a machining operation and it is a tap having a pitch of 16 threads per inch. Tool No. 19 is expressed in the binary numbering system as 10011 and, therefore, the latching relays 20CRE, 21CRE and 24CRE will be energized to store this number. Since the latching relays 20CRE and 21CRE are energized, their associated normaly open contacts 20CRE–15 and 21CRE–9 in line L110 will be closed. A circuit will, therefore, be completed from the conductor 756 through a conductor 757, the normally closed contact 23CRE–4 in line L106 and thence to the normally closed contact 22CRE–6 in line L110 and through the now closed contacts 21CRE–9 and 20CRE–15 to the terminal T19. It will be noted that such circuit cannot be completed to any of the other terminals T16 to T31 inclusive. Since tool No. 19 is a tap with a pitch of 16 threads per inch, the terminal T19 has been connected by the jumper 746 to the terminal 16P of the voltage divider 745. The circuit will, therefore, continue from the terminal T19 to the jumper 746 to the terminal 16P and thence through the several resistances 751 of the voltage divider 745 to a conductor 738A which is connected with the conductor 738 in line L79. If a tool numbered 1 to 15 is selected, a circuit will also be completed to the relay 34CRE or the voltage divider 745 through a normally closed contact 23CR–2 in line L97, but since the control circuit will not then be conditioned for a threading operation the circuit to the voltage divider will have no effect, as will be seen, as the normally open contacts 5CR–3 and 5CR–4 on lines L99 and L100 will be open.

The voltage for energizing this circuit is obtained from a tachometer generator 760 which is connected to be driven by the rotating spindle 62 so that the voltage generated by the tachometer generator is always proportional to the rate of rotation of the spindle. The output of the tachometer generator 760 is directed into the conductor 757 and thence through one of the circuits of the terminals T16 to T31 inclusive, as described above, through the terminal and thence to the voltage divider 745. Considering again that tool No. 19 has been selected and includes a tap having a pitch of 16 threads per inch, the voltage from the tachometer generator 760 will be directed through the circuit, previously described, to the terminal T19 and thence to the terminal 16P of the voltage divider 745. The output of thte voltage divider 745 will flow into the conductor 738A in the L110, which is connected to the conductor 738 illustrated in line L79, so that the voltage flows through the now closed contact 5CRE–2 into the hydraulic servo valve 502 for regulating the operation of the valve.

The resistances 751 of the voltage divider 745 are so arranged that the output flowing into the conductor 738A to the hydraulic servo valve 502 will always be of a desired ratio with respect to the output of the tachometer generator 760 and this output will regulate the hydraulic servo valve 502 to establish a feed rate of the proper proportion relative to the rate of rotation of the spindle 62 for the pitch of the particular thread being formed. With this arrangement, whenever a tapping tool is placed in the spindle 62, the hydraulic servo valve 502 is placed under the control of the output of the voltage divider 745 directed into the conductor 738A, and the ratio of the feed rate of the spindle head 60 with respect to the rate of rotation of the spindle 62 will be properly maintained for the particular thread being formed.

Normally, the above described control circuit will accurately control the rate of the feeding movement of the spindle head 60 in response to the rate of rotation of the spindle 62 for the purpose of maintaining the required ratio of the feed rate with respect to the rate of rotation of the spindle for the particular pitch of the thread that is being formed. However, a corrective circuit is provided to adjust the feed rate if for any reason the proper ratio is not maintained in either the forward or reverse direction. It will be recalled from the previous description, that the cylindrical cam 481, shown in FIG. 18, is provided to actuate the two limit switches 425 and 426. If the feed rate is too slow for the particular rate of rotation of the spindle, the tapping tool will move forwardly relative to the spindle, and the cylindrical cam 481 will move with it to move its groove 482 out of alignment with the roller 484 of the switch 425 to actuate the switch and increase the feed rate. During this slight forward movement of the cylindrical cam 481, the roller 485 will ride in its cooperating groove 483 without actuating the limit switch 426. On the other hand, if the feed rate is too fast for the particular rate of rotation of the spindle, the cylindrical cam 481 will be moved rearwardly to actuate the limit switch 426. If the error in the feed rate is excessive, so that it cannot be corrected by the independent actuation of the limit switches 425 or 426, the movement of the cylindrical cam 481 will be sufficient to actuate both switches 425 and 426 to terminate the feeding movement.

The electrical circuit for effecting this control is illustrated diagrammatically in FIG, 31. The compensation of the feed rate is obtained through a pair of resistors 761 and 762 which are connected across the tachometer generator 760 as shown in lines L99 to L101. The circuit to the resistor 761 includes a normally closed contact 33CRE–1 so that the circuit is normally completed through the resistor 761 to increase the load on the tachometer generator 760 and this load can be deleted by opening the normally closed contact 33CRE–1. On the other hand, the circuit of the resistor 762 includes a normally open contact 32CRE–1 so that the resistor 762 is normally not connected in the circuit but the load can be added to the output of the tachometer generator 760 by closing the normally open contact 32CRE–1.

The energization of a relay 32CRE shown in line L93 will serve to close the normally open contact 32CRE–1 in line L101, and the energization of the relay 33CRE in line L94 will operate to open the normally closed contact 33CRE–1 in line L99. The energization of the relays 32CRE and 33CRE is under the control of the limit switches 425 and 426 respectively. The contact bar of the limit switch 426 is normally in engagement with its associated contact 765 and when the switch is actuated, the contact bar is moved into engagement with a cooperating contact 766. In like manner, the contact bar of the switch 425 is normally in engagement with a contact 767, but when the switch is actuated its contact bar is moved out of engagement with the contact 767 and into engagement with a contact 768.

If the spindle is being rotated in a forward direction, and the feed rate should be too slow for the particular rate of rotation of the spindle 62, the switch 425 will be actuated by the forward movement of the cylindrical cam 481, in the manner previously described. With the switch 425 actuated, a circuit is completed through the switch 425 in line L89 and since the switch 425 is actuated, its contact bar will be in engagement with the contact 768 to complete the circuit to a relay 26CR. Energization of the relay 26CR serves to close its normally open contacts 26CR–1 and 26CR–2 in lines L93 and L94.

However, since the spindle is rotating in a forward direction, the relay 25CR will be energized and its normally open contact 25CR–1 in line L92 will be closed. A circuit is, therefore, completed through the closed contact 25CR–1 through a conductor 771 to the now closed contact 26CR–2. The flow of current then continues to the relay 33CRE to energize it. Energization of the relay 33CRE will serve to open its normally closed contact 33CRE–1 in line L99 to break the circuit to the resistor 761. With this load removed from the tachometer generator 760, a higher voltage will be delivered to the voltage divider 745 and, thereby, increase the voltage delivered to the conductor 738A. This, of course, is transmitted to the hydraulic servo valve 502, as previously described, to increase the feed rate of the spindle head 60.

Similarly, the actuation of the switch 426 will serve to reduce the rate of feed of the spindle head 60. When the switch 426 in line L91 is actuated, its contact bar moves into engagement with the contact 766 to complete a circuit to the relay 27CR. Energization of the relay 27CR will close its normally open contacts 27CR–1 and 27CR–2 on lines L92 and L95. Since the spindle is rotating in a forward direction, the relay 25CR will be energized and its normally open contact 25CR–1 on line L92 will be closed. The current will, therefore, flow through it and the now closed contact 27CR–1 on line L92 to the relay 32CRE. Energization of the relay 32CRE will close its normally open contact 32CRE–1 on line L101 to close the circuit containing the resistor 762. The connection of the resistor 762 across the tachometer generator 760 increases the load on the tachometer generator to reduce the voltage being delivered to the voltage divider 745. The voltage delivered to the hydraulic servo valve 502, is, therefore, reduced accordingly to reduce the feed rate of the spindle head 60.

It will be noted that when the switches 425 and 426 are deactuated so that the contact bars are in the position illustrated in FIG. 31, a circuit may be completed through both of them for energizing a relay 28CR in line L91. The relay 28CR must be energized to obtain a feeding movement, and if it should become de-energized, the feeding movement will terminate. If the switch 425 is actuated for the purpose of increasing the rate of the feeding movement, the circuit to the relay 28CR will still be maintained through the switch 426. On the other hand, if the switch 426 is actuated for the purpose of decreasing the feed rate, the circuit to the realy 28CR will be maintained through the switch 425. However, if the error in the feed rate should become excessive, beyond the ability of the resistors 761 and 762 to compensate for it, both switches 425 and 426 will be actuated by reason of the arrangement previously described. With both switches 425 and 426 actuated, the circuit to the relay 28CR is broken to de-energize the relay and its de-energization will operate to terminate the feeding movement to prevent damage to the tool or workpiece.

The above description of the threading feed rate compensation circuit was presented with the assumption that the spindle 62 was rotating in the forward direction. When withdrawing the tap from the threaded hole, the spindle will be rotating in the reverse direction and the switches 425 and 426 must operate in the opposite manner. Thus, if the feed rate is too slow during a withdrawal of the tap the cylindrical cam 481 will move rearwardly instead of forwardly. As a result, the limit switch 426 will be actuated rather than the limit switch 425. Under these circumstances, the actuation of the limit switch 426 must produce an increase in the feed rate rather than a reduction as it did during the forward rotation of the spindle 62. This is taken care of by the inclusion of the two contacts 25CR–1 and 25CR–2 in lines L92 and L93.

In order to obtain a reverse direction of rotation of the spindle 62, the relay 25CR must be de-energized, as previously mentioned. As a result, its normally open contact 25CR–1 in line L92 and its normally closed contact 25CR–2 in line L93 will remain in their normal condition. Therefore, actuation of the switch 425 will again energize the relay 26CR to close the two normally open contacts 26CR–1 and 26CR–2 in lines L93 and L94 respectively. But, since the normally open contact 25CR–1 in line L92 remains open during reverse rotation, the circuit will be completed through the normally closed contact 25CR–2 through the now closed contact 26CR–1 and thence to the relay 32CRE. It will be recalled that during the forward rotation of the spindle, the actuation of the switch 425 energized the relay 33CRE through the normally open contact 25CR–1 in line L92. Energization of the relay 33CRE will open its normally closed contact 33CRE–1 in line L99 to increase the feed rate, in the manner previously described. In like manner, by reason of the de-energization of the relay 25CR, the actuation of the switch 426 during reverse rotation will energize the relay 33CRE rather than the relay 32CRE, which it energized during the forward rotation of the spindle 62. Thus, the circuit will serve to compensate for a slight error in the feed rate in either direction or rotation of the spindle 62, and if such error becomes excessive the feed rate will be terminated to stop the threading operation.

From the foregoing detailed description of the illustrative embodiment set forth herein to exemplify the present invention, it will be apparent that there has been provided an improved machining tool incorporating a mechanical tool changer and having a single spindle as well as a tool storage magazine which carries the supply of tools in a minimum of space with the tool changer operating to replace a tool in the spindle with a new tool removed from the storage magazine in a minimum period of time, the tool selected for the succeeding machining operation being moved to the tool change station in the magazine while the preceding machining operation is being performed and the tool change arm is automatically located in an inoperative position when not in use so that it in no way interferes with the machining operation, a unique electrical control system being also provided for effectively controlling the operation.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool having an operating station for operatively receiving tools for performing a machining operation; a frame; a source of power; a tool storage magazine mounted on said frame and having a tool change station; a member rotatably supported in said magazine and connected to be rotated by said source of power; a plurality of tools removably carried by said member in position so that the tools will move in a circular path as said member is rotated for locating the tools individually at the tool change station; a coding on each of said tools for identifying the tool; a reading head mounted in position to be actuated by the coding on said tools to identify said tools as they pass by said reading head during their movement in the circular path with said rotatable member; electrical control means operatively connected to control the flow of power from said source and to have impressed upon it the identification of the tool desired to be placed in the operating station for the succeeding machining operation, said electrical control means being also connected with said reading head to be actuated when the desired tool is identified by said reading head for terminating the flow of power for rotating said rotatable member to thereby locate the desired tool at the tool change station; and tool change means mounted on said frame and operably connected to be controlled by said electrical control means for removing a tool from said rotatable member at the tool change station and inserting it into the operating station and for removing the tool from the operating station and placing it in the tool change station to be carried by said rotatable member for storage.

2. In a machine tool; a frame; a source of power; a spindle rotatably supported by said frame and connected to be rotated by said source of power, said spindle being adapted to operatively receive tools for rotating the tools to perform a machining operation; a tool storage magazine mounted on said frame and having a tool change station; a member rotatably mounted in said magazine and connected to be rotated by said source of power; a plurality of tools removably carried by said member in position so that the tools move in a circular path as said member is rotated for locating the tools individually at the tool change station; a coding carried by each of said tools for identifying the tool; a reading head mounted in position to be actuated by the coding on said tools to identify the tools as they pass said reading head during movement; electrical control means operatively connected to control the flow of power from said source and to have impressed upon it the identification of the tool desired to be placed in said spindle for a succeeding machining operation, said electrical control means also connected with said reading head to operate when the desired tool is identified by said reading head for terminating the flow of power for rotating said rotatable member to thereby locate the desired tool at the tool change station; tool change means carried by said frame and operable to remove a tool at the tool change station from said rotatable member and insert it in said spindle and simultaneously removing a tool from said spindle and transferring it to said rotatable member for storage, said tool change means being movable selectively to an operative position and an inoperative position; first actuating means operable under the control of said electrical control means to actuate said tool change means for completing a tool change; and second actuating means operable under the control of said electrical control means for moving said tool change means to its operative position for completing a tool change and to move said tool change means to its inoperative position upon completion whereat it will not interfere with the performance of a machining operation.

3. In a machine tool; a frame; a source of power; a spindle rotatably supported by said frame and connected to be rotated by said source of power, said spindle being adapted to operatively receive tools; a tool storage magazine mounted on said frame and having a tool change station; a member rotatably supported in said magazine; a plurality of tool storage sockets pivotally mounted on said rotatable member for selective positioning at the tool change station with each of said sockets being adapted to removably carry a tool; a plurality of tools each being carried by one of said sockets; actuating means operably connected to said source of power and operative to effect pivotal movement of said sockets selectively at the tool change station; and a tool change arm mounted on said frame for rotational and translational movement and operative to simultaneously engage a tool at the tool change station and a tool contained in said spindle, to withdraw each tool from its respective socket and spindle simultaneously, and to transpose the tools by rotational movement of said arm prior to insertion of said transposed tools into a socket and the spindle for a succeeding machining operation.

4. In a machine tool; a frame; a source of power; a spindle rotatably supported by said frame and connected to be rotated by said source of power, said spindle being adapted to operatively receive tools for rotation; a tool storage magazine mounted on said frame and having a tool change station; a member rotatably supported in said magazine; a plurality of tool storage sockets mounted on said rotatable member in position to move in a circular path, and with each of said sockets being mounted for pivotal movement between a retracted position and an extending radial position, each of said sockets being adapted to removably carry a tool; a plurality of tools each being carried by one of said sockets; a lock mechanism associated with each socket to retain the socket in the retracted position; actuating means connected to be driven by said source of power and operable to release a selected one of said sockets and effect outward movement of said socket to an extended position at the tool change station; and a tool change arm operatively carried by said frame for rotational and translational movements and operative to simultaneously engage a tool at the tool change station and a tool contained in said spindle, to withdraw each tool from its respective socket and spindle simultaneously, and to transpose the tools by rotational movement of said arm prior to insertion of said transposed tools into a socket and spindle for a succeeding machining operation.

5. In a tool change mechanism for changing a tool at the operating station of a machine having a frame; a source of power; a tool storage magazine mounted on said frame and adapted to carry a plurality of tools; a rotatable and translatable tool change arm mounted on said frame and disposed for selective rotational and translational movement to enable said arm to engage and withdraw a tool from said magazine and transport the same to the operating station for insertion therein and to simultaneously engage and withdraw a tool from said operating station and transport the same to said storage magazine for insertion therein; an electrical control circuit connected to regulate the sequence of operations of said tool change arm for completing a tool change, said electrical control circuit including a plurality of switches operably connected therein; and a cam mounted to actuate said switches when rotated with said tool change arm to condition the electrical circuit for effecting a succeeding movement of the tool change arm in completing a tool change cycle.

6. In a machine tool; a frame; a source of power; a spindle rotatably supported by said frame and connected to be rotated by said source of power, said spindle being adapted to operatively receive tools for rotating the tools to perform a machining operation; a tool storage magazine mounted on said frame and adapted to carry a plurality of tools; a source of hydraulic pressure; a hydraulic unit mounted on said frame and connected to be actuated selectively by hydraulic pressure from said hydraulic source; and a tool change arm operatively carried by said hydraulic unit to be driven by it in a rotational movement and in a translational movement for rendering it operative to simultaneously engage a tool in the magazine and a tool contained in said spindle, to withdraw each tool from the magazine and spindle simultaneously, and to transpose the tools by rotational movement of said arm prior to insertion of said transposed tools into the magazine and spindle for a succeeding machining operation.

7. In a machine tool; a frame; a source of power; a spindle rotatably supported by said frame and connected to be rotated by said source of power, said spindle being adapted to operatively receive tools for rotating the tools to perform a machining operation; a tool storage magazine mounted on said frame and adapted to carry a plurality of tools; tool change means operatively carried by said frame for removing a tool from said magazine and inserting it in operating position in said spindle while simultaneously removing a tool from said spindle and placing it in said magazine for storage, said tool change means being movable selectively to an operative position and an inoperative position; first actuating means operatively connected to be driven by said source of power to actuate said tool change means for completing a tool change; and second actuating means operatively connected to be driven by said source of power to move said tool change means to its operative position for completing a tool change and to move said tool change means to its inoperative position upon a completion of a tool change.

8. In a tool change mechanism for changing a tool at the operating station of a machine having a frame; a source of power; tool storage means movably carried by said frame and having a tool ready station, [sad] said tool storage means carrying a plurality of removable tools with the tools being movable with the movable tool storage means to locate them individually at the tool ready station; tool selection means connected to regulate the operation of said tool storage means for selectively locating any one of the tools at the tool ready station; and tool change means carried by said frame and connected to be operated by said source of power for removing a tool from the tool ready station of said tool storage means and operatively inserting it into the operating station while simultaneously removing a tool from the operating station and placing it in the tool ready station for storage in said tool storage means.

9. In an indexing mechanism for indexing a member that is rotatably supported on a frame; a motor; a drive shaft having a flat formed on its periphery and connected to be driven by said motor, said drive shaft being connected to rotate the rotatable member; an electrical control circuit connected to control the operation of said motor and arranged to cause said motor to drive the rotatable member in the forward direction at a rapid rate and in the reverse direction at a creep rate, said electrical control circuit being operable to terminate the forward rotation of said motor to locate the rotatable member slightly beyond the desired index position and automatically initiate a reverse direction of rotation of said motor for driving the rotatable member in a reverse direction at a creep rate; a rocker arm pivotally supported at one end by the frame in alignment with the flat on said drive shaft, the flat being located on said drive shaft so that the rotatable member will be accurately located at any one of a plurality of index positions when the surface of said rocker arm is in full engagement with the surface of the flat; a spring supported on the frame in position to yieldably urge said rocker arm in its pivotal movement toward said drive shaft so that the surface of said rocker arm will be in engagement with the flat when the flat is in rotational alignment with the surface of said rocker arm; actuating means operably connected to move said rocker arm out of engagement with said drive shaft against the force of said spring during the forward rotation of said rotatable member and to release said rocker arm for actuation by said spring during the reverse rotation of said rotatable member; and a switch connected in said electrical control circuit and mounted in position to be actuated by said rocker arm when the surface of said rocker arm is in full engagement with the surface of the flat of said drive shaft, said switch being operable when actuated to condition said electrical control circuit for terminating the operation of said motor to stop the rotation of the rotatable member; whereby the rotatable member will be accurately located at the desired index position.

10. In a tool selection mechanism; a source of power; a tool storage magazine having a tool ready station; a member rotatably supported in said magazine and connected to be rotated by said source of power; tool retaining means supported by said rotatable member for removably carrying a plurality of tools in position so that the tools move in a circular path for locating the tools succesesively at the tool ready station; a plurality of tools in said magazine with each being carried by said retaining means; a coding on each of the tools for identifying the individual tools; an electrical coincidence circuit; a plurality of tool actuated switches connected in said coincidence circuit and mounted at the tool ready station in position to be actuated by the coding on said tools during tool movement in a circular path, said switches being actuated by said coding in a manner to individually identify each of the plurality of tools; a plurality of selection switches connected in said coincidence circuit in series relationship with said tool actuated switches and actuatable in various combinations to indicate which tool is desired to be located at the tool ready station, said selection switches and said tool actuated switches operating to complete said coincidence circuit when said tool actuated switches are actuated in the same combination that said selection switches are actuated to indicate the presence of the desired tool at the tool ready station; and control means operably connected to control the rotation of said rotatable member and to be actuated by the completion of said coincidence circuit to terminate the rotation of said rotatable member with the desired tool at the tool ready station; whereby any one of the tools carried by said rotatable member may be selected for delivery to the tool ready station.

11. In a machine tool having a frame that carries a holder for securing a tool for a machining operation; a tool storage magazine supported by said frame for storing tools; a plurality of different tools carried by said tool storage magazine for selective placement in said holder; identifying means fixed to each of said tools to identify the tool; control means connected to cooperate with said identifying means for selecting the tool from said magazine that is to be employed for a succeeding machining operation; and tool change means operably connected to replace the tool in said holder with the tool selected from said storage magazine by said control means.

12. In a machine tool having an operating station; a tool operating means at said operating station adapted to receive a tool; a frame; tool storage means mounted on said frame and carrying a plurality of tools for placement in said tool operating means selectively; selection means connected to select any one of the tools in said tool storage means; and a tool change arm carried by said frame for rotational and axial movement and operable to withdraw a tool from said tool operating means and a selected tool from said storage means simultaneously by its axial movement and to interchange the locations of the withdrawn tools by the rotational movement, a subsequent axial movement of said change arm serving to simultaneously insert the tools into said tool operating means and said storage means.

13. In a machine tool having an operating station for receiving a tool; a frame; a tool storage magazine rotatably mounted on said frame; a plurality of tools removably carried by said magazine with their axes parallel to the axis of said magazine but positionable outwardly individually to extend from said magazine; and tool change means operably connected to replace the tool in the operating station with a tool that has been extended from said magazine.

14. In a machine tool having an operating station for receiving a tool; a frame; a tool storage magazine rotatably mounted on said frame and having a tool change station; a plurality of tools removably carried by said magazine and individually positionable, said tools moving with the rotation of said magazine for individually locating them at the tool change station; locking means supported by said magazine to lock the tools with their axes parallel to the axis of the magazine but releasing the tool at the tool change station for positionable movement; actuating means operably connected to move the tool at the tool change station outwardly for radial extension from said magazine; and tool change means operably connected to replace the tool in the operating station with a tool that has been extended radially from said magazine.

15. In a machine tool having an operating station arranged to receive different tools; a frame; a tool storage magazine movably supported by said frame and having a tool change station; a plurality of tools removably carried by said tool storage magazine so that the tools in said magazine will move successively past the tool change station upon movement of said magazine; a motor connected to move said magazine; a control system operably connected to regulate the movement of said magazine to locate a succeeding tool at the tool change station while the machine tool is operating with a different tool at the operating station; and tool change means operable when actuated to replace said tool at the operating station with the tool at the tool change station.

16. In a tool change mechanism for changing the tool at the operating station of a machine tool; a tool change station disposed for receiving tools that are to be placed in the operating station of the machine; a plurality of tools supported in position to be moved into the tool change station and adapted for placement in the machine operating station; means operably connected to move said tools into the tool change station; identifying means on each of said tools for identifying the associated tool; tool designation means operably connected to receive and store data for designating the tool to be placed in the tool change station; and control means associated with said tool designation means and actuated by said identifying means on said tools to regulate the operation of said tool moving means for locating the tool that is indicated by said tool designating means at the tool change station.

17. In a tool change mechanism for changing the tool at the operating station of a machine tool; a tool storage magazine rotatably mounted adjacent to the operating station of the machine and having a tool change station; a plurality of tools carried by said magazine in position to be moved individually in succession to the tool change station by the rotation of said magazine; actuators on each of said tools arranged in code fashion for identifying the associated tool; a tool indicator connected to be activated by said actuators to indicate the presence of a preselected tool at the tool change station; and control means connected to control the rotation of said magazine and to be actuated by said tool indicator to terminate the rotation of said magazine to locate the preselected tool at the tool change station.

18. In a tool change mechanism for changing the tool at the operating station of a machine tool; a plurality of tools supported adjacent to the machine for placement in the operating station; identifying means on each of said tools for identifying the associated tool; an electrical tool designation circuit operably connected to receive data for designating a particular tool to be required at the operating station; and an electrical coincidence circuit connected to be actuated by said identifying means on said tools and by said tool designation circuit to select the tool from said plurality of tools which is to be placed in the operating station of the machine.

19. In a machine tool having a frame and an operating station which is provided with tool securing and operating means; tool storage means carrying a plurality of tools; selection means operative to select a desired tool in said tool storage means for placement in said tool [holding] securing means; a tool change arm rotatably carried by said frame and operable when rotated to replace a tool in said tool [holding] securing means with the selected tool from said storage means; and a source of power connected to rotate said tool change arm for transferring the tools into and out of said tool [holding] securing means.

20. In a machine tool having a frame and an operating station which is provided with tool securing and operating means; tool storage means carrying a plurality of tools; a tool ready station disposed to selectively receive said tools; selection means connected to select the desired tool in said tool storage means for placement in said operating station; transfer means operating under the control of said selection means to transfer a desired tool in said tool storage means into said tool ready station; a tool change arm rotatably carried by said frame and operable when rotated to transport the tools between said tool ready station and said tool [holding] securing means for replacing a tool in said tool [holding] securing means with the selected tool from said tool storage means; and a source of power connected to rotate said tool change arm for transporting the tools between said tool ready station and said tool [holding] securing means.

21. In a machine tool having a frame and an operating station provided with tool holding and operating means; tool storage means carrying a plurality of tools for placement in said tool holding means selectively; a tool ready station for individually receiving said tools selectively; selection means connected to select the desired tool in said tool storage means for placement in said operating station; power operated transfer means operably connected to transfer the desired tool in said tool storage means into said tool ready station; control means responsive to said selection means to regulate the operation of said transfer means for moving the selected tool into the tool ready station while a machining operation is being performed at the operating station; a tool change arm movably carried by said frame and operable to transport the tools between said tool ready station and said tool holding means for replacing a tool in said tool holding means with the selected tool from said tool storage means; and a source of power connected to actuate said tool change arm for transporting the tools between said tool ready station and said tool holding means.

22. In a machine tool provided with an operating station; a tool holding and operating means at the operating station to receive different tools for performing different operations thereat; a frame; a tool storage means carrying a plurality of tools for placement in said tool holding means selectively; selection means connected to select any one of the tools in said tool storage means for placement in the operating station; a tool change arm movably carried by said frame for transferring tools between said tool holding means and said tool storage means; a pair of independent carriers on said tool change arm with each of said carriers being adapted to receive one of the tools so that said tool change arm can carry two tools simultaneously for movement therewith; means for operating said tool change arm to enable one carrier to receive the tool from said tool holding means and transfer it to said tool storage means and the other carrier to transfer the selected tool from said tool storage means to said tool holding means for performing a succeeding operation; and a source of power connected to drive said tool change arm in its movement for performing the tool transfer operation.

23. In a machine tool having a frame and a spindle rotatably carried by the frame and adapted to receive different tools for performing different machining operations; tool storage means carrying a plurality of tools; selection means connected to select any one of the tools in said tool storage means for placement in the spindle, a tool change arm rotatably carried by said frame; a pair of carriers on said tool change arm, said carriers being adapted to couple the tools to said tool change arm for movement in an arcuate path therewith so that one carrier removes a tool from the spindle and transports the tool to said tool storage means and the other carrier removes the selected tool from said tool storage means and transports the tool to the spindle for performing the succeeding operation; and a source of power connected to rotatably drive said arm for effecting the interchange of tools between the spindle and said tool storage means.

24. In a tool change mechanism for changing the tools in the tool head of a machine tool; a frame; tool storage means carrying a plurality of tools; a tool selector for selecting the desired tool in said tool storage means; a tool change arm supported by said frame for rotational and translational movement; a pair of carriers mounted to move with said tool change arm and adapted to couple the tools to said tool change arm for movement therewith; a source of power connected to drive said tool change arm in its rotational and translational movements; and control means operably connected to regulate the operation of said source of power to produce the unitary movements of said tool change arm and said carriers in sequence for engaging and removing the tool in the tool head for placement in said tool storage means and transferring the selected tool to the tool head and operably placing it in the tool head for the performance of a succeeding machining operation.

25. In an apparatus for storing tools that are used in a machine tool which has a frame and an operating station; a tool storage magazine mounted on the frame of the machine for removably carrying a plurality of tools and having a tool change station at which each of said tools may be withdrawn from said magazine for placement in the operating station of the machine tool; a plurality of tool retainers pivotally mounted on said magazine, each of said retainers being adapted to yieldably retain one of the tools in the magazine and the pivotal movement of the retainer serves to extend the tool retained therein outwardly of the magazine; and drive means to actuate said magazine for moving said retainers and the tools retained therein successively to the tool change station.

26. In a tool change mechanism for changing a tool at the operating station of a machine tool, the operating station having a tool holding and operating means; a frame; a tool storage magazine mounted on said frame and adapted to carry a plurality of tools; tool selection means operable to select a desired tool in said tool storage magazine for placement in said tool holding means; a tool change arm pivotably carried by said frame for transferring tools between said tool holding means and said tool storage magazine; tool gripping means carried by said tool change arm for securing tools to said tool change arm and to move with the pivotal movement of said tool change arm for transferring tools between said tool holding means and said tool storage magazine; a source of power connected to drive said tool change arm; and an electrical control circuit operatively connected to regulate the pivotal movement of said tool change arm in effecting tool transfer.

27. In a machine tool having an operating station which is provided with tool holding and operating means; a frame; tool storage means carrying a plurality of tools; control means; selection means responsive to said control means to select the desired tool in said tool storage means for placement in said tool holding means; a tool change arm carried by said frame for movement in two distinct paths of travel and responsive to said control means for transporting tools between said tool holding means and said tool storage means; securing means on said tool change arm for securing tools to said tool change arm for movement therewith; means for moving said tool change arm along its two paths of travel so that movement in the first path of travel serves to insert and withdraw a tool into and out of said tool holding means and said tool storage means while moving of said tool change arm in its second path of travel transfers the tool between said tool holding means and said tool storage means; and a source of power connected to drive said tool change arm in its two paths of travel for performing the tool changing operation.

28. In a machine tool having a frame and an operating station which is provided with tool holding an operating means; a tool change arm carried by said frame for movement in two distinct paths of travel for transferring tools to and from the tool holding means, said tool change arm comprising a body having a perimetric edge with a plurality of recesses opening into said perimetric edge for receiving the tools to be transferred; and a source of power connected to drive said tool change arm in its two paths of travel so that movement in its first path of travel serves to insert and withdraw a tool into and out of the tool holding means while movement of said tool change arm in its second path of travel transfers the tool to and away from the tool holding means.

29. In a machine tool having a frame and an operating station which is provided with tool holding and operating means; a tool change arm carried by said frame for rotary and axial movement for transferring tools into and out of the operating station, said tool change arm comprising a body having a perimetric edge with a plurality of recesses operating into said perimetric edge for receiving the tools to be transferred; and a source of power connected to drive said tool change arm in its rotary and axial movement so that the rotary movement moves the recesses in said arm into and out of engagement with the tools in the operating station, the rotary movement of said arm also serving to transfer the tools to and away from the operating station while the axial movement of said arm operates to insert and withdraw the tools from the tool holding means.

30. In a machine tool having an operating station arranged to receive different tools; a frame; a tool storage magazine movably supported by said frame and having a tool change station; a plurality of individually identifiable tools removably carried by said tool storage magazine so that the tools in said magazine will move successively past the tool change station for identifying said tools upon movement of said magazine; a motor connected to move said magazine; a control system operably connected to regulate the movement of said magazine to locate a succeeding tool at the tool change station while the machine tool is operating with a different tool at the operating station; and tool change means operable when actuated to replace said tool at the operating station with the tool at the tool change station.

31. In a machine tool having a spindle; a source of electric signals connected to automaticlly control the operation of the machine tool; a tool transfer member operatively supported for rotary and reciprocating movement; a plurality of carriers on said tool transfer member adapted to couple the tools to said tool transfer member for movement therewith; and a source of power connected to drive said member in its rotary movement for transferring the tools coupled to said member to and away from the spindle and to drive said member in its reciprocating movement for inserting and withdrawing the tools coupled thereto into and out of the spindle, said source of power being responsive to said electric signals for actuating said tool transfer member.

32. In a machine tool having an operating station which is provided with tool retaining means; a tape reader adapted to produce electric signals from information contained in a prepared tape; an electrical control circuit connected to receive the signals from said tape reader and regulate the operation of the machine tool in response to said signals; a tool change arm supported for movement in two distinct paths of travel so that movement in the first path of travel serves to move a tool axially to insert and withdraw the tool into and out of said tool retaining means while movement of said tool change arm in its second path of travel transfers the tool laterally into and away from the operating station; a plurality of carriers on said tool change arm adapted to couple tools to said tool change arm for movement therewith; and a source of power connected to drive said tool change arm in its movements, said source of power being regulated by said electrical control circuit for actuating said tool change arm in its movements in response to information contained on the tape.

33. In a machine tool adapted to use diverse tools of the same type, said tools being stored in a magazine; carriers in said magazine for carrying said tools; means associated with said tools for selective identification of said tools; identifying and selecting means on said magazine for identifying and selecting said tools; and means for transferring the selected tools to a usable position in said machine tool.

34. In a machine tool having an operating station which is provided with tool retaining means; a source of electric signals; an electrical control circuit connected to receive the signals from said source and regulate the operation of the machine tool in response to said signals; a tool transfer member supported for movement in two distinct paths of travel so that movement in the first path of travel serves to move a tool axially to insert and withdraw the tool into and out of said tool retaining means while movement of said tool transfer member in its second path of travel transfers the tool laterally toward and away from the tool retaining means; coupling means on said tool transfer member adapted to couple the tool to be transferred to said tool transfer member for movement therewith; and a source of power connected to drive said tool member in its movements, said source of power being regulated by said electrical control circuit for actuating said tool transfer member in its movements in response to the signals from said source.

35. In a machine tool; a frame; a source of power; a spindle supported by said frame for rotational and axial movements; a tool storage magazine rotatably mounted on said frame and having a tool change station, said tool storage magazine being connected to be rotated by said source of power; a plurality of different tools removably carried by said storage magazine, some of said tools being provided with taps of different pitches; a coding carried by each of said tools for identifying the cutting tool; and electrical control circuit including an electrical coincidence circuit and a tool selection circuit; a plurality of tool acuated switches connected in said coincidence circuit and mounted at the tool change station in position to be actuated by the coding on said tools as said tools pass by said switches during their movement in a circular path with said storage magazine, said switches being actuated by said coding in various combinations for identifying one of the plurality of tools; a source of signals; a plurality of tool selection switches connected in said selection circuit and actuatable in various combinations by signals from said source of signals to indicate which tool is desired to be located at the tool change station; a tool selection relay for each of said tool selection switches, each of said tool selection relays being connected in said tool selection circuit for energization by the actuation of its cooperating tool selection switch; a normally open tool selection contact and a normally closed tool selection contact associated with each of said tool selection relays with each pair of said tool selection contacts being actuated by energization of their cooperating relays, said tool selection contacts being connected in said coincidence circuit in series relationship with said tool actuated switches to complete said coincidence circuit when the contacts therein are actuated in the same combination as said tool actuated switches are actuated to indicate the arrival of the selected tool at the tool change station; control means in said control circuit and actuated upon completion of said coincidence circuit to terminate the rotation of said storage magazine with the selected tool at the tool change station; a latching relay for each of said tool selection switches, each of said latching relays being connected in said tool selection circuit to be energized through the actuated tool selection switches upon the completion of said electrical coincidence circuit for initiating a tool change operation to store the identification of the tool in the spindle while the tool selection relays are being operated for selecting the succeeding tool; an unlatching relay for each of said latching relays connected in said control circuit to deactuate said latching relays when energized with the initiation of a tool change operation to delete the identification of the tool being removed from the spindle; a tool change arm operatively carried by said frame and connected to be actuated by said source of power in rotational and translational movements selectively for engaging the tool at the tool change station and removing it from said storage magazine and inserting the tool in said spindle while simultaneously engaging and removing the preceding tool from said spindle and transporting and inserting the same in said storage magazine; a drive motor operably connected to be energized by said source of power to rotate said spindle at variable rates selectively for performing a machining operation; a source of hydraulic pressure; a hydraulic feed motor actuated by said hydraulic pressure source to effect axial feeding movement of said spindle; a hydraulic servo valve connected to vary the flow of hydraulic pressure to said feed motor and thereby effect infinitely variable feed rate control of said spindle; a tachometer generator connected to be driven by said spindle to develop a voltage proportional to the rate of rotation of said spindle; a voltage divider connected to receive the voltage developed by said tachometer generator; an output conductor connected to direct voltage flowing through said voltage divider to said hydraulic servo valve in a manner to regulate said hydraulic servo valve for controlling the flow of hydraulic pressure to said feed motor and thereby control the rate of feeding movement of said spindle; a multiple tap arrangement for said voltage divider to prevent selective connection in the circuit with said tachometer generator and enable the voltage delivered to said hydraulic servo valve to be related to the voltage developed by said tachometer generator and thereby establish a preselected relation between the rate of spindle feed movement to the rate of spindle rotation; a top identifying circuit; and a contact in said tap identifying circuit connected to be actuated by signals from said source and operable upon a tool provided with a tap being located at the tool change station to connect said voltage divider to receive voltage from said tachometer generator; whereby any one of a plurality of cutting tools may be located at the tool change station and interchanged with a tool in said spindle and wherever the desired tool is provided with a tap the rate of feeding movement of said spindle is established at a proper ratio with respect to the rate of rotation of said spindle to accomplish a tapping operation.

*36. In a machine tool having a spindle adapted to receive different tools for performing machining operations; a frame; a tool storage magazine carrying a plurality of diverse tools for utilization in the spindle, said magazine being supported by said frame for rotation about a fixed axis for presenting the particular tool that is to be used in the next machining operation, which tool is to be placed in the spindle; and tool transfer means carried by said frame so that it may be moved to engage the presented tool and extract it from said magazine while said magazine is stationary and transfer the tool to said spindle.*

*37. In a machine tool having a tool operator adapted to operate with different tools; tool storage means for storing a plurality of tools to be used by said tool operator; tool selection means for selecting any one of the tools from said tool storage means; and tool change means movably supported for moving the selected tool out of said storage means while the latter is stationary and transferring the tool to a position where it is usable by said tool operator.*

*38. In a machine tool having a tool operator adapted to operate with different tools; securing means actuatable to operably secure tools to the tool operator for the performance of a work operation; tool storage means for storing a plurality of tools that may be operated by said tool operator; tool selection means for selecting any one of the tools from said tool storage means; and tool change means movably supported for removing the selected tool from said storage means while the latter is stationary and transferring the selected tool to a position where it may be engaged by said securing means for securement to the tool operator for the performance of a work operation.*

*39. In a machine tool having an operating station where different tools are utilized for performing machining operations; a frame; a tool storage magazine supported by said frame for carrying a plurality of tools to be used in said operating station; means for locating the desired tool in said magazine; and a toolholder and transfer member carried by said frame for movement in a predetermined path of travel so that it may be moved* from an idle position *into engagement with the located tool in said magazine and* [*then*] *continued in its path of travel to extract the engaged tool from said magazine and transfer it to the operating station* and to release the tool at the operating station and then return to its idle position for location therein while a machining operation is being performed with the tool at the operating station.

*40. In a machine tool having a tool operator adapted to receive diverse tools for performing machining operations; a frame; securing means actuatable to secure a tool in the tool operator* [*for performance of a work operation*]*; a tool storage magazine carrying diverse tools for utilization in the tool operator and having a tool ready station; means for moving the tools in said magazine for individually locating the tools in the tool ready station; means connected to control said moving means for moving a particular tool into the tool ready station; tool transfer means* [*operable to extract the particular tool from the tool ready station and then*] movable from a rest position into engagement with the particular tool and extract and *transfer it from the tool ready station into position where it can be engaged by said securing means,* said transfer means releasing the transferred tool at the tool operator and returning it to its rest position to remain idle therein during a machining operation; [*and*] *actuating means connected to actuate said securing means for securing the transferred tool to the tool operator* [*for the performance of a work operation*]**;* and means connected to actuate said tool operator for activating the tool therein in a machining operation.

*41. In a machine tool; a frame; a tool operator carried by said frame and adapted to receive diverse tools for the performance of different work operations; a tool ready station adapted to individually receive tools; a plurality of tools carried by said frame; moving means for moving the tools from said frame into said tool ready station; means connected to control said moving means for locating* [*particular tools in*] any one of the tools in *said tool ready station; and a* [*movable*] *tool transfer member* [*arranged*] movable from a parked position into engagement with the particular tool in said tool ready station and *to transfer the particular tool out of said tool ready station* [*and*] *to said tool operator* and to release the tool at said tool operator and return to its parked position to remain at rest while said tool is operated in a machining operation.

*42. In a machine tool adapted to use different tools for performing work operations and including a work zone where the operations are carried out; a spaced storage means holding a plurality of tools;* [*and*] selection *means coordinated with said storage means for locating* [*a particular desired tool*] any one of the tools *in said storage means,* [*extracting the tool from*] and a tool transfer member movable from an idle position to engage the selected tool and extract it from *said storage means* [*and transporting*], transport *the extracted tool from said storage means to said work zone* and then release the extracted tool and return to the idle position to remain at rest while a work operation is performed with the extracted tool.

*43. In a machine tool; a zone where machining takes place; a magazine spaced from said zone and holding a plurality of tools and being operable to present particular tools as desired; tool holding and transfer means; and means movably operating said tool holding and transfer means* from a rest position *for engaging and holding the presented tool and transferring it from the point of engagement, across said space to said machining zone* and then releasing the presented tool in said machining zone and returning said tool holding and transfer means to the rest position for location therein while said presented tool is operated in the machining zone.

*44. In a machine tool; a tool operator adapted to be coordinated in a machining operation; a transfer member adapted to hold a tool; and means for moving said transfer member for aligning one of said tools with said operator and further moving said* [*member*] tool *toward said operator for securement thereto.*

*45. In a machine tool; a spindle; a storage of tools; means for selecting a particular tool in said storage; and tool change means movable with respect to the tools in said storage for withdrawing said particular tool from said storage and cooperating with said spindle in the insertion and securement of said tool in said spindle.*

*46. In a machine tool using diverse tools including a spindle; a storage means holding a plurality of diverse tools; tool change means operable to grip a selected tool in said tool storage means;* and *means moving said tool change means* from an idle position into gripping engagement with the selected tool *for removing said gripped tool from said storage means and moving said gripped tool away from said storage means and to said spindle* and then to release the tool and return said tool change means to the idle position.

*47. In a machine tool adapted to use diverse tools, said tools being stored in a magazine; carriers in said magazine for carrying said tools; code means associated with said tools for selective identification of said tools; identifying and selecting means cooperating with said code means for identifying and selecting said tools; and means for transferring the selected tools away from said magazine to a usable position in said machine tool.*

48. In a machine tool; a tool operator; storage means to retain a tool for use in said tool operator; a tool change arm movably supported for transferring a tool between said tool operator and said storage means; and a prehensile grip on said tool change arm for gripping a tool.

49. In a machine tool; a tool operator; a tool ready station; transfer means movable from a rest position to extract a tool from said ready station and transfer the extracted tool to said tool operator and return to rest position; and a prehensile grip mounted on said transfer means for securing the tool during extraction and transfer.

50. In a machine tool; a tool operator; storage means to retain a tool for use in said tool operator; a tool change arm movably supported for transferring a tool between said tool operator and said storage means; and a prehensile grip on said tool change arm for gripping a tool during the transfer operation and being operable to release the tool when the latter is received by either said tool operator or said storage means.

51. In a machine tool having a tool operator for receiving tools to perform a machining operation; a source of power; a tool ready station adapted to receive tools that are to be used in said tool operator; a tool transfer member actuatable by said source of power for transferring tools between said tool operator and said tool ready station; a grip on said tool transfer member for receiving the tool to be transferred; and means for actuating said grip for securing the tool to said tool transfer member during the transfer operation and for releasing said tool in either said tool operator or said tool ready station.

52. In a machine tool; a tool operator; a tool ready station to hold a tool for use in said tool operator; tool transfer means for transferring tools between said tool operator and said tool ready station; a grip on said tool transfer means for gripping the tool that is being transferred; locking means associated with said grip for releasably locking a tool in said grip; and power operated means connected to actuate said locking means to lock the tool in said grip during the transfer operation and to release the tool therefrom after the transfer operation to either said tool operator or said storage means has been completed.

53. In a machine tool; a frame; a tool operator carried by said frame; storage means carrying a plurality of tools for use in said tool operator; a carrier operably disposed on said frame for movement between a parked position and an operating position; and a tool transfer member mounted on said carrier for movement therewith between the parked position and the operating position, said tool transfer member being also movable relative to said carrier for transferring tools between said tool operator and said storage means.

54. In a machine tool; a machining zone having a tool operator for holding a tool during a machining operation; a tool ready station for receiving a tool to be used in said machining zone; a carrier mounted for movement between a parked position and an operating position; and tool transfer means supported by said carrier for movement therewith between the parked position and the operating position, said tool transfer member being movable relative to said carrier for transferring tools between the tool operator and said tool ready station.

55. In a machine tool; a machining zone having a tool operator for holding a tool during a machining operation; a tool ready station for receiving a tool to be used in said machining zone; tool transfer means; first means for moving said tool transfer means in a first path of travel between a parked position and an operating position; and second means for moving said transfer means in a second path of travel while said transfer means is in its operating position for transferring tools between said ready station and said tool operator; whereby said tool transfer means may be located in either its operating position whereat it is rendered operable for transferring a tool to said tool operator or shifted to its parked position to clear said machining zone for the performance of a machining operation.

56. In a machine tool; a machining zone having a tool operator for holding a tool during a machining operation; tool transfer means movable in a first path of travel for shifting between a parked position and an operating position, said tool transfer means being also movable in a second path of travel while in the operating position for transferring tools into and away from said tool operator; whereby said tool transfer means may be selectively located in the operating position whereat it is rendered operable for replacing a tool in said tool operator or shifted from the operating position to the parked position to clear said machining zone for the performance of a machining operation.

57. In storage and transfer apparatus adapted to store tools and to transfer tools to a tool operator of a machine tool; tool storage means including a plurality of tool receivers; means for releasably securing a tool in each of said receivers for release at a tool ready station; power driven means connected to move any selected one of said tool receivers into the tool ready station; and transfer means for engaging a tool in the tool receiver at the tool ready station, extracting the engaged tool and shifting the tool from the receiver to the tool operator.

58. In storage and transfer apparatus adapted to store tools and to transfer tools to a work zone of a machine tool; a magazine including a plurality of tool receivers; means associated with each of said tool receivers for releasably holding a tool in the associated receiver for release at a tool ready station; power driven means connected to move any selected one of said tool receivers into the tool ready station; and transfer means for engaging a tool in the receiver at the tool ready station, extracting the engaged tool and shifting the tool from said receiver to the work zone.

59. In storage and transfer apparatus adapted to store tools and transfer the tools to a machine tool head; a magazine including a plurality of tool receiving storage sockets; releasable clamp means associated with each of said tool storage sockets to releasably secure a tool therein; power driven means connected to move any selected one of said tool storage sockets into the ready station; and transfer means for engaging a tool disposed in a storage socket in the tool ready station, extracting the engaged tool and shifting the tool from said associated socket to the machine tool head.

60. In a machine tool; a machining zone having a tool operator for holding a tool during a machining operation; a storage zone providing a storage of tools for selective use at said machining zone; and transfer means for removing a tool from said storage zone, transferring the removed tool to said machining zone, introducing the tool to the tool operator, and thereafter moving from the machining zone to permit the tool and tool operator to function in the performance of a machining operation.

References Cited by the Examiner

The following references, cited by the Examiner, are of record in the patented file of this patent or the original patent.

UNITED STATES PATENTS

| | | |
|---|---|---|
| 1,984,839 | 12/34 | Murray. |
| 2,454,087 | 11/48 | Ransome. |
| 2,559,369 | 7/51 | Phillips. |
| 2,619,707 | 12/52 | Young. |
| 2,685,122 | 8/54 | Berthiez. |
| 2,711,817 | 6/55 | Hautau et al. |
| 2,715,389 | 8/55 | Johnson. |
| 2,716,395 | 8/55 | Pettigrew. |
| 2,782,689 | 2/57 | Carlsen. |
| 2,849,926 | 9/58 | Burgsmuller. |
| 2,901,927 | 9/59 | Morgan. |

OTHER REFERENCES

Publication: Electronics, September 1952, pages 100 to 105 inc.

RICHARD H. EANES, JR., *Primary Examiner.*